(12) United States Patent
Cheng et al.

(10) Patent No.: US 12,715,347 B2
(45) Date of Patent: Aug. 25, 2026

(54) CHILD SAFETY SEAT AND SAFETY BELT MOUNTING PROMPT SYSTEM AND METHOD

(71) Applicant: WONDERLAND SWITZERLAND AG, Steinhausen (CH)

(72) Inventors: Manqun Cheng, Dongguan (CN); Guozhu Zeng, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 18/867,721

(22) PCT Filed: May 22, 2023

(86) PCT No.: PCT/EP2023/063618
§ 371 (c)(1),
(2) Date: Nov. 20, 2024

(87) PCT Pub. No.: WO2023/222920
PCT Pub. Date: Nov. 23, 2023

(65) Prior Publication Data

US 2025/0353410 A1 Nov. 20, 2025

(30) Foreign Application Priority Data

May 20, 2022 (CN) ......................... 202210555072.7
Dec. 6, 2022 (CN) ......................... 202211557539.8
Feb. 6, 2023 (CN) ......................... 202310088949.0

(51) Int. Cl.
*B60N 2/26* (2006.01)
*B60N 2/28* (2006.01)

(52) U.S. Cl.
CPC ............. *B60N 2/269* (2023.08); *B60N 2/268* (2023.08); *B60N 2/272* (2023.08); *B60N 2/2821* (2013.01); *B60N 2/2869* (2013.01); *B60N 2/2884* (2013.01)

(58) Field of Classification Search
CPC ...... B60N 2/269; B60N 2/272; B60N 2/2821; B60N 2/2869; B60N 2/2884; B60N 2/0024; B60N 2/0237; B60N 2/268; B60N 2/2806
See application file for complete search history.

(56) References Cited

U.S. PATENT DOCUMENTS 7,147,246 B2 * 12/2006 Breed ................. B60R 21/0152 280/739
7,983,817 B2 * 7/2011 Breed ................... B60R 21/013 367/137

(Continued)

FOREIGN PATENT DOCUMENTS

CN 110370993 A 10/2019
CN 210792882 U 6/2020

(Continued)

OTHER PUBLICATIONS

International Search Report and Written Opinion dated Nov. 29, 2023 in corresponding International Application No. PCT/EP2023/063618.

(Continued)

*Primary Examiner* — John A Tweel, Jr.
(74) *Attorney, Agent, or Firm* — Volpe Koenig

(57) ABSTRACT

A child safety seat, including a seat body; and a seat base. The seat body is rotatably mounted on the seat base, and the seat body is rotatable between a forward-facing use mode and a rearward-facing use mode. The child safety seat further includes at least one impact protection block mounting position; and a safety prompt system. The safety prompt (Continued)

system sends reminder information when a side impact protection block is not mounted or not accurately mounted. A child safety seat, including a seat base. The seat base includes a second mounting seat, a turntable, a fifth detection apparatus, and a second control module. A safety belt mounting prompt system and a safety belt mounting prompt method, used in a child safety seat. The safety belt mounting prompt system includes: a safety belt detection apparatus, a seating detection apparatus, and a third control module.

20 Claims, 45 Drawing Sheets

(56) References Cited

U.S. PATENT DOCUMENTS

| | | | | |
|---|---|---|---|---|
| 10,322,651 | B2 * | 6/2019 | Hutchinson | B60N 2/2806 |
| 11,560,073 | B2 * | 1/2023 | Pos | B60N 2/2821 |
| 11,820,263 | B2 * | 11/2023 | Trunzer | B60N 2/2851 |
| 12,491,802 | B2 | 12/2025 | Mo et al. | |
| 2006/0170262 | A1 | 8/2006 | Gold et al. | |
| 2015/0091348 | A1 | 4/2015 | Juchniewicz et al. | |
| 2015/0336482 | A1 | 11/2015 | Pos | |
| 2017/0355287 | A1 | 12/2017 | Anderson et al. | |
| 2020/0391627 | A1 | 12/2020 | Williams | |
| 2021/0237626 | A1 | 8/2021 | Longnecker et al. | |
| 2023/0211709 | A1 | 7/2023 | Chen | |
| 2026/0008387 | A1 * | 1/2026 | Xu | B60N 2/267 |

FOREIGN PATENT DOCUMENTS

| | | | | |
|---|---|---|---|---|
| CN | 112208403 | A | 1/2021 | |
| CN | 112208405 | A | 1/2021 | |
| CN | 113895326 | A | 1/2022 | |
| DE | 202012007185 | U1 | 11/2012 | |
| DE | 202018006455 | U1 | 9/2020 | |
| DE | 102024003130 | A1 * | 6/2025 | B60N 2/42736 |
| JP | 2001301506 | A | 10/2001 | |
| JP | 2017094893 | A | 6/2017 | |
| JP | 2019077254 | A | 5/2019 | |
| JP | 2020015344 | A | 1/2020 | |
| JP | 2023533276 | A | 8/2023 | |
| TW | 202202373 | A | 1/2022 | |
| WO | 2021090313 | A1 | 5/2021 | |
| WO | 2021094523 | A1 | 5/2021 | |
| WO | 2021175892 | A1 | 9/2021 | |
| WO | 2022090291 | A1 | 5/2022 | |
| WO | WO-2024083792 | A2 * | 4/2024 | B60N 2/2806 |

OTHER PUBLICATIONS

Taiwanese Office Action dated Mar. 26, 2024, in corresponding TW Application No. 112118990, along with Partial English translation thereof.

IP Australia. Office Action for corresponding application AU 2023274017, mailed Oct. 24, 2025. 3 pages.

Japan Patent Office. Office Action for corresponding application JP 2024-568985, mailed Feb. 3, 2026. 8 pages. English machine translation provided.

Taiwan Intellectual Property Office. Office Action for corresponding application TW 114112665, mailed Sep. 8, 2025. 6 pages. Brief English translation provided.

* cited by examiner

CHILD SAFETY SEAT AND SAFETY BELT MOUNTING PROMPT SYSTEM AND METHOD

CROSS-REFERENCES TO RELATED APPLICATIONS

This application is a U.S. National Phase Application under 35 U.S.C. § 371 of PCT International Application No. PCT/EP2023/063618, which has an international filing date of May 22, 2023, and claims priority to Chinese Patent Application No. 202210555072.7, filed May 20, 2022, Chinese Patent Application No. 202211557539.8, filed Dec. 6, 2022, and Chinese Patent Application No. 202310088949.0, filed Feb. 6, 2023. The contents of the above identified PCT international application and Chinese patent applications are hereby incorporated in their entireties by reference for all purposes.

TECHNICAL FIELD

The present disclosure relates to the field of child product technologies, and in particular, to a child safety seat, a safety belt mounting prompt system, and a safety belt mounting prompt method.

BACKGROUND

Child safety seats are generally provided with a side impact protection block that is installed near a vehicle door. When a vehicle collides, the side impact protection block can buffer a side impact, which improves safety of the child safety seat. In order to reduce manufacturing costs and facilitate transportation, the side impact protection block is designed to be detachable. In use, a user is required to mount the side impact protection block on a side of the child safety seat close to the vehicle door. However, in actual use, the user may forget to mount the side impact protection block (missing mounting). Alternatively, after the side impact protection block is mounted, a use mode of the child safety seat (e.g., a forward-facing use mode and a rearward-facing use mode) changes, and the user forgets to adjust a mounting position of the side impact protection block in time (incorrect mounting). As a result, in the case of a collision, the side impact protection block cannot perform its due function, leading to a reduction in the safety of the child safety seat.

Further, most child safety seats can be rotated as required, so as to switch between the forward-facing use mode and the rearward-facing use mode. Younger children, such as those under 15 months, are required to adopt the rearward-facing use mode to maximize their safety. However, most of the child safety seats currently available on the market are difficult to effectively prevent misuse.

Further, a child safety seat is an apparatus designed for children of different weights or ages. Children are restrained in the child safety seats during the riding, so that in the case of a vehicle collision or sudden deceleration, an impact force on the children can be reduced, and movement of bodies of the children can be limited, thereby reducing injuries to them and effectively improving safety of children riding.

The child safety seat and the child seated therein are generally secured together on the vehicle seat by a safety belt of the vehicle to ensure stability of the child safety seat and safety of the child. However, if the user does not fix the child safety seat through the safety belt of the vehicle due to negligence of the user, the safety of the child will be put at risk.

SUMMARY

According to an aspect of the present disclosure, a child safety seat is provided, including a seat body and a seat base. The seat body is rotatably mounted on the seat base, and the seat body is rotatable between a forward-facing use mode and a rearward-facing use mode.

In an embodiment, the child safety seat further includes at least one side impact protection block mounting position and a safety prompt system. The safety prompt system includes: a side impact protection block, a first detection apparatus, a first control module, and a first indication apparatus. The side impact protection block is detachably mounted at the side impact protection block mounting position. The first detection apparatus is arranged in the child safety seat and arranged near the side impact protection block mounting position and is configured to detect whether the side impact protection block is mounted at the side impact protection block mounting position and send a first detection signal indicating a detection result. The first control module is arranged in the child safety seat and communicably connected to the first detection apparatus. The first control module is configured to at least receive the first detection signal and configured to send a control signal based on the first detection signal. The first indication apparatus is communicably connected to the first control module and is configured to receive the control signal and send reminder information based on the control signal.

In an embodiment, the seat base includes: a second mounting seat; a turntable rotatably arranged on the second mounting seat; a fifth detection apparatus configured to detect a position of the turntable and output a detection signal based on the position of the turntable; and a second control module in a communication connection with the fifth detection apparatus. The second control module is configured to receive a child attribute and the detection signal of the fifth detection apparatus, judge whether the child attribute matches the detection signal of the fifth detection apparatus and output a matching signal.

According to another aspect of the present disclosure, a safety belt mounting prompt system is provided. The safety belt mounting prompt system is applied to the child safety seat and includes: a safety belt detection apparatus, a seating detection apparatus, and a third control module. The safety belt detection apparatus is configured to detect whether a safety belt passes through a safety belt path of the child safety seat and send a corresponding first signal to the third control module; the seating detection apparatus is configured to detect whether a target object is seated on the child safety seat and send a corresponding second signal to the third control module; the third control module is configured to receive the first signal and the second signal, the first signal and the second signal being used to generate a prompt signal.

According to another aspect of the present disclosure, a safety belt mounting prompt method is provided. The safety belt mounting prompt method includes: detecting whether a safety belt passes through a safety belt path of a child safety seat; detecting whether a target object is seated on the child safety seat; and generating a prompt signal when detecting that a target object is seated on the child safety seat and not detecting that a safety belt passes through the safety belt path.

According to another aspect of the present disclosure, a safety belt mounting prompt method is provided. The safety belt mounting prompt method includes: detecting whether a safety belt passes through a safety belt path of a child safety seat; detecting whether a target object is seated on the child safety seat; detecting whether a use mode of the child safety seat is a forward-facing use mode; detecting whether a support leg of the child safety seat is folded; and generating a prompt signal when detecting that a target object is seated on the child safety seat, detecting that the use mode of the child safety seat is the forward-facing use mode, detecting that the support leg is folded, and not detecting that a safety belt passes through the safety belt path.

BRIEF DESCRIPTION OF THE DRAWINGS

The foregoing objectives, other objectives, features, and advantages of the present disclosure will be clearer through a more specific description of preferred embodiments of the present disclosure shown in the accompanying drawings. In all the accompanying drawings, a same reference numeral denotes a same part. The drawings are not deliberately drawn to scale according to an actual size, and a focus lies in highlighting the subject of the present disclosure.

Other features, objectives, and advantages of the present disclosure will become more apparent by reading the detailed description of non-limiting embodiments made with reference to the following drawings.

REFERENCE SIGNS

Figure 1:
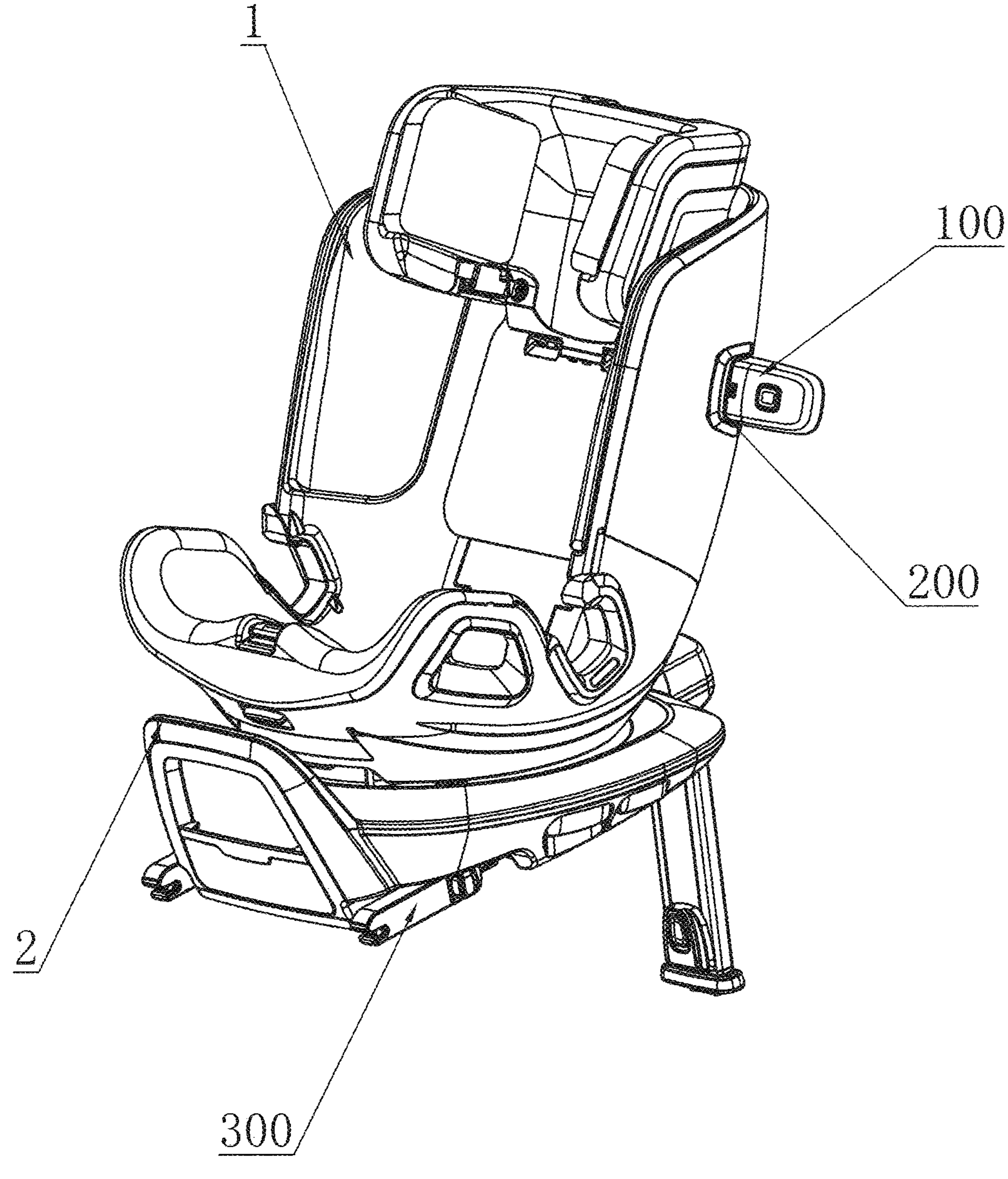
FIG. 1 is a perspective view of a child carrier according to an embodiment of the present disclosure.

1. seat body, 2. seat base, 3. mobile terminal, 10. safety prompt system, 100. side impact protection block, 101. shell, 1011. first side of the shell 101, 1012. second side of the shell 101, 102. first locking mechanism, 1021. first hook portion, 1022. second hook portion, 1023. first elastic member, 10210. hook portion of the first hook portion 1021, 10220. hook portion of the second hook portion 1022, 103. unlocking portion, 110. first detection apparatus, 111. sensitive assembly, 1110. step surface, 1111. sensitive sheet, 112. first sensing apparatus, 1121. detection groove, 113. third elastic member, 120. first control module, 130. first indication apparatus, 131. display screen, 132. input interface, 140. second detection apparatus, 150. third detection apparatus, 160. fourth detection apparatus, 200. side impact protection block mounting position, 201. decorative cover, 2010. cover body, 2011. third hook portion, 2012. fourth hook portion, 2013. third locking mechanism, 202. second locking mechanism, 2021. first slot, 2022. second slot, 203. first mounting seat, 203*h*. opening, 204. second elastic member, 210. seat housing, 2101. mounting hole, 300. isofix connector, 400. fifth detection apparatus, 410. detector, 420. second sensing apparatus, 421. first sensor, 421*a*. first transmitting end, 421*b*. first receiving end, 422. second sensor, 422*a*. second transmitting end, 422*b*. second receiving end, 50. second control module, 60. second indication apparatus, 70. input mechanism, 800. fourth locking mechanism, 810. locking assembly, 811. locking member, 812. first locking hole, 813. second locking hole, 814. second reset member, 820. first operating assembly, 821. first operating member, 821*a*. abutting rib, 822. first reset member, 830. linkage assembly, 831. linkage member, 831*a*. first end, 831*b*. second end, 831*c*. third end, 831*d*. strip groove, 832. pressing member, 832*a*. boss portion, 832*b*. sleeving portion, 833. third reset member, 834. first pushing member, 834*a*. third sliding guide post, 835. second pushing member, 835*a*. fourth sliding guide post, 836. connecting member, 837. fixed seat, 837*a*. driving chute, 840. second operating assembly, 841. second operating member, 842. driving member, 842*a*. sliding chute, 843. actuating member, 843*a*. sliding guide post, 844. first traction member, 844*a*. first engaging protrusion, 844*b*. second engaging protrusion, 845. first driving member, 845*a*. first sliding chute, 846. second driving member, 846*a*. second sliding chute, 847. first actuating member, 847*a*. first sliding guide post, 848. second actuating member, 848*a*. second sliding guide post, 850. third operating assembly, 851. third operating member, 852. third traction member, 853. third driving member, 853*a*. third sliding chute, 854. fourth driving member, 854*a*. fourth sliding chute, 857. driving reset member, 4. power switch, 401. second mounting seat, 402. turntable, 403. rotating upper cover, 404. rotating lower cover, 405. mounting receptacle, 406. mounting rib, 407. reinforcing iron sheet, 408. accommodating cavity, 409. rotation center, 501. seat belt detection apparatus, 502. seating detection apparatus, 503. third control module, 504. sixth detection apparatus, 505. support leg detection apparatus, 701. seat portion, 702. backrest portion, 703. headrest portion, 704. junction, 705. guide, 706. seating detection apparatus, 7061. pressure sensor, 308. support leg, 1101. detection switch, 1102 detection sheet, 1103. third sensor.

DETAILED DESCRIPTION OF THE EMBODIMENTS

To facilitate understanding of the present disclosure, a more comprehensive description of the present disclosure will be given below with reference to the relevant accompanying drawings. Preferred embodiments of the present disclosure are given in the drawings. However, the present disclosure may be implemented in many different forms and is not limited to the embodiments described herein. Rather, these embodiments are provided to make the contents disclosed in the present disclosure more fully understood.

It should be noted that when one element is referred to as "fixed to" another element, it may be directly disposed on the another element or an intermediate element may exist. When one element is considered to be "connected to" another element, it may be directly connected to the another element or an intermediate element may co-exist. The terms "mount", "an end", "the other end" and similar expressions used herein are for illustrative purposes only. The terms "vertical", "horizontal", "left", "right" and similar expressions used herein are for illustrative purposes only, and do not represent unique implementations. The term "and/or" used herein includes any and all combinations of one or more related listed items.

Unless defined otherwise, all technical and scientific terms used herein have the same meanings as would generally understood by those skilled in the technical field of the present disclosure. The terms used herein in the specification of the present disclosure are for the purpose of describing specific embodiments only, and are not intended to limit the present disclosure.

Figure 2:
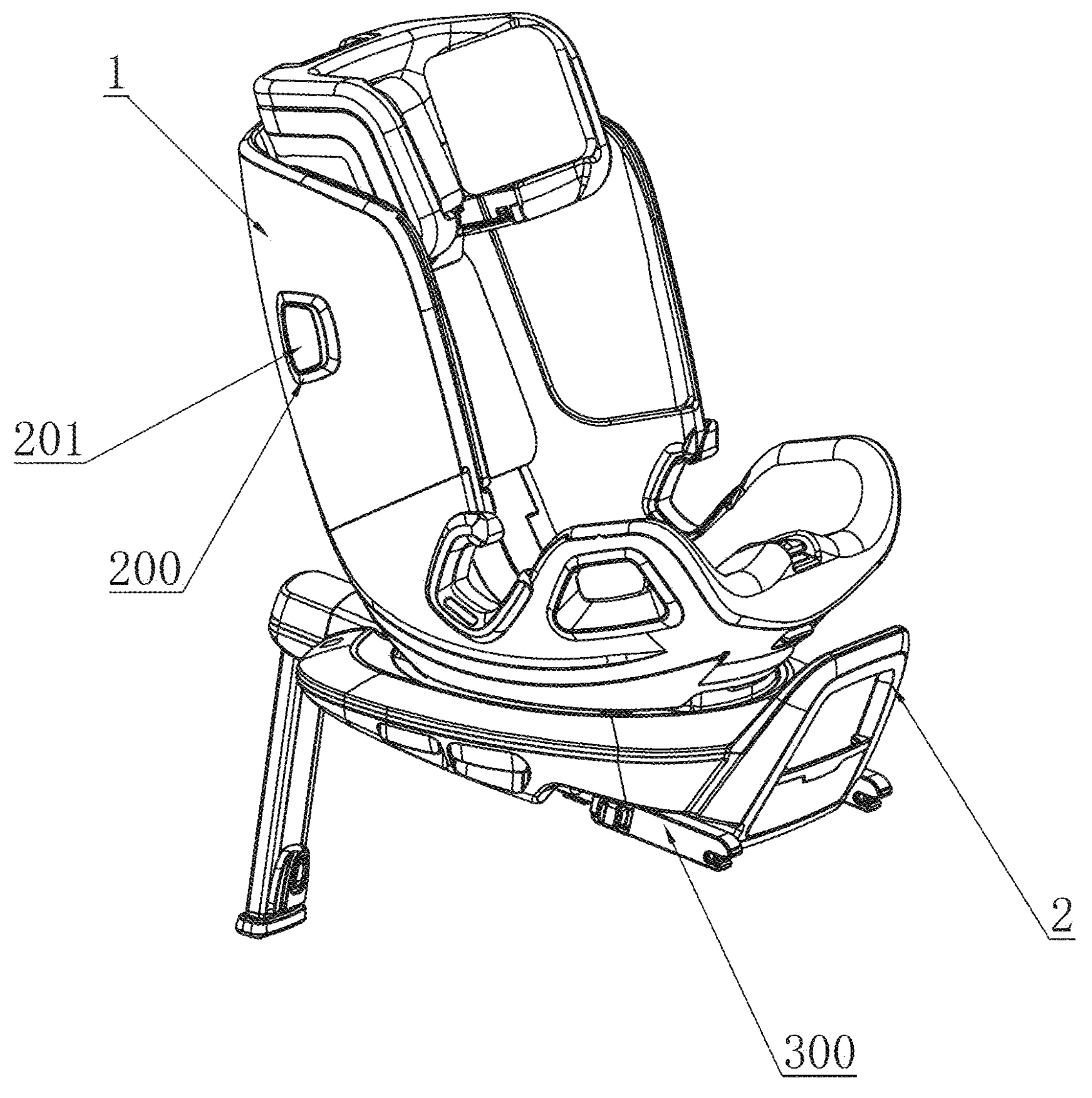
FIG. 2 is a perspective view of the child carrier of FIG. 1 at another viewing angle.

Referring to FIG. 1 and FIG. 2, FIG. 1 and FIG. 2 show a child carrier, such as a child safety seat, according to an embodiment of the present disclosure at different viewing angles. The child safety seat includes a seat body 1 and a seat base 2. The seat body 1 is pivotally connected with the seat base 2, so that a use mode of the seat body 1 can be changed. Specifically, the seat body 1 can switch between a forward-facing use mode and a rearward-facing use mode. Two sides of the seat body 1 are each provided with a side impact protection block mounting position 200 for detachably mounting a side impact protection block 100. It is to be noted that, although FIG. 1 shows the side impact protection block 100 mounted on the right side of the seat, this is only exemplary, and the user may mount the side impact protection block at either side impact protection block mounting position 200 according to a use requirement.

Figure 3:
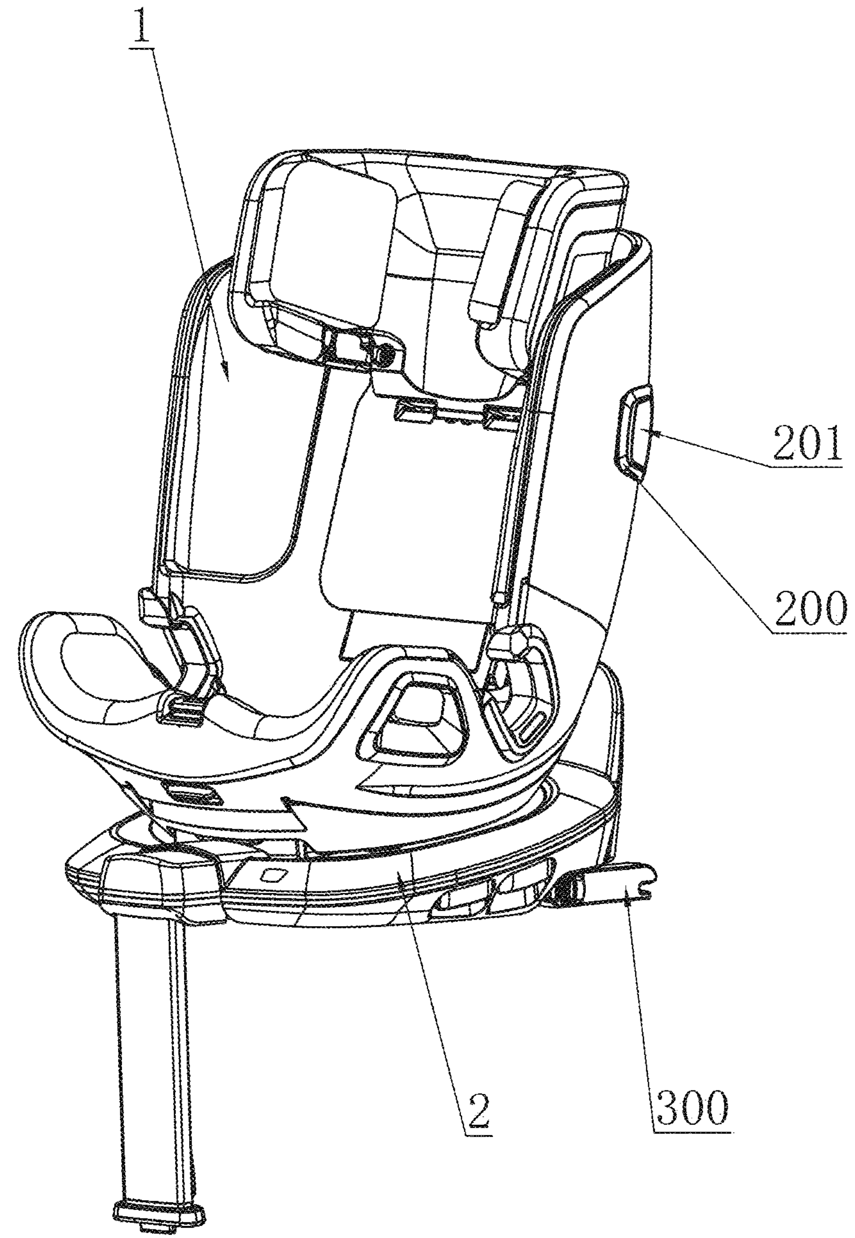
FIG. 3 is a perspective view of the child carrier of FIG. 1 with an use mode adjusted.

The seat base 2 includes an International Standards Organization FIX (isofix) connector 300 used to be engaged with and connected to an isofix interface on a vehicle seat, so as to fixedly connect the child safety seat to the vehicle seat. Optionally, the seat base 2 may alternatively use other types of connectors or interfaces, provided that they can be fixedly connected to a mating interface or connector on the vehicle seat, which is not limited in the present disclosure. FIG. 3 shows the child safety seat in FIG. 1 with a changed use mode, for example, the child safety seat switched from a rearward-facing use mode to a forward-facing use mode, and vice versa.

In the embodiment shown in FIG. 1 to FIG. 3, since the side impact protection block 100 is detachably mounted to the side impact protection block mounting position 200, there is a risk that the user forgets to mount the side impact protection block 100 (missing mounting). Further, even if the side impact protection block 100 is mounted, there is also a risk of forgetting to adjust a mounting position of the side impact protection block 100 (incorrect mounting) after the use mode of the seat body 1 changes.

Figure 4:
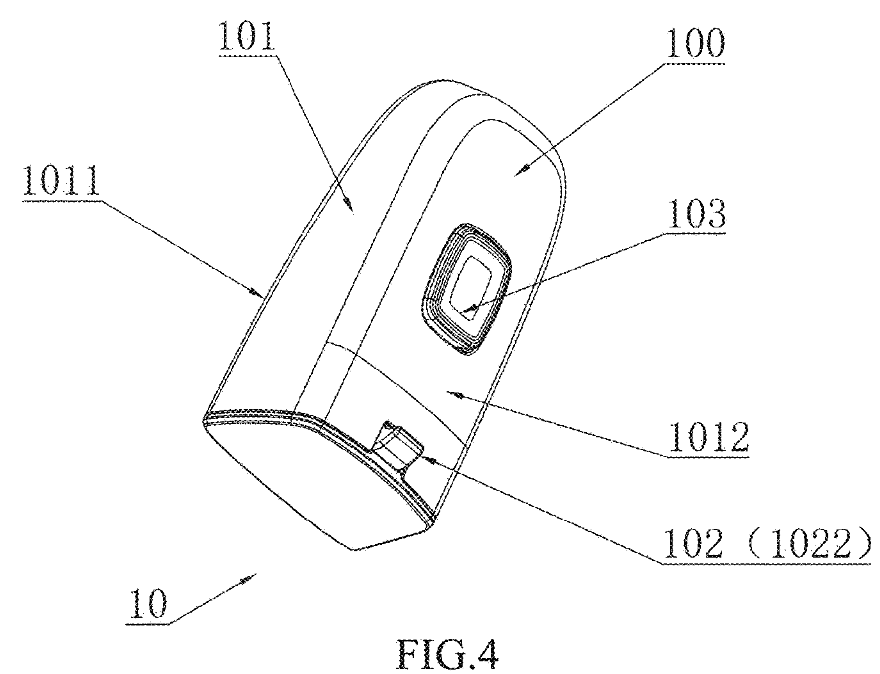
FIG. 4 is a perspective view of a side impact protection block according to an embodiment of the present disclosure.
Figure 5:
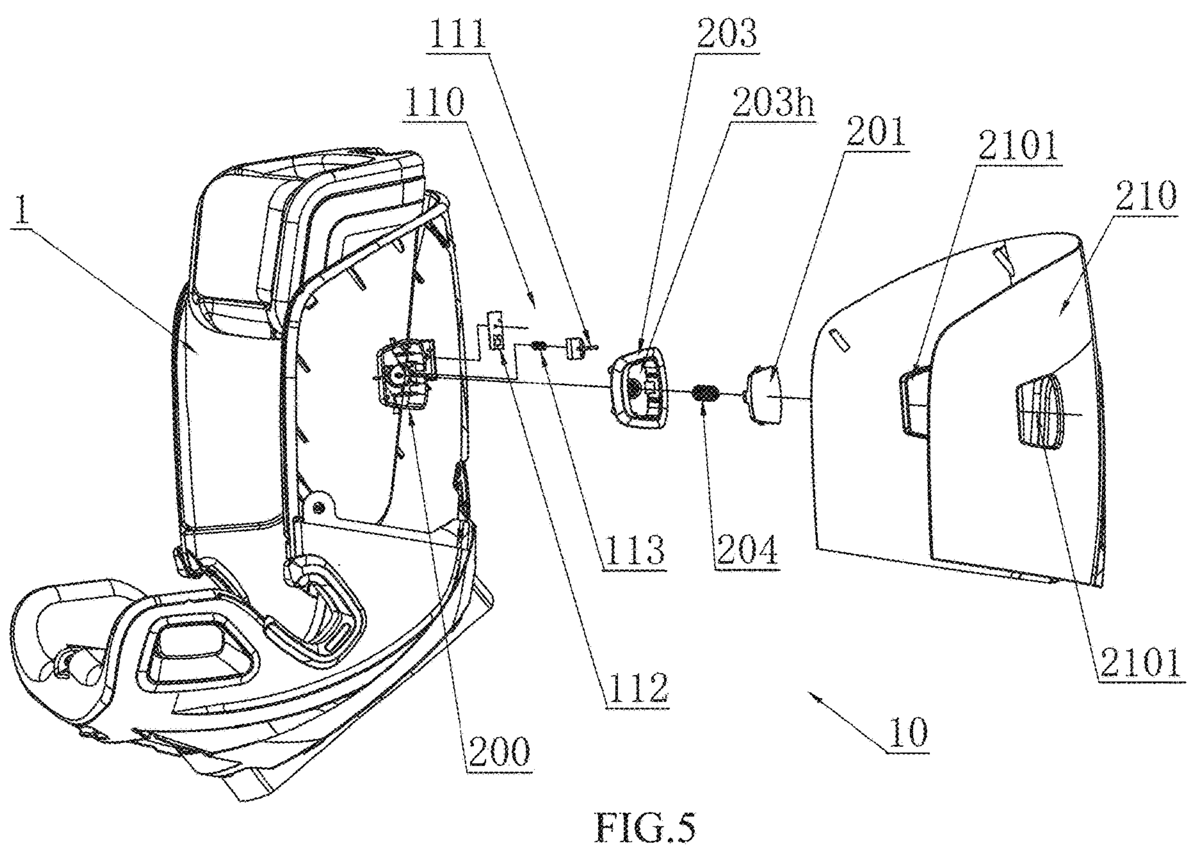
FIG. 5 is a partial exploded view of the child carrier according to an embodiment of the present disclosure.
Figure 13:
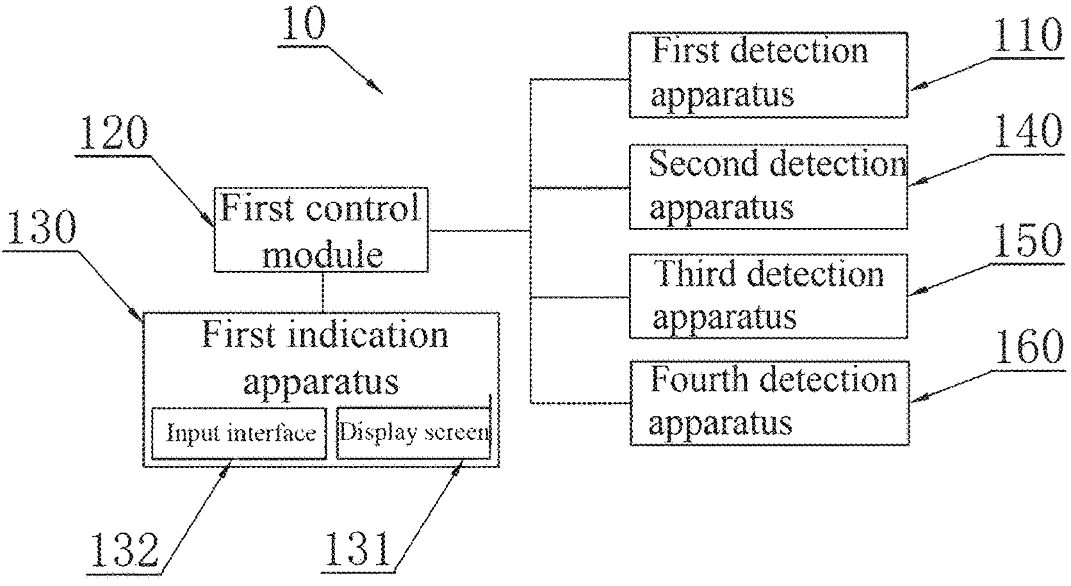
FIG. 13 is a functional block diagram of a safety prompt system according to an embodiment of the present disclosure.

Referring to FIG. 4, FIG. 5, and FIG. 13 together, a safety prompt system 10 is provided according to an embodiment of the present disclosure. The safety prompt system 10 includes at least: a side impact protection block 100, a first detection apparatus 110, a first control module 120 (as shown in FIG. 13), and a first indication apparatus 130 (as shown in FIG. 13). The child safety seat has an opening 203*h* at the side impact protection block mounting position 200. Further, the opening 203*h* is located on an outer side of the seat body 1. In addition, the seat body 1 of this embodiment includes a seat housing 210 and a first mounting seat 203. The opening 203*h* is defined by the first mounting seat 203. The seat housing 210 is provided with a mounting hole 2101. The first mounting seat 203 is arranged in the mounting hole 2101 and used to receive the side impact protection block 100. Therefore, the side impact protection block 100 is detachably mounted at the side impact protection block mounting position 200.

As shown in FIG. 4, the side impact protection block 100 includes a shell 101, a first locking mechanism 102, and an unlocking portion 103. The shell 101 defines an accommodation space. The first locking mechanism 102 partially protrudes from the shell 101, so that the side impact protection block 100 can be locked at the side impact protection block mounting position 200. The unlocking portion 103 is partially arranged in the accommodation space of the shell 101, and may be exposed to a first side 1011 or a second side 1012 of the shell 101. In this embodiment, the unlocking portion 103 is exposed to the first side 1011 of the shell 101. The unlocking portion 103 is configured to unlock the first locking mechanism 102 in the side impact protection block mounting position 200. Optionally, the unlocking portion 103 is a button portion.

As shown in FIG. 5, the first detection apparatus 110 may be arranged in the child safety seat 1 and arranged near the side impact protection block mounting position 200, and configured to detect whether the side impact protection block 100 is mounted at the side impact protection block mounting position 200 and send a first detection signal indicating a detection result. In an embodiment, two first detection apparatuses 110 may be provided, which are respectively arranged near the side impact protection block mounting positions 200 on two sides of the seat body 1.

Figure 6:
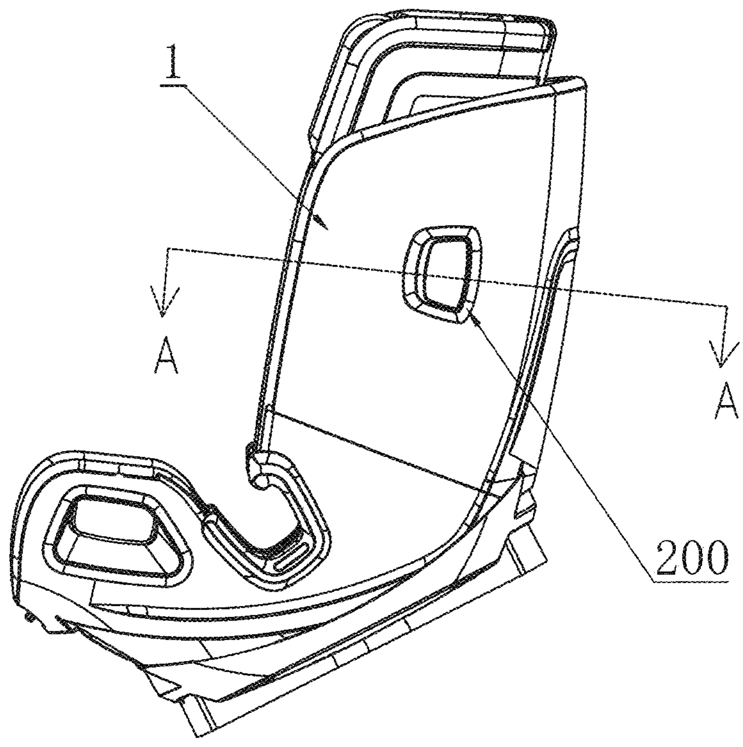
FIG. 6 is a side view of a seat body according to an embodiment of the present disclosure.
Figure 7:
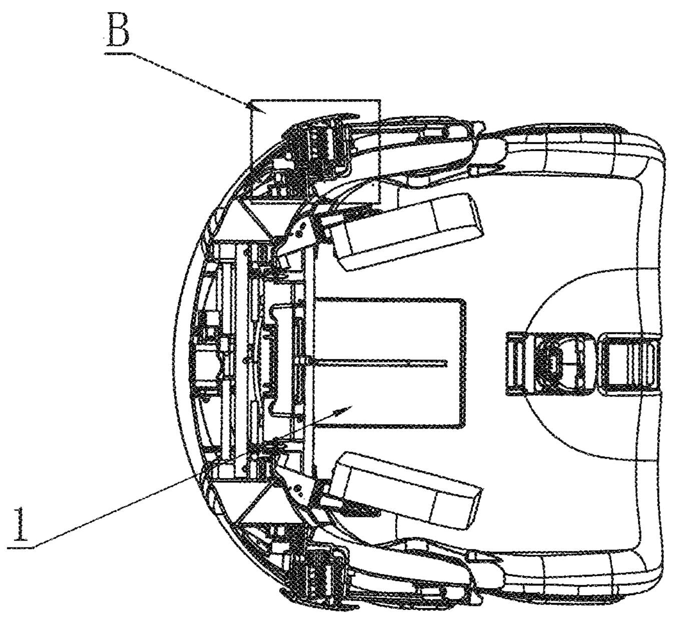
FIG. 7 is a sectional view taken along a line A-A in FIG. 6.
Figure 8:
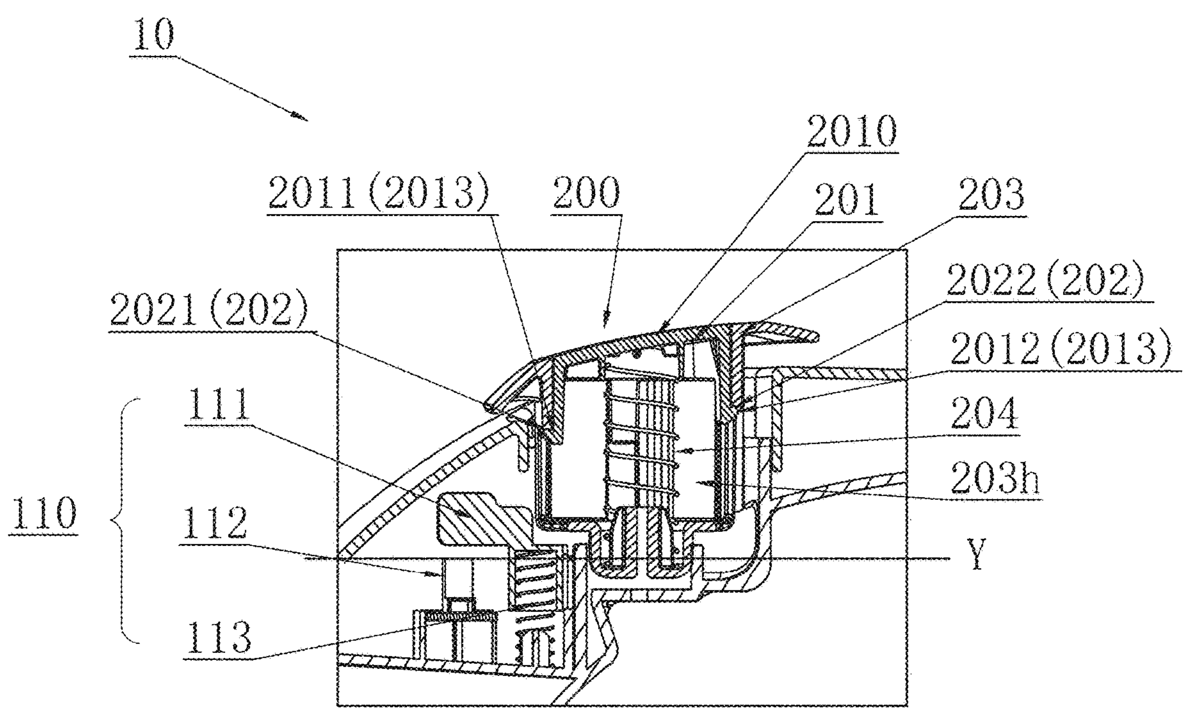
FIG. 8 is an enlarged view of a portion B in FIG. 7.

Referring to FIG. 6 to FIG. 8 together, FIG. 6 to FIG. 8 show an internal structure of the side impact protection block mounting position 200 and a specific structure of the first detection apparatus 110. In an embodiment according to the present disclosure, the child safety seat includes a decorative cover 201 and a second locking mechanism 202 that are arranged at the side impact protection block mounting position 200. The decorative cover 201 is movably arranged at the side impact protection block mounting position 200, and covers the opening 203*h*. Specifically, in this embodiment, the decorative cover 201 is movably arranged in the opening 203*h* of the first mounting seat 203, and the second locking mechanism 202 is arranged in the first mounting seat 203, but the present disclosure is not limited thereto. In another embodiment, the child safety seat may alternatively not have the first mounting seat 203, but the opening 203*h* is defined on a seat body 1.

The decorative cover 201 includes a cover body 2010 and a third locking mechanism 2013. The third locking mechanism 2013 is arranged on the cover body 2010, and extends from a lower surface of the cover body 2010 toward the bottom of the opening 203*h*. In this embodiment, a second elastic member 204 is further arranged in the opening 203*h*. The second elastic member 204 constantly exerts a pushing force on the decorative cover 201, so that the decorative cover 201 constantly has a tendency to move away from the bottom of the opening 203*h*. In this embodiment, the second elastic member 204 is a spring. One end of the spring is connected to the lower surface of the cover body 2010, and the other end of the spring is connected to the bottom of the opening 203*h*, so as to constantly exert a pushing force on the decorative cover 201, so that the decorative cover 201 constantly has a tendency to move away from the bottom of the opening 203*h*. Optionally, the second elastic member 204 may be another elastic assembly, such as a torsion spring or an elastic piece, which is not limited in the present disclosure.

Further, a second locking mechanism 202 is arranged on an inner wall of the opening 203*h* (or the first mounting seat 203). The second locking mechanism 202 can be fitted and locked with the third locking mechanism 2013 to limit a moving stroke of the decorative cover 201 in a direction away from the bottom of the opening 203*h*, so that the decorative cover 201 cannot continuously move in the direction away from the bottom of the opening 203*h*. Specifically, in this embodiment, the second locking mechanism 202 includes a first slot 2021 and a second slot 2022, and the third locking mechanism 2013 includes a third hook portion 2011 and a fourth hook portion 2012. When the decorative cover 201 slides to a position in the direction away from the bottom of the opening 203*h* under a pushing force of the second elastic member 204 which is, for example, a spring, the third hook portion 2011 and the fourth hook portion 2012 enter the first slot 2021 and the second slot 2022 respectively. In this way, the third hook portion 2011 and the fourth hook portion 2012 are engaged and locked with the first slot 2021 and the second slot 2022 respectively, so that the decoration cover 201 cannot continuously slide in the direction away from the bottom of the opening 203*h*. In this case, the decorative cover 201 can cover the opening 203*h* completely, and is at a closed position.

Shapes of the third hook portion 2011 and the fourth hook portion 2012 are designed such that, when the third hook portion 2011 and the fourth hook portion 2012 are engaged and locked with the first slot 2021 and the second slot 2022 respectively, the decoration cover 201 is prevented from continuously sliding in the direction away from the bottom of the opening 203*h*, but the decorative cover 201 is allowed to slide in a direction close to the bottom of the opening 203*h*. That is, if an external force capable of overcoming an elastic force of the second elastic member 204 is exerted on the decorative cover 201, the third hook portion 2011 and the fourth hook portion 2012 can be easily disengaged from the first slot 2021 and the second slot 2022 respectively, thereby releasing engagement and locking with the first slot 2021 and the second slot 2022.

Still referring to FIG. 8, the first detection apparatus 110 includes: a sensitive assembly 111, a first sensing apparatus 112, and a third elastic member 113. The sensitive assembly 111 can move back and forth between a non-detect position P1 and a detect position P2. The decorative cover 201, when moving toward the bottom of the opening 203*h*, can press against the sensitive assembly 111 from the non-detect position P1 to the detect position P2. The first sensing apparatus 112 is arranged near the sensitive assembly 111. When the sensitive assembly 111 is at the detect position P2, the first sensing apparatus 112 can detect the sensitive assembly 111 and send the first detection signal, which will be further described below with reference to FIG. 10 to FIG. 12. The third elastic member 113 constantly exerts a pushing force on the sensitive assembly 111, so that the sensitive assembly 111 constantly has a tendency to move away from the detect position P2 to the non-detect position P1. In this embodiment, the first sensing apparatus 112 is a photoelectric sensing apparatus, for example a photoelectric sensor, and has a transmitting end and a receiving end. The sensitive assembly 111 may be used as a blocking piece or may be a plastic assembly. Optionally, other suitable assemblies and sensing apparatuses may alternatively be selected as the sensitive assembly 111 and the first sensing apparatus 112. For example, the sensitive assembly 111 may be a metal assembly, a magnetic assembly, or the like, and the first sensing apparatus 112 may be a metal sensing apparatus, a magnetic detector, or the like, which is not limited in the present disclosure. In FIG. 8, the decorative cover 201 is at a closed position and has not been in contact with the sensitive assembly 111, so the sensitive assembly 111 is at the non-detect position P1 under the action of the third elastic member 113. Optionally, the third elastic member 113 may be a spring, a torsion spring, an elastic piece, or the like. Preferably, the third elastic member 113 is a spring.

Figure 9:
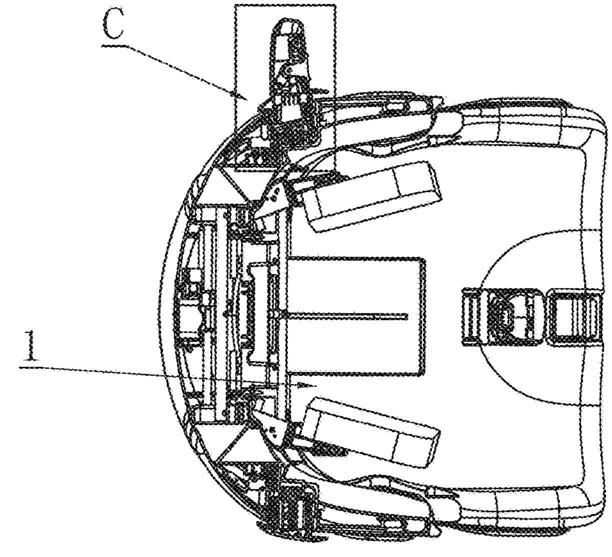
FIG. 9 is a sectional view taken in a same manner as that in FIG. 7, with a side impact protection block mounted.
Figure 10:
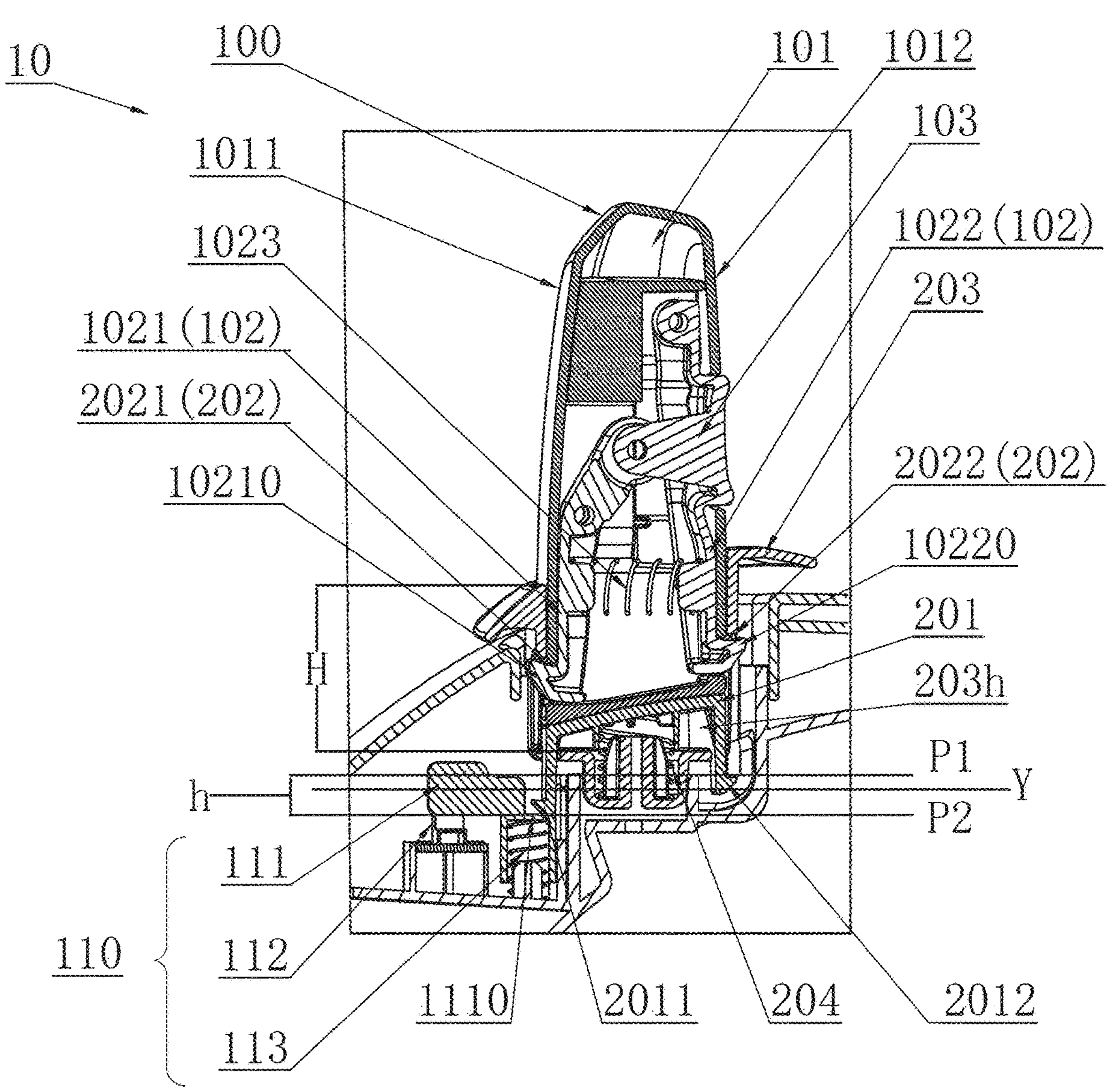
FIG. 10 is an enlarged view of a portion C in FIG. 9.

Referring to FIG. 9 and FIG. 10 together, FIG. 9 and FIG. 10 show a state of the side impact protection block 100 mounted at the side impact protection block mounting position 200. In this embodiment, the first locking mechanism 102 of the side impact protection block 100 includes a first hook portion 1021, a second hook portion 1022, and a first elastic member 1023. The first hook portion 1021 and the second hook portion 1022 at least partially protrude from different sides of the shell 101.

Specifically, in this embodiment, the first hook portion 1021 is at least partially arranged in the accommodation space of the shell 101 and can protrude from the first side 1011 of the shell 101. The second hook portion 1022 is at least partially arranged in the accommodation space of the shell 101 and can protrude from the second side 1012 of the shell 101 opposite to the first side 1011. In addition, the first hook portion 1021 and the second hook portion 1022 are pivotally arranged in the shell 101.

The first elastic member 1023 is arranged in the accommodation space of the shell 101 and connected between the first hook portion 1021 and the second hook portion 1022, and the first elastic member 1023 constantly causes the first hook portion 1021 and the second hook portion 1022 to have a tendency to move away from each other. That is, the first elastic member 1023 biases the first hook portion 1021 to protrude from the first side 1011 and biases the second hook portion 1022 to protrude from the second side 1012. When the side impact protection block 100 is mounted, the user presses the decorative cover 201 through the side impact protection block 100 to overcome the pushing force of the second elastic member 204. In this case, the third hook portion 2011 and the fourth hook portion 2012 can be disengaged from the first slot 2021 and the second slot 2022 respectively, and the decoration cover 201 thus slides toward the direction close to the bottom of the opening 203*h*.

When the side impact protection block 100 enters the opening 203*h* and is locked, mounting of the side impact protection block 100 is completed: when the first hook portion 1021 and the second hook portion 1022 are respectively at a same height as the first slot 2021 and the second slot 2022, under the action of the first elastic member 1023, the first hook portion 1021 and the second hook portion 1022 protrude from the first side 1011 and the second side 1012 respectively and enter the first slot 2021 and the second slot 2022 respectively, thereby being engaged and locked with the first slot 2021 and the second slot 2022 respectively. In this case, the side impact protection block 100 can neither continuously move toward the bottom of the opening 203*h* nor move away from the bottom of the opening 203*h*. That is, the side impact protection block 100 is fixed in the opening 203*h* of the side impact protection block mounting position 200. In this embodiment, the first elastic member 1023 is a spring. Optionally, the second elastic member 1023 may be another elastic assembly, for example, a torsion spring, an elastic piece, or the like, which is not limited in the present disclosure.

Still referring to FIG. 10, in this embodiment, the unlocking portion 103 is a button portion. The unlocking portion 103 may be connected to one of the first hook portion 1021 and the second hook portion 1022, and the unlocking portion 103 is further connected (for example, pivotably connected, slidably connected, or abut against and contact) to the other of the first hook portion 1021 and the second hook portion 1022, so as to drive the first hook portion 1021 and the second hook portion 1022 to synchronously move when the unlocking portion 103 is operated.

Further, in this embodiment, the button portion is at least partially arranged in the shell 101, and arranged on the second side 1012 of the shell 101. The button portion is connected to the second hook portion 1022. Preferably, the button portion is integrally formed with the second hook portion 1022, and the button portion is further pivotally connected to the first hook portion 1021. As shown in FIG. 10, a position where the button portion is connected to the first hook portion 1021 and the hook portion 10210 of the first hook portion 1021 are respectively located on opposite sides of a pivot shaft of the first hook portion 1021. A position where the button portion is connected to the second hook portion 1022 and the hook portion 10220 of the second hook portion 1022 are respectively located on a same side of a pivot shaft of the second hook portion 1022. In this way, when an external force is exerted on the unlocking portion 103 which is, for example, a button portion, for example, when the unlocking portion 103 is pressed, the unlocking portion 103 may drive the first hook portion 1021 and the second hook portion 1022 to move synchronously, for example, pivot or translate, so that the hook portions 10210 and 10220 of the two are close to each other.

Specifically, in a case where the side impact protection block 100 is fixedly connected in the opening 203*h* (as shown in FIG. 10), when the button portion is pressed toward the inside of the shell 101, the second hook portion 1022 can be retracted toward the inside of the shell 101 synchronously with the button portion, so that the second hook portion 1022 no longer protrudes from the second side 1012 and is disengaged from the second slot 2022. At the same time, the first hook portion 1021 can pivot along with the retraction of the button portion, so that the first hook portion 1021 no longer protrudes from the first side 1011 and is disengaged from the first slot 2021. In this way, the button portion is pressed so that the first hook portion 1021 and the second hook portion 1022 are disengaged from the first slot 2021 and the second slot 2022 respectively. Therefore, the fixed connection of the side impact protection block 100 in the opening 203*h* of the side impact protection block mounting position 200 is released, so that the side impact protection block 100 can be disassembled from the side impact protection block mounting position 200.

Optionally, the unlocking portion 103 may be arranged on the first side 1011. In this case, the first hook portion 1021 and the second hook portion 1022 may be arranged in an opposite manner. Specifically, the button portion is at least partially arranged in the shell 101, and arranged on the first side 1011 of the shell 101. The button portion is rigidly connected to the first hook portion 1021. Preferably, the button portion is integrally formed with the first hook portion 1021, and the button portion is further pivotally connected to the second hook portion 1022. In a case where the side impact protection block 100 is fixedly connected in the opening 203*h* (as shown in FIG. 10), when the button portion is pressed toward the inside of the shell 101, the first hook portion 1021 can be retracted toward the inside of the shell 101 synchronously with the button portion, so that the first hook portion 1021 no longer protrudes from the first side 1011 and is disengaged from the first slot 2021. At the same time, the second hook portion 1022 can pivot along with the retraction of the button portion, so that the second hook portion 1022 no longer protrudes from the second side 1012 and is disengaged from the second slot 2022. In this way, the button portion is pressed so that the first hook portion 1021 and the second hook portion 1022 are disengaged from the first slot 2021 and the second slot 2022 respectively. Therefore, the fixed connection of the side impact protection block 100 in the opening 203*h* of the side impact protection block mounting position 200 is released, so that the side impact protection block 100 can be disassembled from the side impact protection block mounting position 200.

In FIG. 10, the side impact protection block 100 is mounted in the opening 203*h* of the side impact protection block mounting position 200. In this case, the decorative cover 201 does not cover the opening 203*h* but is at an open position. The third hook portion 2011 and the fourth hook portion 2012 of the decorative cover 201 pass through a perforation (not labeled) at the bottom of the first mounting seat 203 and extend below the first mounting seat 203. The third hook portion 2011 may press against a step surface 1110 of the sensitive assembly 111, so that the sensitive assembly 111 overcomes an elastic force of the third elastic member 113 to move from the non-detect position P1 to the detect position P2. In this way, the first detection apparatus 112 can detect the sensitive assembly 111 and send a first detection signal.

In this embodiment, a depth H of the opening 203*h* may be greater than or equal to a distance h between the detect position P2 and the non-detect position P1. Alternatively, when the side impact protection block 100 is inserted into and mounted in the opening 203*h*, a length of an insertion portion of the side impact protection block 100 may be greater than or equal to the distance h between the detect position P2 and the non-detect position P1. In this way, after the side impact protection block 100 is inserted into the opening 203*h*, the sensitive assembly 111 can indeed be detected by the first sensing apparatus 112. In addition, false detection caused by false touch of the decorative cover 201 can also be prevented.

In another embodiment, the decorative cover 201 may alternatively not be used, but the side impact protection block 100 has a driving portion extending along a mounting direction thereof. When the side impact protection block 100 is inserted in the opening 203*h*, the side impact protection block 100 may press against the sensitive assembly 111 through the driving portion, so that the sensitive assembly 111 moves from the non-detect position P1 to the detect position P2. In such an embodiment, the length of the insertion portion of the side impact protection block 100 may be greater than or equal to the distance h between the detect position P2 and the non-detect position P1.

Figure 11:
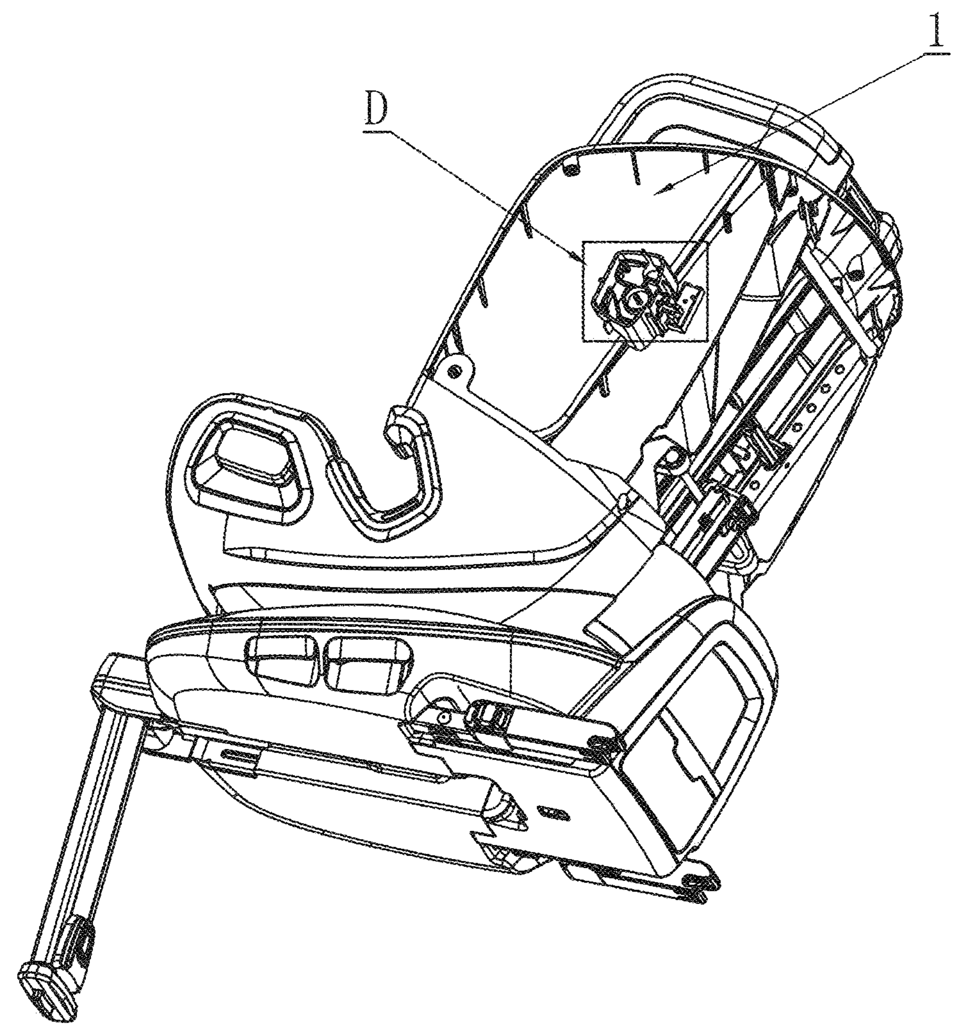
FIG. 11 is a perspective view of a viewing angle of the child carrier according to an embodiment of the present disclosure, with part of a housing of the seat part removed.
Figure 12:
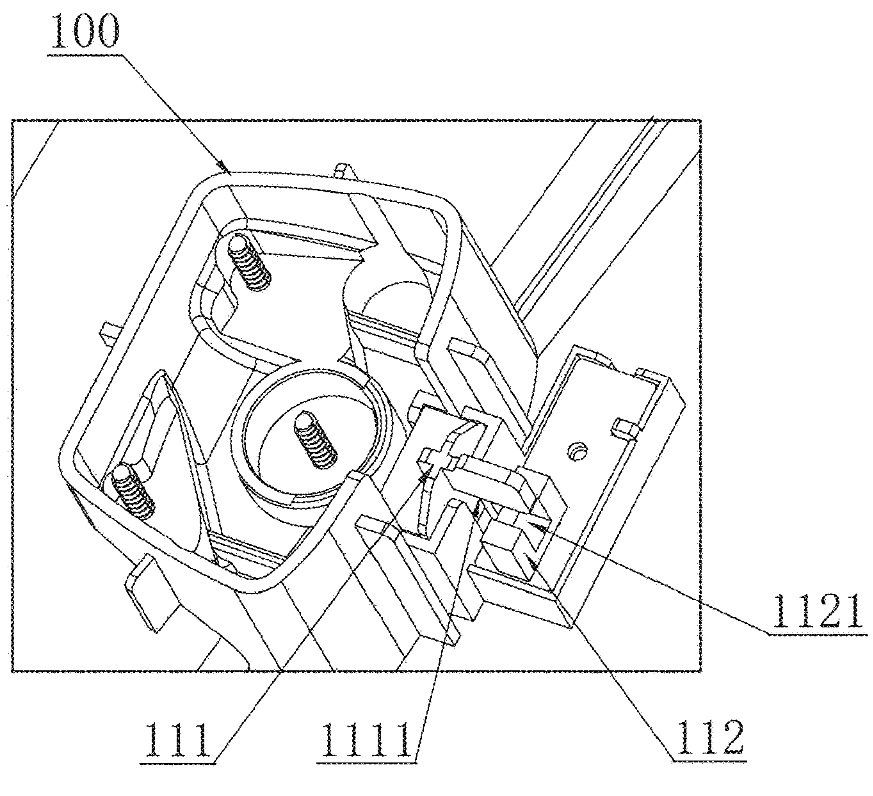
FIG. 12 is an enlarged view of a portion D in FIG. 11.

FIG. 11 and FIG. 12 show specific structures of the sensitive assembly 111 and the first sensing apparatus 112. In an embodiment, the sensitive assembly 111 includes a sensitive sheet 1111, and a detection groove 1121 is defined between the transmitting end and the receiving end of the first sensing apparatus 112. When the sensitive sheet 1111 enters the detection groove 1121, the first detection apparatus 112 detects the sensitive assembly 111 and sends a first detection signal.

Refer to FIG. 13 which is a functional block diagram of a safety prompt system according to an embodiment of the present disclosure. In an embodiment according to the present disclosure, the safety prompt system 10 includes not only the first detection apparatus 110, but also the first control module 120 and the first indication apparatus 130. As described above, the first detection apparatus 110 may be arranged in the child safety seat. A specific structure and components of the first detection apparatus 110 may be obtained with reference to the foregoing embodiment. Details are not described herein again.

The first control module 120 may be arranged in the child safety seat. In detail, the first control module 120 may be arranged in the seat body 1 or the seat base 2. Preferably, the first control module 120 is arranged in the seat base 2. The first control module 120 is, for example, a micrcontroller or a processor, which is not limited in the present disclosure. In addition, the first control module 120 is communicably connected to each first detection apparatus 110, and the first control module 120 is configured to receive the first detection signal and send a control signal.

The first indication apparatus 130 is arranged on a child safety seat 1 or outside the child safety seat and communicably connected to the first control module 120. The first indication apparatus 130 is configured to receive the control signal from the first control module 120, and send reminder information when the side impact protection block 100 is not mounted at the side impact protection block mounting position 200. Optionally, the first indication apparatus 130 at least includes at least one of the following: a buzzer, a vibrator, a display screen, a mobile phone, and a tablet computer. Preferably, the first indication apparatus 130 is mounted on a display screen 131 on the seat body 1 or the seat base 2. More preferably, the first indication apparatus 130 is a mobile phone. In this embodiment, the first indication apparatus 130 includes the display screen 131 and an input interface 132, but the present disclosure is not limited thereto.

It is to be noted that the first control module 120 may be communicably connected to the first detection apparatus 110 and the first indication apparatus 130 in a wireless or wired manner. In an embodiment, both the first control module 120 and the first indication apparatus 130 are arranged on the seat base 2, and the first control module 120 and the first indication apparatus 130 may be electrically connected through a circuit arranged in the seat base 2. In addition, a circuit electrically connected to the first detection apparatus 110 may be arranged in the seat body 1 to be electrically connected to the first control module 120. When the seat body 1 is assembled on the seat base 2, the first detection apparatus 110 may be electrically connected to the first control module 120 through the circuit arranged in the seat body 1. In addition, in an embodiment, a power supply apparatus (for example, a battery) may be arranged in in the child safety seat to supply power to the safety prompt system 10, but the present disclosure is not limited thereto. In other embodiments, the child safety seat may alternatively be electrically connected to a power supply system of the vehicle.

The display screen 131 may be configured to display the reminder information. The reminder information may be presented by at least one of text, a picture, a symbol, and an animation. The reminder information may instruct the user to enter a mounting position of the child safety seat on the vehicle through the input interface 132, for example, enter whether the child safety seat is located on a left seat of the vehicle or a right seat of the vehicle through the input interface 132. The first control module 120, after receiving mounting position information of the child safety seat through the input interface 132, may instruct, through the first indication apparatus 130 again, for example, the display screen 131, the user to mount the side impact protection block 100 at the correct side impact protection block mounting position 200. Optionally, in an embodiment, the display screen 131 is a touch display screen, and the input interface 132 may be an operation interface displayed on the display screen 131. According to a prompt on the operation interface displayed on the display screen 131, the user enters the mounting position of the child safety seat on the vehicle by a touch operation.

Optionally, the safety prompt system 10 further includes at least one second detection apparatus 140. The second detection apparatus 140 is communicably connected to the first control module 120. It is to be noted that the second detection apparatus 140 may be arranged on the isofix connector 300 of the child safety seat or the isofix interface (not shown in the figure) on the vehicle seat, and be configured to detect a connection state of the isofix connector 300 and send a second detection signal indicating the connection state.

The first control module 120 can receive the second detection signal and obtain, based on the second detection signal, whether the child safety seat has been mounted on the vehicle seat. If yes, the first control module 120 may remind, through the first indication apparatus 130, for example, through the display screen 131 arranged on the child safety seat, inputting the mounting position information of the child safety seat. In this way, the first control module 120 can judge whether the child safety seat is currently mounted on the left seat or the right seat of the vehicle, to provide a condition for the first control module 120 to subsequently correctly judge a correct mounting position of the side impact protection block.

In an embodiment according to the present disclosure, the second detection apparatus 140 is arranged on the isofix interface on the vehicle seat, and the second detection signal sent by the second detection apparatus 140 includes position information of the vehicle seat corresponding to the isofix interface. For example, if the second detection apparatus 140 is arranged on the isofix interface of the left seat of the vehicle, the second detection signal sent by the second detection apparatus 140 may indicate whether the child safety seat is connected to the left seat of the vehicle. In other words, the first control module 120 can judge, based on the second detection signal, whether the child safety seat is mounted on the left seat of the vehicle or mounted on the right seat of the vehicle. In this embodiment, there is no need to arrange the input interface 132 to input whether the child safety seat is located on the left seat of the vehicle or the right seat of the vehicle.

In other embodiments according to the present disclosure, the first indication apparatus 130 may be an electronic device outside the child safety seat, such as a mobile phone or a tablet computer. The second detection signal may alternatively be transmitted to the electronic device (the first indication apparatus 130) through a wireless apparatus. The user is instructed, through a disclosure on the electronic device, to enter whether the child carrier is currently mounted on the left seat of the vehicle or the right seat of the vehicle, so that the first control module 120 can correctly judge the mounting position of the side impact protection block 100 according to the mounting position information entered by the user.

The first indication apparatus 130 can display the current mounting position of the child safety seat, and send reminder information when the side impact protection block 100 is not mounted at the side impact protection block mounting position 200 corresponding to the current mounting position of the child carrier.

In an embodiment according to the present disclosure, the safety prompt system 10 may include a plurality of second detection apparatuses 140. The plurality of second detection apparatuses 140 may be arranged on isofix interfaces of different vehicle seats respectively. Each second detection apparatus 140 may be configured to sense a connection state of the corresponding isofix interface and send a second detection signal indicating the connection state. The first control module 120 may judge, based on the second detection signals sent by the plurality of second detection apparatuses 140, the connection states of the isofix interfaces and whether the child safety seat is mounted on the left seat or the right seat of the vehicle.

In an embodiment according to the present disclosure, the safety prompt system 10 further includes: a third detection apparatus 150. The third detection apparatus 150 is arranged in the child safety seat and communicably connected to the first control module 120. The third detection apparatus 150 is configured to detect a use mode of the child safety seat and send a third detection signal indicating the use mode. The first control module 120 can receive the third detection signal and obtain, based on the third detection signal, whether the use mode of the child safety seat is a forward-facing use mode or a rearward-facing use mode. The first control module 120 may control the first indication apparatus 130 to display a current use mode of the child safety seat, and control the first indication apparatus 130 to send reminder information when the side impact protection block 100 is not mounted at the side impact protection block mounting position 200 corresponding to the use mode.

In an embodiment according to the present disclosure, the safety prompt system 10 further includes: a fourth detection apparatus 160. The fourth detection apparatus 160 is arranged in a safety belt buckle of the child safety seat and communicably connected to the first control module 120. The fourth detection apparatus 160 is configured to detect a fastening state of the safety belt buckle and send a fourth detection signal indicating the fastening state. The first control module 120 can receive the fourth detection signal, and obtain, based on the fourth detection signal, whether the safety belt buckle is fastened. In an embodiment, the first indication apparatus 130 is controlled to send the reminder information only when the first control module 120 receives the fourth detection signal and judges that the safety belt buckle is in the fastening state. The first control module 120 does not send the control signal when the first control module 120 receives the fourth detection signal and judges that the safety belt buckle is not in the fastening state. In this case, the first indication apparatus 130 may not send the reminder information.

An operating flow of the safety prompt system 10 according to this embodiment of the present disclosure will be described in detail below.

In an embodiment, referring to FIG. 8, when the side impact protection block mounting position 200 is not provided with the side impact protection block 100, the first sensing apparatus 112 of the first detection apparatus 110 does not detect the sensitive assembly 111, the first sensing apparatus 112 sends the first detection signal to the first control module 120 to indicate "not mounted". The first control module 120 receives the first detection signal and sends the control signal to the first indication apparatus 130 to control the first indication apparatus 130 to send the reminder information. For example, the first indication apparatus 130 may be mounted on the seat body 1 and may include the display screen 131. The first control module 120 may control the first indication apparatus 130 to display prompt information on the display screen 131 to remind the user that the side impact protection block is "not mounted", or transmit a prompt to the electronic device through a wireless signal, thereby realizing a "missing mounting" reminder.

In an embodiment, the second detection apparatus 140 is arranged on the isofix connector 300 of the child safety seat. After the second detection apparatus 140 detects that the isofix connector 300 of the child safety seat is connected to the corresponding isofix interface on the vehicle seat, the second detection apparatus sends the second detection signal to the first control module 120. The first control module 120 judges, based on the second detection signal, that the child safety seat has been mounted on the vehicle seat, and controls the first indication apparatus 130, for example, the display screen 131 arranged on the child safety seat, to remind the user to enter the mounting position information of the child safety seat. Through the mounting position information of the child safety seat entered by the user, the first control module 120 judges whether the child safety seat is currently mounted on the left seat of the vehicle or the right seat of the vehicle, to provide a condition for the first control module to subsequently correctly judge a correct mounting position of the side impact protection block.

In an embodiment, the second detection apparatus 140 is arranged on the isofix interface on the vehicle seat. After the second detection apparatus detects that the isofix connector 300 of the child safety seat is connected to the corresponding isofix interface on the vehicle seat, the second detection apparatus sends the second detection signal to the first control module 120. The first control module 120 judges, based on the second detection signal, whether the child safety seat is currently mounted on the left seat of the vehicle or the right seat of the vehicle, to provide a condition for the first control module to subsequently correctly judge a correct mounting position of the side impact protection block.

In an embodiment, in a case where the first detection signal indicates "mounted", if the third detection apparatus 150 detects that the use mode of the child safety seat changes, the third detection apparatus 150 sends the third detection signal to the first control module 120 to indicate whether the current use mode of the seat is in the forward-facing use mode or the rearward-facing use mode. The first control module 120 receives the first detection signal sent by the first sensing apparatus 112 at the side impact protection block mounting position 200 corresponding to the current use mode. If the first detection signal indicates "not mounted", the first control module 120 sends the control signal to the first indication apparatus 130 to control the first indication apparatus 130 to send the reminder information. Therefore, an "incorrect mounting" reminder is realized.

In an embodiment, the fourth detection apparatus 160 detects whether the safety belt buckle is fastened and sends the fourth detection signal indicating the fastening state to the first control module 120. If the fourth detection signal indicates that the safety belt buckle is not fastened, the first control module 120 may not send a control signal of "reminder information" to the first indication apparatus 130 to realize a "do not disturb" function.

Figure 14:
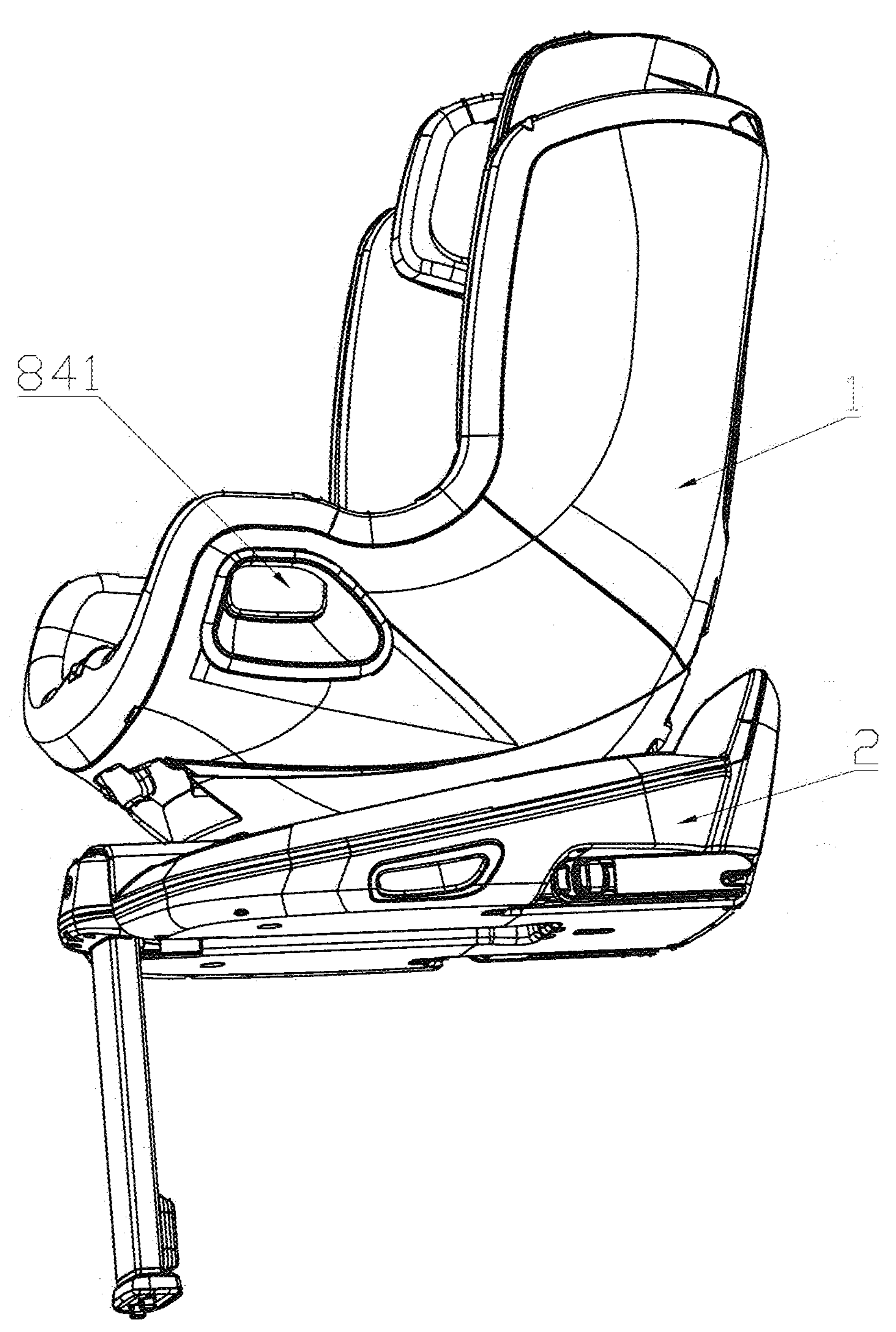
FIG. 14 is a perspective view of a child safety seat according to an embodiment of the present disclosure.
Figure 15:
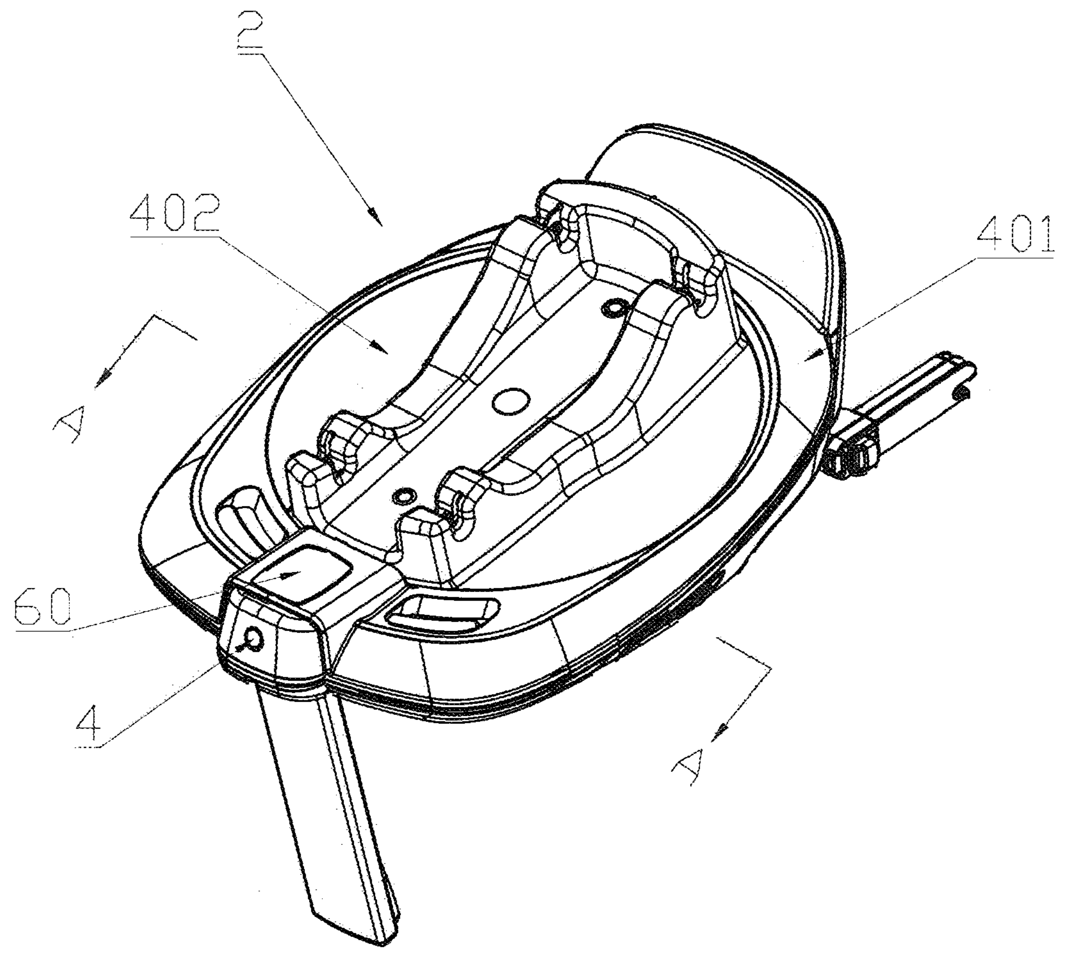
FIG. 15 is a perspective view of a seat base of the child safety seat of FIG. 14, with a turntable of the seat base at a first rotation position.
Figure 16:
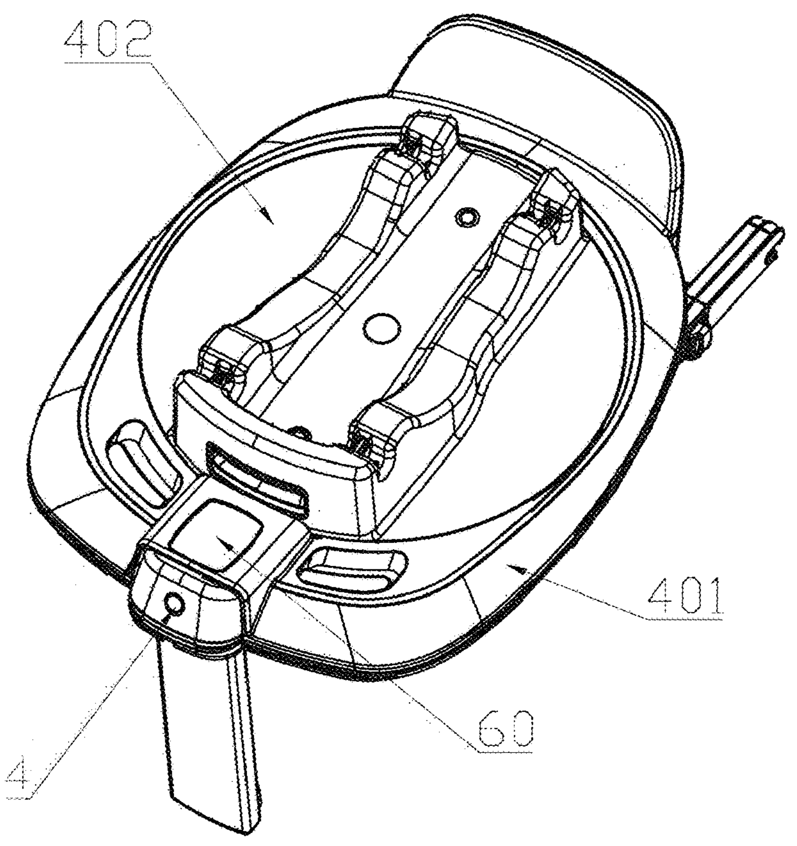
FIG. 16 is another perspective view of the seat base of the child safety seat of FIG. 14, with the turntable at a second rotation position.
Figure 17:
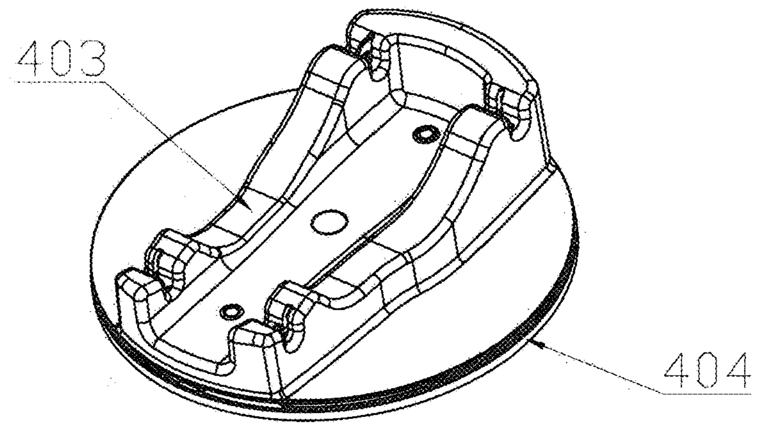
FIG. 17 is a perspective view of the turntable of the seat base of FIG. 15.
Figure 18:
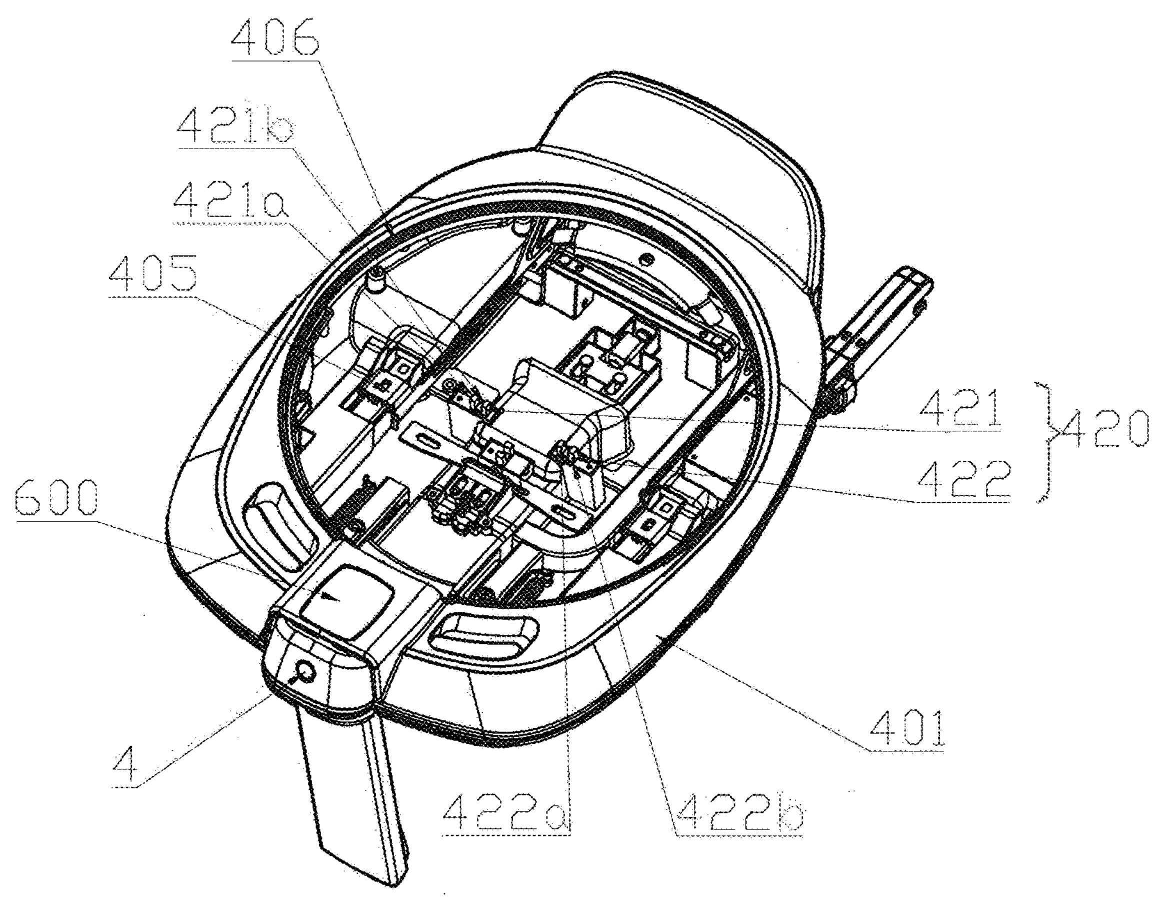
FIG. 18 is a perspective view of a second mounting seat of the seat base of FIG. 15.
Figure 19:
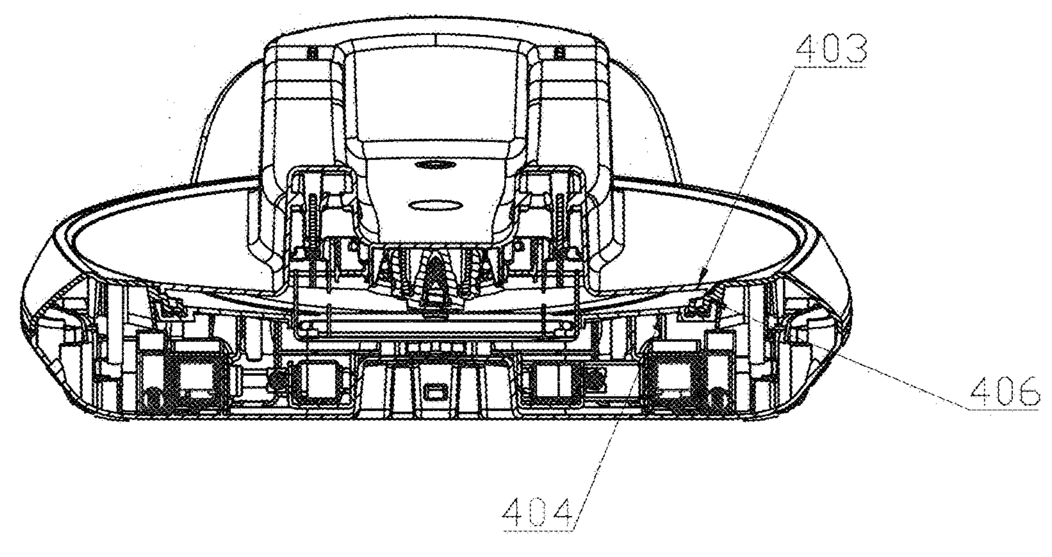
FIG. 19 is a sectional view taken along A-A in FIG. 15.
Figure 20:
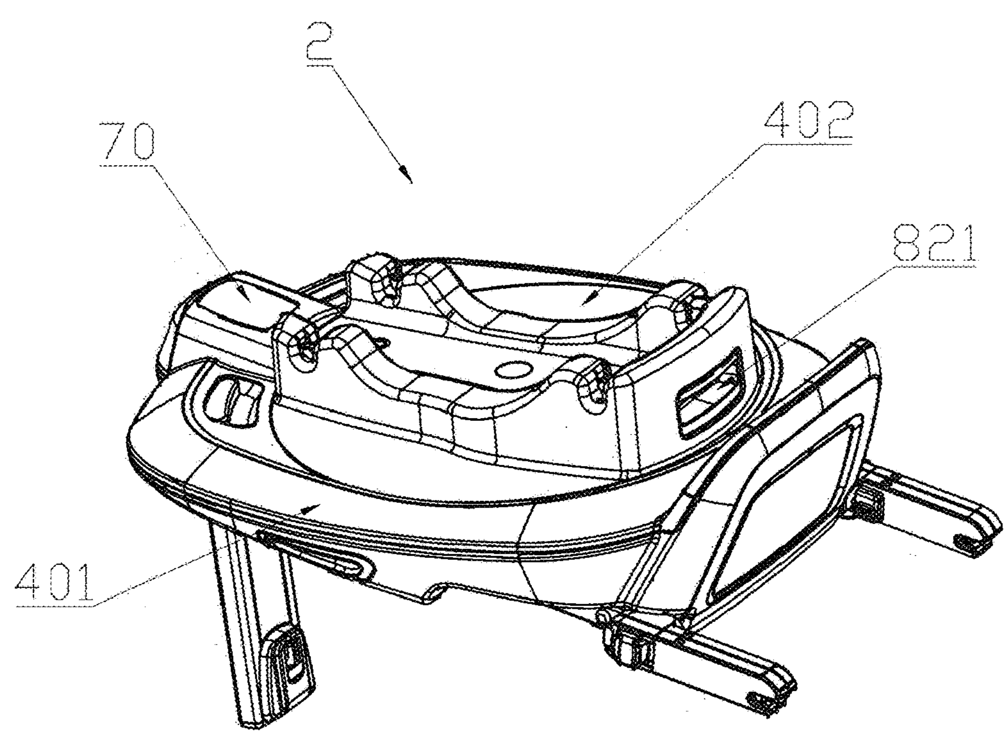
FIG. 20 is a perspective view of the seat base of FIG. 15 at another viewing angle.
Figure 22:
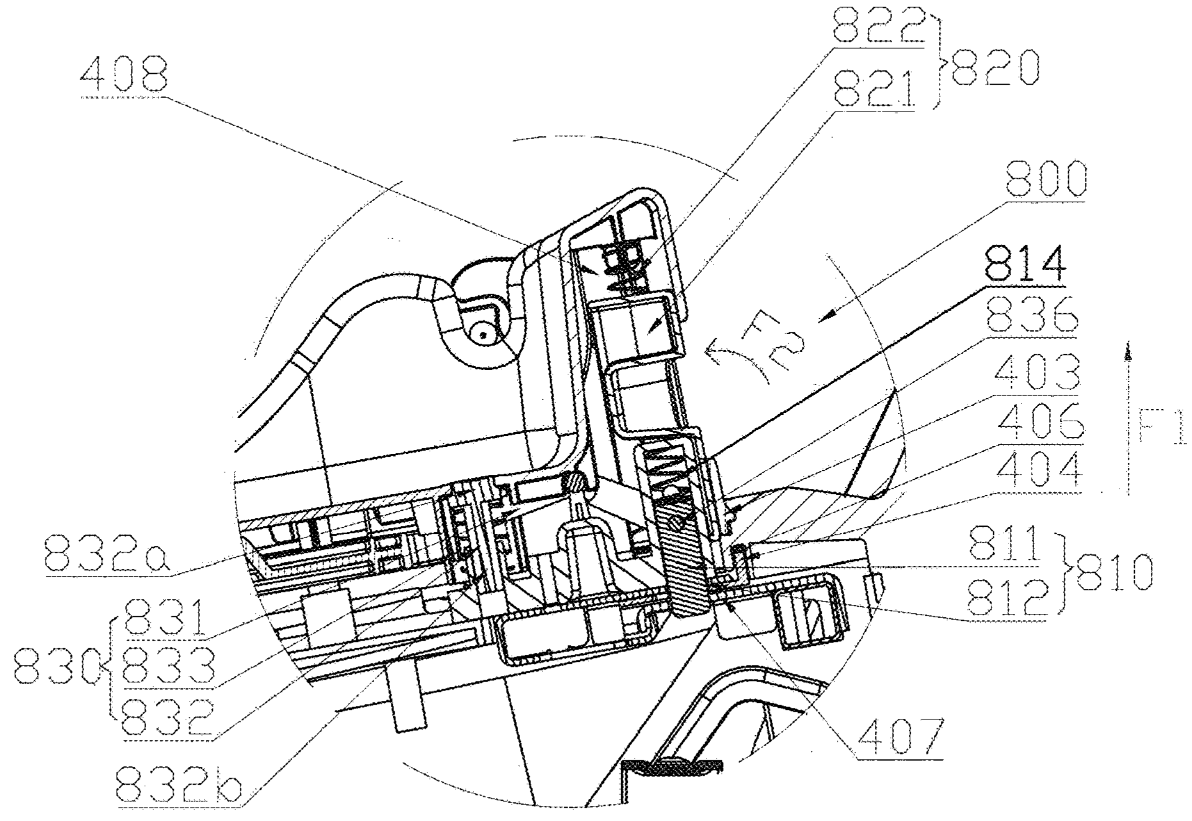
FIG. 22 is an enlarged view of a portion B in FIG. 21.
Figure 43:
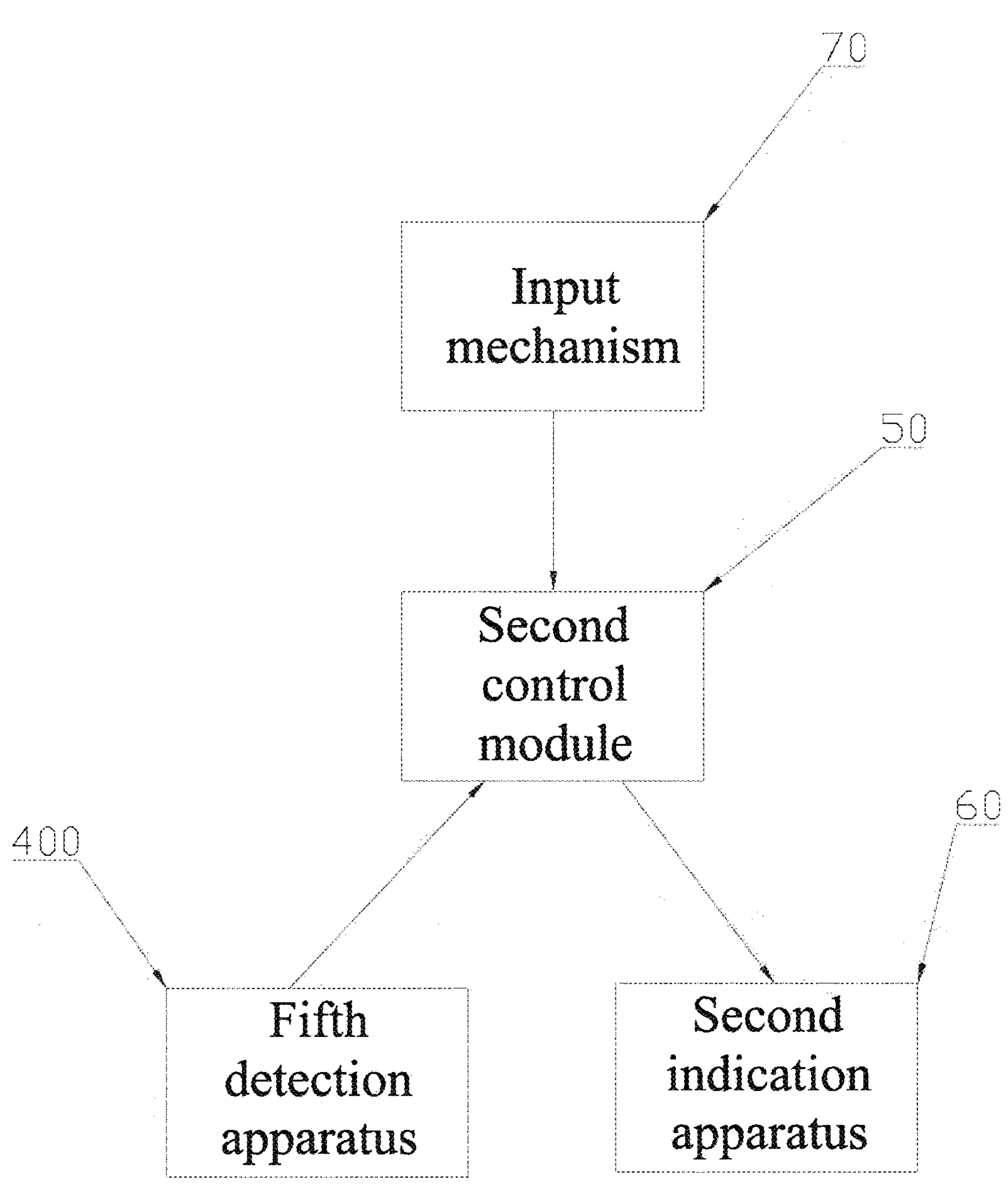
FIG. 43 is a schematic diagram of a signal transmission of the child safety seat according to an embodiment of the present disclosure.

As shown in FIG. 14, an embodiment of the present disclosure proposes a child safety seat. The child safety seat includes a seat body 1 and a seat base 2. The seat body 1 may be used by an infant or child under about 15 months, or used by a child over 15 months. It should be noted that, when the seat body 1 is used by the infant or child under 15 months, the seat body 1 has to be arranged in a rearward-facing manner. That is, the infant or child sitting on the seat body 1 has to face the rear of the vehicle. When the seat body 1 is used by the child over 15 months, the seat body 1 may be set to the forward-facing use mode or the rearward-facing use mode. That is, the child sitting on the seat body 1 may face the front of the vehicle or face the rear of the vehicle. As shown in FIG. 15, FIG. 22, and FIG. 43, the seat base 2 includes a second mounting seat 401, a turntable 402, a fifth detection apparatus 400, a second control module 50, a second indication apparatus 60, an input mechanism 70, and a fourth locking mechanism 800. As shown in FIG. 15 and FIG. 16, the seat body 1 is mounted on the turntable 402, the turntable 402 is rotatably arranged on the second mounting seat 401, and the turntable 402 has a first rotation position (as shown in FIG. 15) and a second rotation position (as shown in FIG. 16) relative to the second mounting seat 401. It should be understood that the mounting position of the seat body 1 relative to the turntable 402 is fixed, and the seat body 1 switches between the forward-facing use mode and the rearward-facing use mode with rotation of the turntable 402. The first rotation position and the second rotation position herein may correspond to the forward-facing use mode and the rearward-facing use mode of the turntable 402 and the seat body 1 respectively. Specifically, as shown in FIG. 17 and FIG. 18, the turntable 402 has a rotating upper cover 403 and a rotating lower cover 404 fitted with each other, and the rotating lower cover 404 is roughly circular. A roughly middle part of the second mounting seat 401 has a circular mounting receptacle 405. The second mounting seat 401 has an annular mounting rib 406 arranged along a groove wall of the mounting receptacle 405. The mounting rib 406 is sandwiched between the rotating upper cover 403 and the rotating lower cover 404 to realize a rotatable connection between the turntable 402 and the second mounting seat 401, as shown in FIG. 19.

Figure 28:
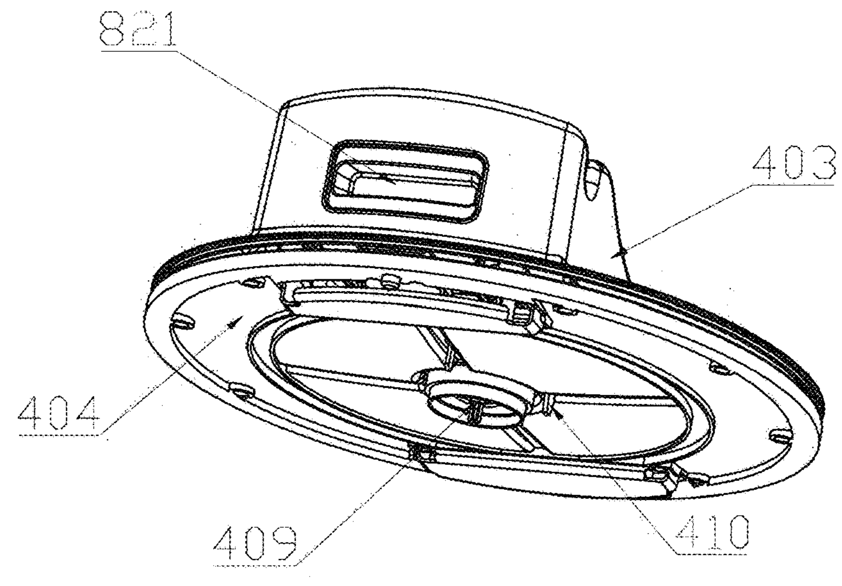
FIG. 28 is a perspective view of the turntable of FIG. 17 at another viewing angle.

As shown in FIG. 18 and FIG. 28, the fifth detection apparatus 400 includes a detector 410 and a second sensing apparatus 420. Optionally, in some embodiments, the fifth detection apparatus 400 may be a same detection apparatus as the third detection apparatus 150 in the foregoing embodiment.

Specifically, as shown in FIG. 28, the detector 410 protrudes from a bottom surface of the rotating lower cover 404, and the detector 410 deviates from a rotation center 409 of the rotating lower cover 404, that is, a center of the rotating lower cover 404. The second sensing apparatus 420 includes a first sensor 421 and a second sensor 422. The first sensor 421 and the second sensor 422 are arranged apart in the mounting receptacle 405. When the turntable 402 rotates to the first rotation position, the detector 410 triggers the first sensor 421 to generate a detection signal. When the turntable 402 rotates to the second rotation position, the detector 410 triggers the second sensor 422 to generate the detection signal. In an embodiment, the detector 410 is of a convex rib structure.

In an embodiment, the first sensor 421 may be a first infrared sensor, and the second sensor 422 may be a second infrared sensor. When the detector 410 is within a sensing range of the first infrared sensor or the second infrared sensor, the infrared sensor is triggered to generate the detection signal. In another embodiment, the first sensor 421 may alternatively be a first mechanical switch sensor, and the first mechanical switch sensor has a first switch lever (not shown in the figure). The second sensor 422 may alternatively be a second mechanical switch sensor, and the second mechanical switch sensor has a second switch lever (not shown in the figure). The detector 410 is configured to toggle the first switch lever or the second switch lever to trigger the first mechanical switch sensor or the second mechanical switch sensor to switch an on/off state to generate the detection signal. In this embodiment, as shown in FIG. 18, both the first sensor 421 and the second sensor 422 are photoelectric sensors. The first sensor 421 has a first transmitting end 421*a* and a first receiving end 421*b* arranged oppositely, and the first transmitting end 421*a* is configured to send an optical signal to the first receiving end 421*b*. The second sensor 422 has a second transmitting end 422*a* and a second receiving end 422*b* arranged oppositely, and the second transmitting end 422*a* is configured to send an optical signal to the second receiving end 422*b*. When the detector 410 is located between the first transmitting end 421*a* and the first receiving end 421*b*, the first receiving end 421*b* cannot receive the optical signal from the first transmitting end 421*a* due to obstruction of the detector 410, thereby triggering the first sensor 421 to generate the detection signal. Similarly, when the detector 410 is located between the second transmitting end 422*a* and the second receiving end 422*b*, the second receiving end 421*b* cannot receive the optical signal from the second transmitting end 422*a* due to obstruction of the detector 410, thereby triggering the second sensor 422 to generate the detection signal. The types of the first sensor 421 and the second sensor 422 are not limited to the above infrared sensors, mechanical switch sensors or photoelectric sensors, which may alternatively be other types of proximity sensors or limit switches. Positions of the detector 410 and the second sensing apparatus 420 may alternatively be interchanged. That is, the detector 410 may be arranged on the second mounting seat 401, and the second sensing apparatus 420 may be arranged on the turntable 402. Numbers of the detector 410 and the second sensing apparatus 420 may alternatively be adjusted as required, such as two detectors 410 and one second sensing apparatus 420, which are not limited.

Specifically, as shown in FIG. 43, the second control module 50 may be a programmable control module. Optionally, in some embodiments, the second control module 50 may be a same control module as the first control module 120 in the foregoing embodiment. In this embodiment, the second control module 50 is arranged in the second mounting seat 401. In other embodiments, the second control module 50 may alternatively be arranged in the turntable 402 or the seat body 1. The second control module 50 is in communication connections with the first sensor 421, the second sensor 422, the second indication apparatus 60, and the input mechanism 70. It may be understood that the communication connections herein include wired communication connections and wireless communication connections.

The first sensor 421 and the second sensor 422 are configured to transmit the generated detection signal to the second control module 50. The detection signal herein includes whether the turntable 402 is at the first rotation position or the second rotation position, i.e., in the forward-facing use mode or the rearward-facing use mode. The input mechanism 70 may be an input keyboard arranged on the second mounting seat 401, and the input mechanism 70 is configured to input a child attribute, such as one or more of information such as the child's age, weight, and height. The second control module 50 is configured to receive the child attribute from the input mechanism 70 and the detection signal from the first sensor 421 or the second sensor 422, judge whether the child attribute matches the detection signal of the fifth detection apparatus 400, and output a matching signal. In this embodiment, the second control module 50 transmits the matching signal to the second indication apparatus 60. The matching signal herein may include whether the child attribute matches the forward-facing use mode or the rearward-facing use mode of the turntable 402. As shown in FIG. 15 and FIG. 16, the second indication apparatus 60 may be a display screen arranged on the seat base 2, and the second indication apparatus 60 is configured to perform, based on the matching signal, at least one of playing a reminder voice, displaying a reminder text, displaying a reminder image, and playing a reminder video. Optionally, in some embodiments, the second indication apparatus 60 may be a same indication apparatus as the first indication apparatus 130 in the foregoing embodiment. For example, if the child attribute does not match a position state of the turntable 402, for example, a smaller infant sits on a child safety seat in the forward-facing use mode, the display screen may emit an alarm sound and a relevant prompt video may appear to remind a caregiver to rotate the turntable 402 in time to adjust the direction of the child safety seat.

A power switch 4 may also be arranged on the second mounting seat 401, and the power switch 4 may be in a communication connection with the display screen to control ON and OFF of the display screen. In this way, when not in use, the display screen may be turned off by the power switch 4 to save power. The power switch 4 may alternatively be in a communication connection with the second sensing apparatus 420 or the second control module 50 to control ON and OFF of the second sensing apparatus 420 or the second control module 50. In this way, when not in use, the second sensing apparatus 420 or the second control module 50 may be turned off by the power switch 4 to save power.

Figure 44:
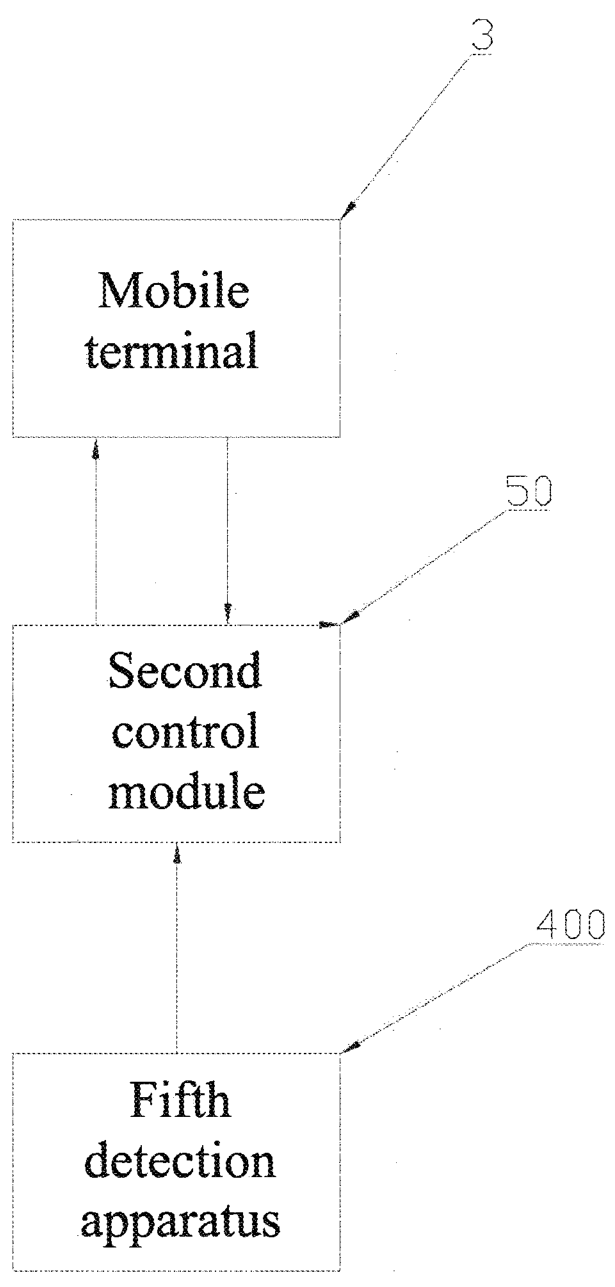
FIG. 44 is a schematic diagram of a signal transmission of the child safety seat according to another embodiment of the present disclosure.

As shown in FIG. 44, in other embodiments, at least one of the input mechanism 70 and the second indication apparatus 60 may alternatively be omitted. The second control module 50 may be in a direct communication connection, for example, a wired communication connection or a wireless communication connection, with a mobile terminal 3. The mobile terminal 3 may be a mobile phone, a tablet computer, a vehicle central control, or the like. The second control module 50 may be configured to receive the child attribute inputted through the mobile terminal 3 or configured to receive the matching signal transmitted by the second control module 50, and remind the caregiver of whether the child attribute matches the position state of the turntable 402. In this way, the caregiver can remotely monitor a use state of the child safety seat, which is more intelligent and convenient. In other embodiments, the mobile terminal 3 may alternatively be the input mechanism 70, and the second control module 50 may be in a communication connection with the input mechanism 70.

As shown in FIG. 21 to FIG. 23, FIG. 29, and FIG. 30, in an embodiment, the fourth locking mechanism 800 includes a locking assembly 810, a first operating assembly 820, a linkage assembly 830, and a second operating assembly 840.

Figure 21:
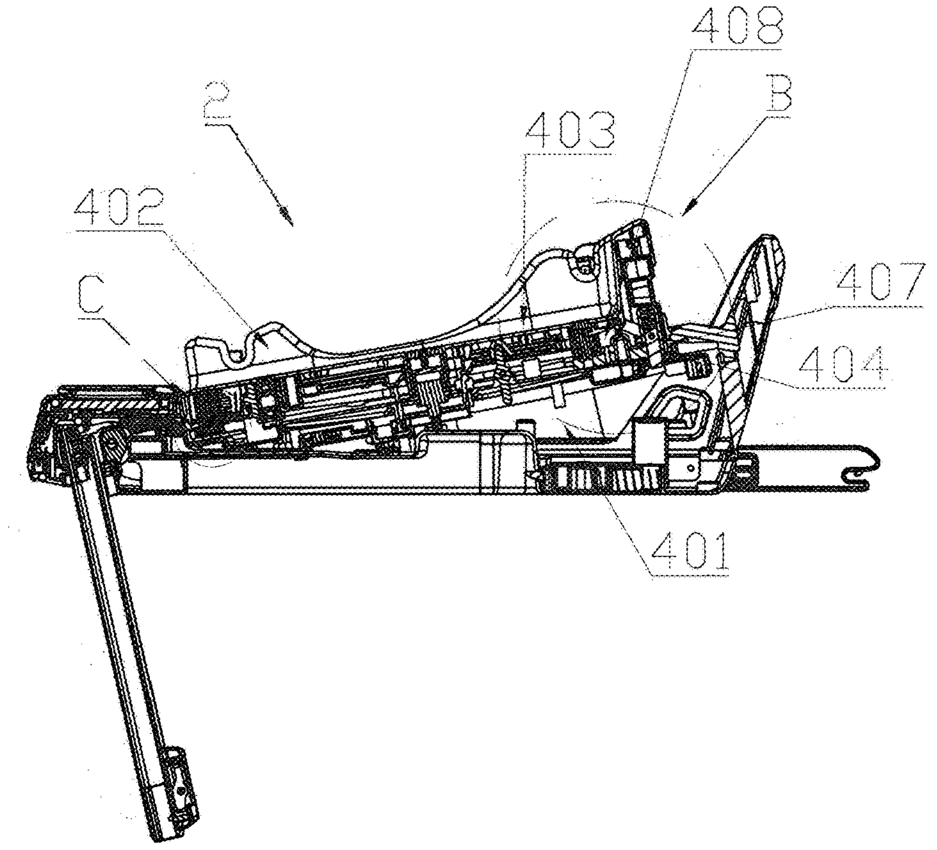
FIG. 21 is a side sectional view of the seat base of FIG. 15.
Figure 23:
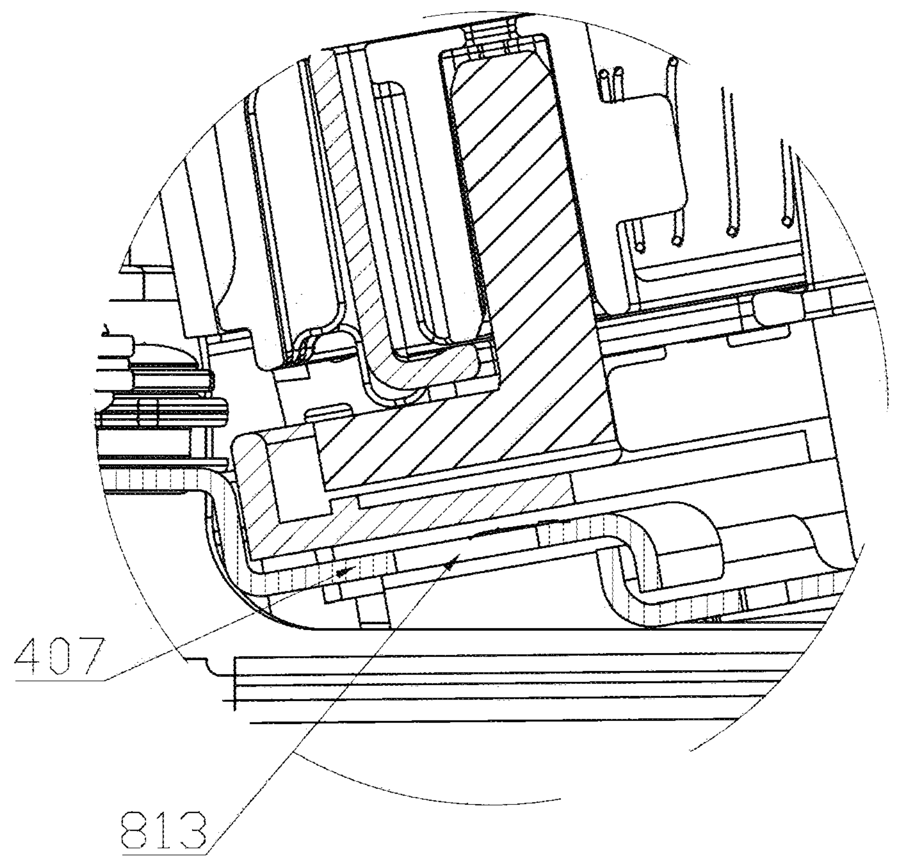
FIG. 23 is an enlarged view of a portion C in FIG. 21.

In this embodiment, as shown in FIG. 21 to FIG. 23, the locking assembly 810 includes a locking member 811, a first locking hole 812, a second locking hole 813, and a locking reset member 814 (second reset member). The locking member 811 is slidably arranged in the turntable 402, and the locking member 811 may move to protrude from the bottom surface of the rotating lower cover 404. The first locking hole 812 and the second locking hole 813 are arranged on front and rear ends of the second mounting seat 401 respectively. Specifically, reinforcing iron sheets 407 protruding toward the mounting receptacle 405 are respectively arranged at the front and rear ends of the second mounting seat 401, and the first locking hole 812 and the second locking hole 813 are arranged on the two reinforcing iron sheets 407 respectively. It should be understood that, since the second mounting seat 401 is relatively fixed to the vehicle, the front and rear of the second mounting seat 401 are consistent with the front and rear of the vehicle. When the turntable 402 is at the first rotation position, that is, in the forward-facing use mode, the locking member 811 can be inserted into the first locking hole 812. When the turntable 402 is at the second rotation position, that is, in the rearward-facing use mode, the locking member 811 can be inserted into the second locking hole 813. Two ends of the locking reset member 814 (second reset member) abut against two ends of the locking member 811 and a fixed seat 837 (see details later) respectively, and the locking reset member 814 (second reset member) biases the locking member 811 to move toward a direction close to the second mounting seat 401.

In other embodiments, the locking assembly 810 may alternatively be of other types. For example, positions of the locking member 811, the first locking hole 812, and the second locking hole 813 can be changed. That is, the locking member 811 is slidably arranged on the second mounting seat 401, and the first locking hole 812 and the second locking hole 813 are arranged on the front and rear ends of the turntable 402 respectively. In addition, the locking assembly 810 may not necessarily be in a manner in which the locking member 811 is fitted with the locking hole, and may alternatively be in a manner in which a hook is fitted with a buckle. In brief, functions of locking and unlocking between the turntable 402 and the second mounting seat 401 can be realized provided that the locking assembly 810 has a first fitting portion arranged on one of the turntable 402 and the second mounting seat 401, and a second fitting portion and a third fitting portion that are arranged on the other of the turntable 402 and the second mounting seat 401, the first fitting portion is locked and fitted with the second fitting portion when the turntable 402 is at the first rotation position, and the first fitting portion is locked and fitted with the third fitting portion when the turntable 402 is at the second rotation position.

Figure 24:
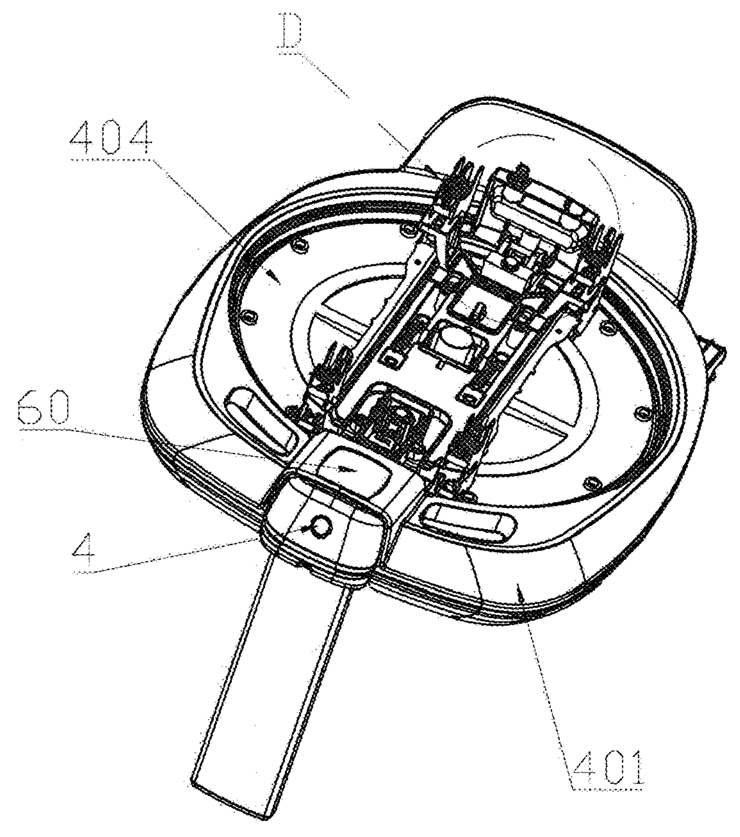
FIG. 24 is a perspective view of the seat base of FIG. 15 with a rotating upper cover removed.
Figure 25:
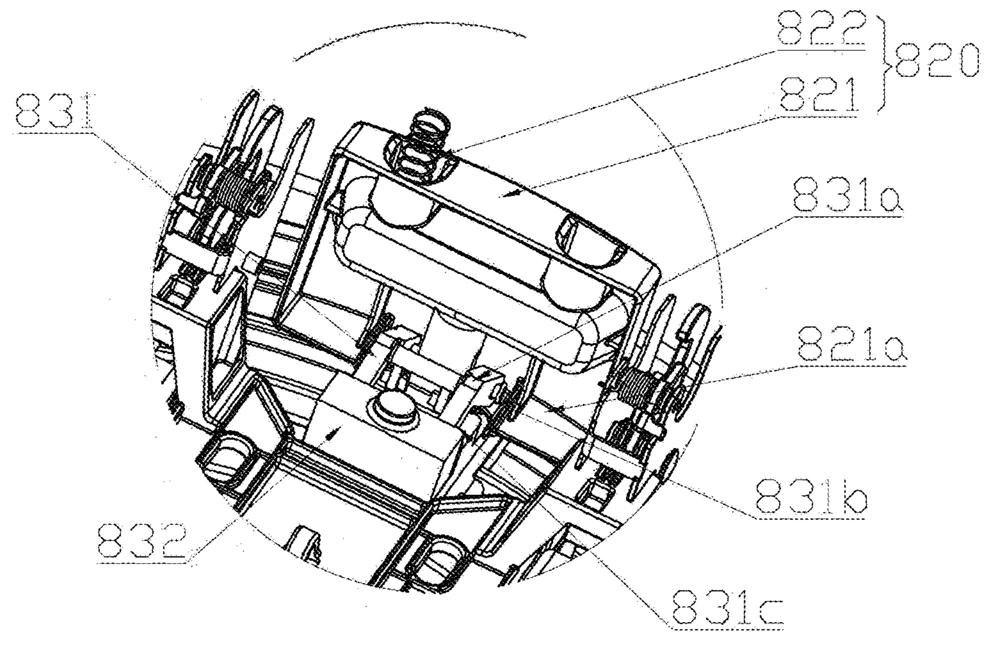
FIG. 25 is an enlarged view of a portion D in FIG. 24.
Figure 26:
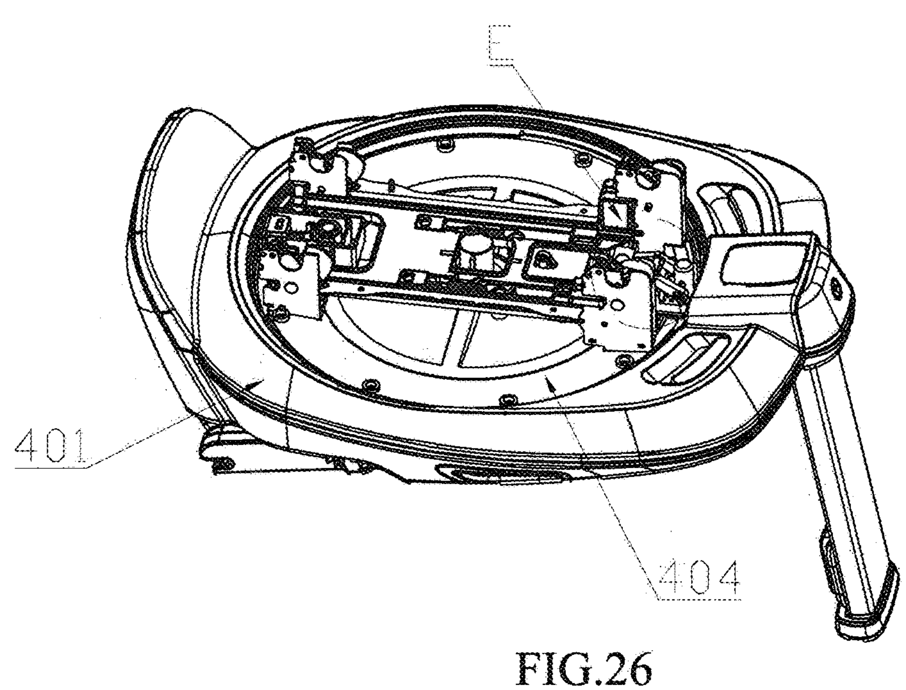
FIG. 26 is another perspective view of the seat base of FIG. 15 with the rotating upper cover removed.

Specifically, as shown in FIG. 22, FIG. 24, and FIG. 25, the first operating assembly 820 includes a first operating member 821 and a first reset member 822. The first operating member 821 may be a pull handle slidably arranged on a rear side of the turntable 402. It should be noted that, since the turntable 402 is rotatable relative to the vehicle, the front and rear here refer to the front and rear of the turntable 402, not the front and rear of the turntable 402 relative to a forward direction of the vehicle. Specifically, a front side of the turntable 402 refers to a side engaged with an end of the safety seat body 1 of the vehicle away from a backrest, and the rear side of the turntable 402 refers to a side engaged with an end of the safety seat body 1 of the vehicle close to the backrest. For example, as shown in FIG. 14 and FIG. 15, a front end of the turntable 402 refers to an end of the turntable 402 close to the second indication apparatus 60, that is, a lower end of the turntable 402, while a rear end of the turntable 402 refers to an end of the turntable 402 away from the second indication apparatus 60, that is, a higher end of the turntable 402. As shown in FIG. 16, when the turntable 402 rotates from the first rotation position to the second rotation position, the rear end of the turntable 402 is close to the second indication apparatus 60, while the front end of the turntable 402 is away from the second indication apparatus 60. As shown in FIG. 21 and FIG. 22, the first reset member 822 is located at a top end of the first operating member 821, and two ends of the first reset member 822 abut against the first operating member 821 and the turntable 402 respectively. Specifically, the rotating upper cover 403 and the rotating lower cover 404 are enclosed to form an accommodating cavity 408, both the first reset member 822 and the first operating member 821 are located in the accommodating cavity 408, and the two ends of the first reset member 822 abut against the first operating member 821 and the rotating upper cover 403 respectively. Therefore, the first reset member 822 biases the first operating member 821 to move in a direction close to the rotating lower cover 404, i.e., close to the second mounting seat 401.

Specifically, as shown in FIG. 22 and FIG. 24 to FIG. 27, the linkage assembly 830 includes a linkage member 831, a pressing member 832, a third reset member 833, a connecting member 836, and a fixed seat 837.

Figure 27:
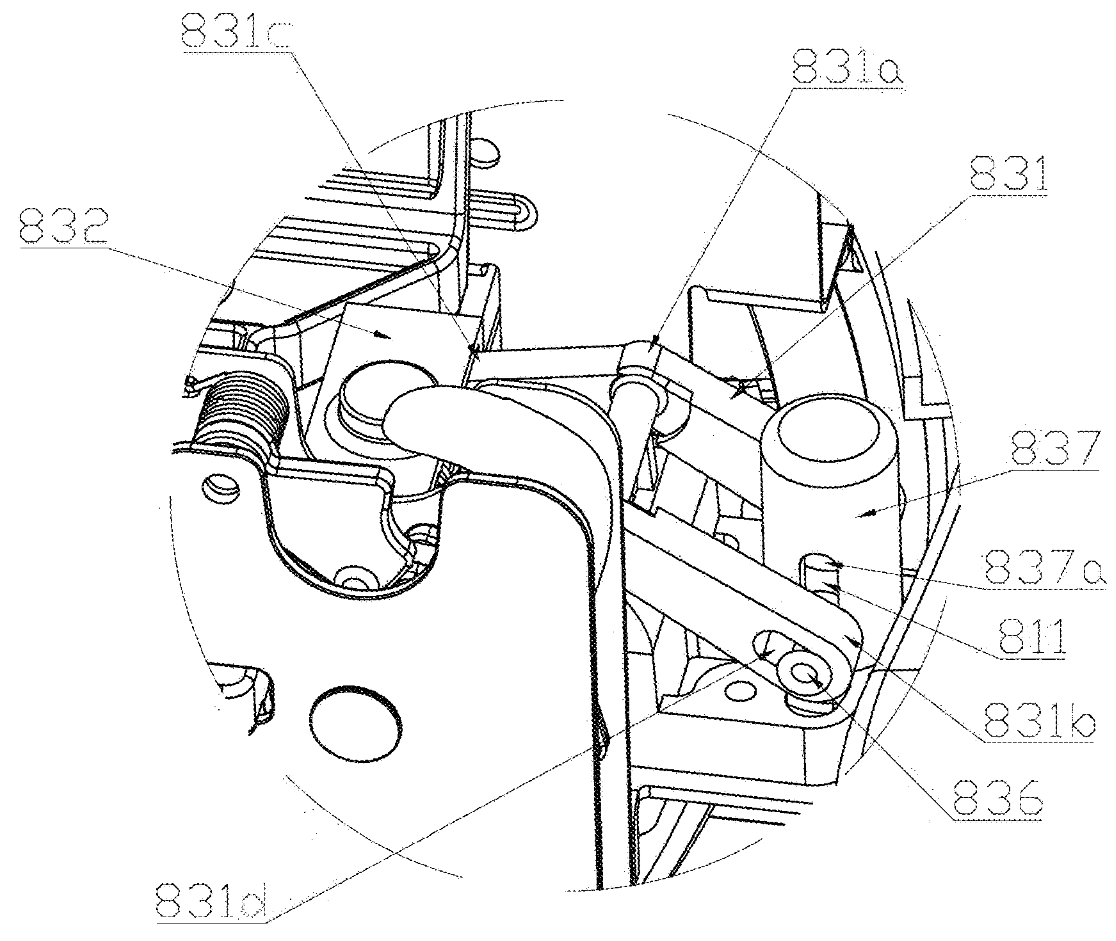
FIG. 27 is an enlarged view of a portion E in FIG. 26.

As shown in FIG. 22 and FIG. 25, the linkage member 831 is rotatably arranged in the accommodating cavity 408. The linkage member 831 has a roughly L-shaped structure, and includes a first end 831*a*, a second end 831*b*, and a third end 831*c*. The first end 831*a* is located at a corner of the L-shaped structure, and the second end 831*b* and the third end 831*c* are respectively located at two ends of the L-shaped structure. The first end 831*a* is pivotally connected to the turntable 402, specifically pivotally connected to the rotating upper cover 403. The second end 831*b* is connected to the locking member 811. As shown in FIG. 27, specifically, the fixed seat 837 is fixed to the rotating lower cover 404, the locking member 811 is movably arranged in the fixed seat 837, a side wall of the fixed seat 837 has a driving chute 837*a* arranged substantially along a vertical direction, the second end 831*b* is provided with a strip groove 831*d*, and the strip groove 831*d* extends generally along a direction from the second end 831*b* to the first end 831*a*. One end of the connecting member 836 is inserted into the strip groove 831*d*, and the other end of the connecting member 836 passes through the driving chute 837*a* and is connected to the locking member 811. In this embodiment, the connecting member 836 is a rivet. As shown in FIG. 25, a bottom end of the first operating member 821, i.e., an end close to the second mounting seat 401, has an abutting rib 821*a*, and the abutting rib 821*a* abuts against the second end 831*b* and is located on a side of the linkage member 831 close to the second mounting seat 401. In this way, as shown in FIG. 22, when the first operating member 821 is operated to move toward a direction away from the second mounting seat 401, i.e., a direction F1, the first operating member 821 can drive, through the abutting rib 821*a*, the linkage member 831 to rotate along a direction F2, and the rotation of the linkage member 831 may drive the connecting member 836 to move along the driving chute 837*a*. Since the connecting member 836 is fixedly connected to the locking member 811, the locking member 811 may be driven to move along the direction F1. When the locking member 811 moves to withdraw from the first locking hole 812 or the second locking hole 813, the turntable 402 is unlocked from the second mounting seat 401, and the turntable 402 can rotate relative to the second mounting seat 401 to adjust the direction.

As shown in FIG. 22 and FIG. 25, the pressing member 832 is slidably arranged in the accommodating cavity 408. The pressing member 832 abuts against the third end 831*c*. The third reset member 833 is arranged between the pressing member 832 and the turntable 402. Specifically, the pressing member 832 includes a boss portion 832*a* and a sleeving portion 832*b* connected to each other. The third reset member 833 sleeves the sleeving portion 832*b*, and two ends of the third reset member 833 abut against the boss portion 832*a* and the rotating lower cover 404 respectively. In this way, the third reset member 833 biases the pressing member 832 to move toward a direction away from the second mounting seat 401.

Figure 29:
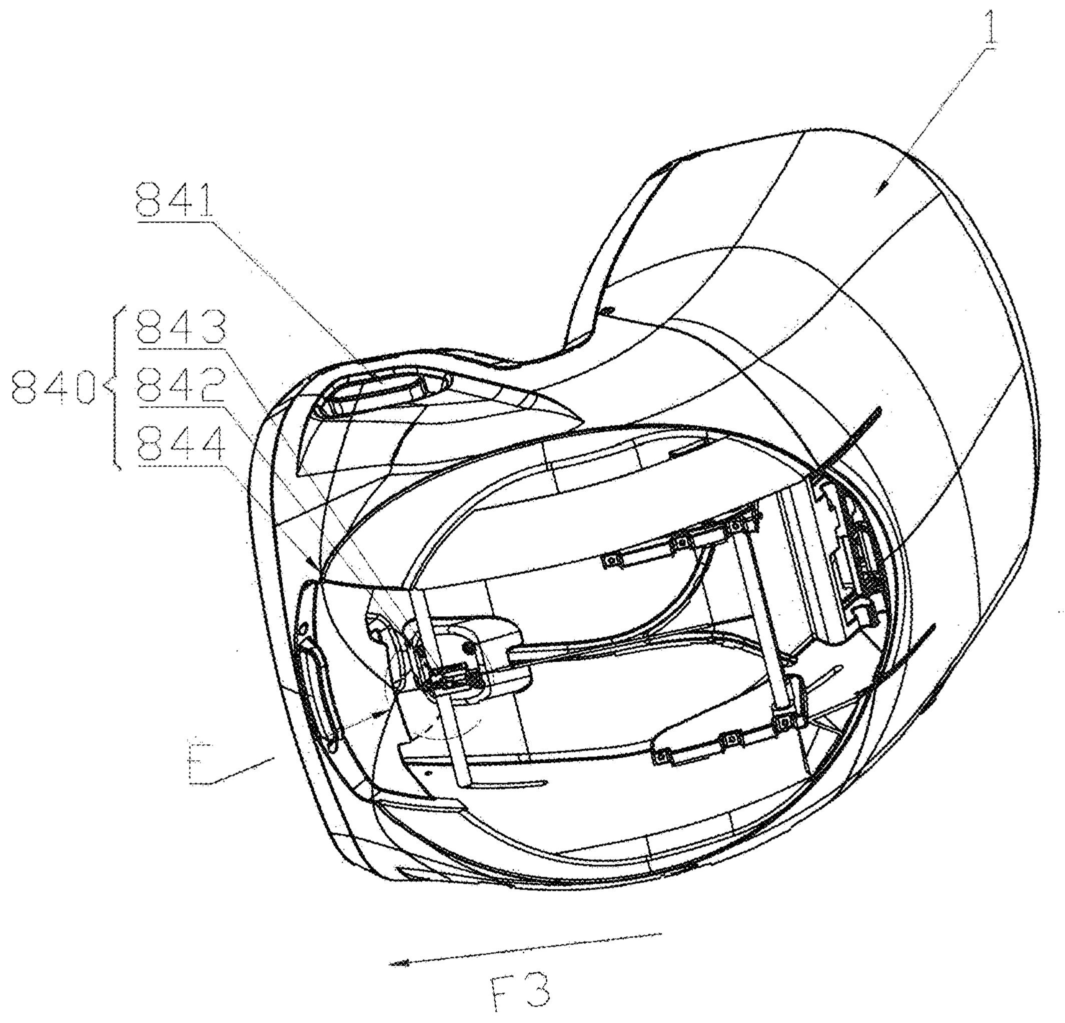
FIG. 29 is a perspective view of the seat body of the child safety seat of FIG. 14.
Figure 30:
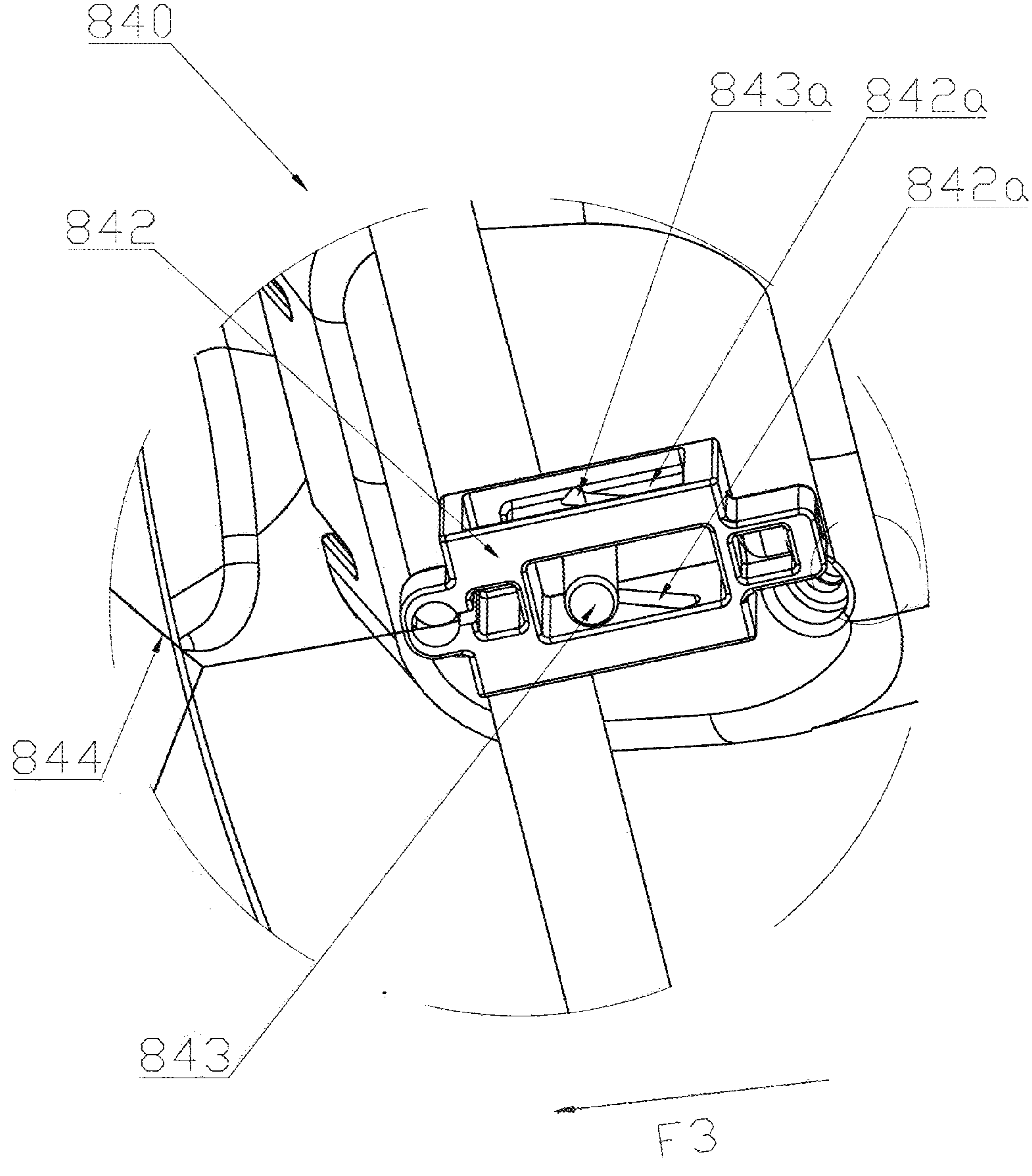
FIG. 30 is an enlarged view of a portion F in FIG. 29.

Specifically, as shown in FIG. 29 and FIG. 30, the second operating assembly 840 includes a second operating member 841, a driving member 842, an actuating member 843, a first traction member 844, and a driving reset member (not shown in the figure). The second operating member 841 may be a pull handle. In this embodiment, two second operating members 841 are provided and respectively arranged on two sides of the seat body 1, which is more convenient than an operation of extending a hand to the rear side of the turntable 402. The driving member 842 is slidably arranged on the seat body 1, and the driving member 842 can move along a direction intersecting with a moving direction of the locking member 811, for example, move along a direction F3. The driving member 842 is provided with a sliding chute 842*a*. One end of the actuating member 843 has a sliding guide post 843*a* fitted with the sliding chute 842*a*. That is, the driving member 842 and the actuating member 843 realize a slidable connection through cooperation between the sliding chute 842*a* and the sliding guide post 843*a*. The other end of the actuating member 843 abuts against an end of the pressing member 832 away from the second mounting seat 401. The driving reset member is arranged between the driving member 842 and the seat body 1, and the driving reset member biases the driving member 842 to move toward a direction opposite to a pulling direction of the first traction member 844, for example, move along a direction opposite to the direction F3. Two first traction members 844 are correspondingly provided. The first traction member 844 may specifically be a steel wire. Two ends of the first traction member 844 are respectively connected to one second operating member 841 and the driving member 842. The second operating member 841 may be pulled to drive, through the first traction member 844, the driving member 842 to move. The sliding chute 842*a* gradually moves away from the seat base 2 along the pulling direction of the first traction member 844, for example, the direction F3. Therefore, when the second operating member 841 is pulled to drive, through the first traction member 844, the driving member 842 to move, the actuating member 843 is driven by the sliding chute 842*a* to press against the pressing member 832.

A specific operation process of the fourth locking mechanism 800 in this embodiment is as follows.

When the turntable 402 is required to be unlocked from the second mounting seat 401 to cause the turntable 402 to rotate relative to the second mounting seat 401, as shown in FIG. 22, the first operating member 821 may be pulled, so that the first operating member 821 moves in the direction F1, the first operating member 821 drives the linkage member 831 to rotate along the direction F2. The rotation of the linkage member 831 may drive the connecting member 836 to move along the driving chute 837*a*. Since the connecting member 836 is fixedly connected to the locking member 811, the locking member 811 may be driven to move along the direction F1. When the locking member 811 moves to withdraw from, for example, the first locking hole 812, the turntable 402 is unlocked from the second mounting seat 401. In this case, the turntable 402 can be rotated, for example, the turntable 402 is rotated from the first rotation position to the second rotation position, so that the turntable 402 and the seat body 1 mounted on the turntable 402 are rotated from the forward-facing use mode to the rearward-facing use mode, as shown in FIG. 15 and FIG. 16. Then, the first operating member 821 is released, and the first operating member 821 moves along a direction opposite to the direction F1 under an elastic force of the first reset member 822, so that the locking member 811 is driven by the linkage member 831 to also move along the direction opposite to the direction F1. As shown in FIG. 22, when the locking member 811 moves until it is inserted into the second locking hole 813, the turntable 402 is relatively locked with the second mounting seat 401. That is, the turntable 402 and the seat body 1 mounted on the turntable 402 are locked in the rearward-facing use mode, as shown in FIG. 16.

As shown in FIG. 29 and FIG. 30, the second operating member 841 located on either side of the seat body 1 may alternatively be pulled, the second operating member 841 pulls, through the first traction member 844, the driving member 842 to move along the direction F3, and the actuating member 843 is driven by the driving member 842 to move along the direction opposite to the direction F1. As shown in FIG. 22, the actuating member 843 presses against the pressing member 832 to also move along the direction opposite to the direction F1, the pressing member 832 then drives the linkage member 831 to rotate along the direction F2, and the rotation of the linkage member 831 may drive the connecting member 836 to move along the driving chute 837*a*. Since the connecting member 836 is fixedly connected to the locking member 811, the locking member 811 may be driven to move along the direction F1. When the locking member 811 moves to withdraw from, for example, the first locking hole 812, the turntable 402 is unlocked from the second mounting seat 401. In this case, the turntable 402 can be rotated, for example, the turntable 402 is rotated from the first rotation position to the second rotation position, that is, the turntable 402 and the seat mounted on the turntable 402 are rotated from the forward-facing use mode to the rearward-facing use mode, as shown in FIG. 16. Then, the second operating member 841 is released, the second operating member 841 resets under the action of an internal reset spring (not shown in the figure) thereof, and the driving member 842 not pulled by the first traction member 844 moves along the direction opposite to the direction F3 under the action of the driving reset member, as shown in FIG. 29 and FIG. 30. Then, the actuating member 843 is driven by the driving member 842 to move along the direction F1, as shown in FIG. 22. The pressing member 832 not pressed by the actuating member 843 moves along the direction F1 under an elastic force of the third reset member 833, and at the same time, the locking member 811 moves along the direction opposite to the direction F1 under an elastic force of the locking reset member 814 (second reset member). When the locking member 811 moves to be inserted into the second locking hole 813, the turntable 402 is relatively locked with the second mounting seat 401. That is, the turntable 402 and the seat body 1 mounted on the turntable 402 are locked in the rearward-facing use mode, as shown in FIG. 16.

Figure 35:
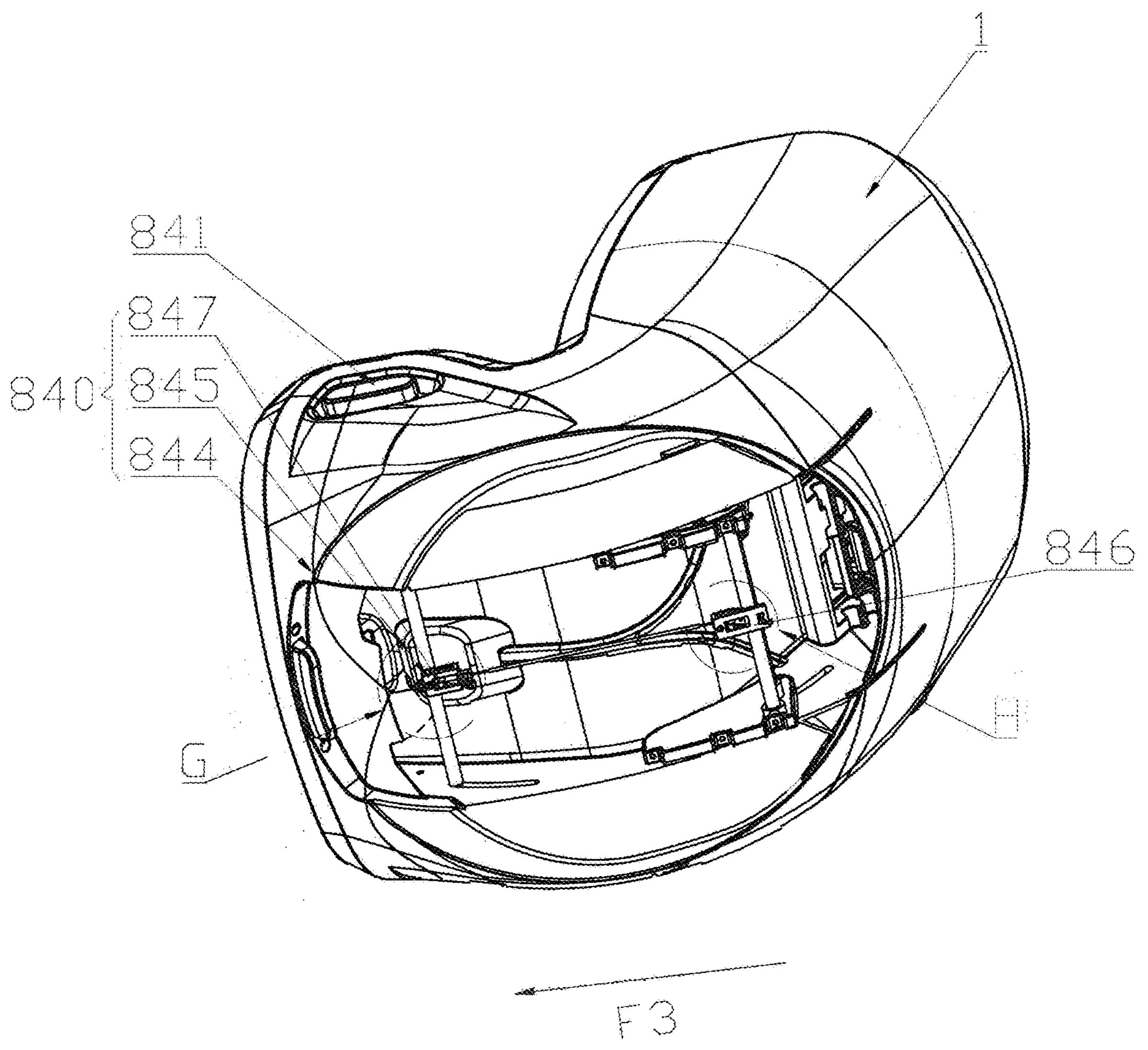
FIG. 35 is a perspective view showing an internal structure of the seat body of FIG. 34.
Figure 39:
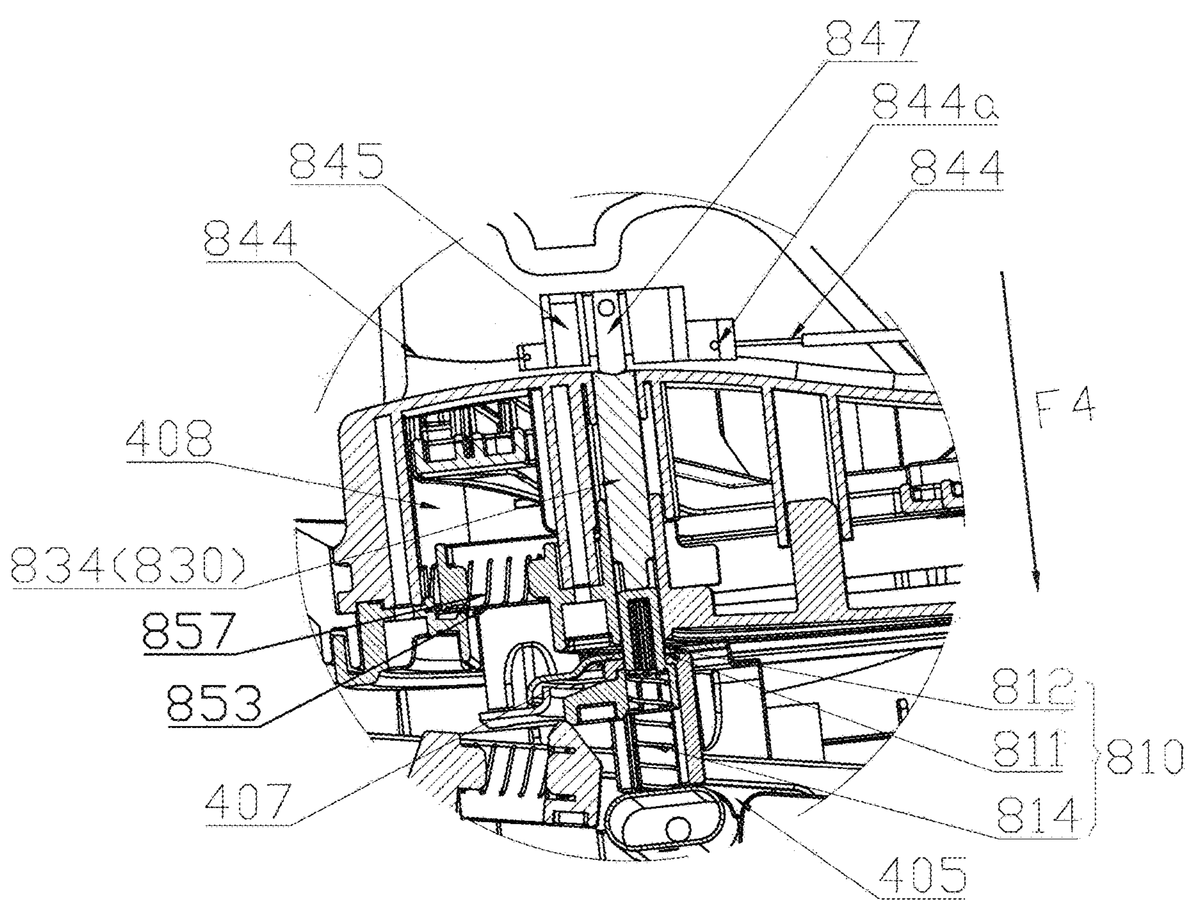
FIG. 39 is an enlarged view of a portion I in FIG. 38.
Figure 40:
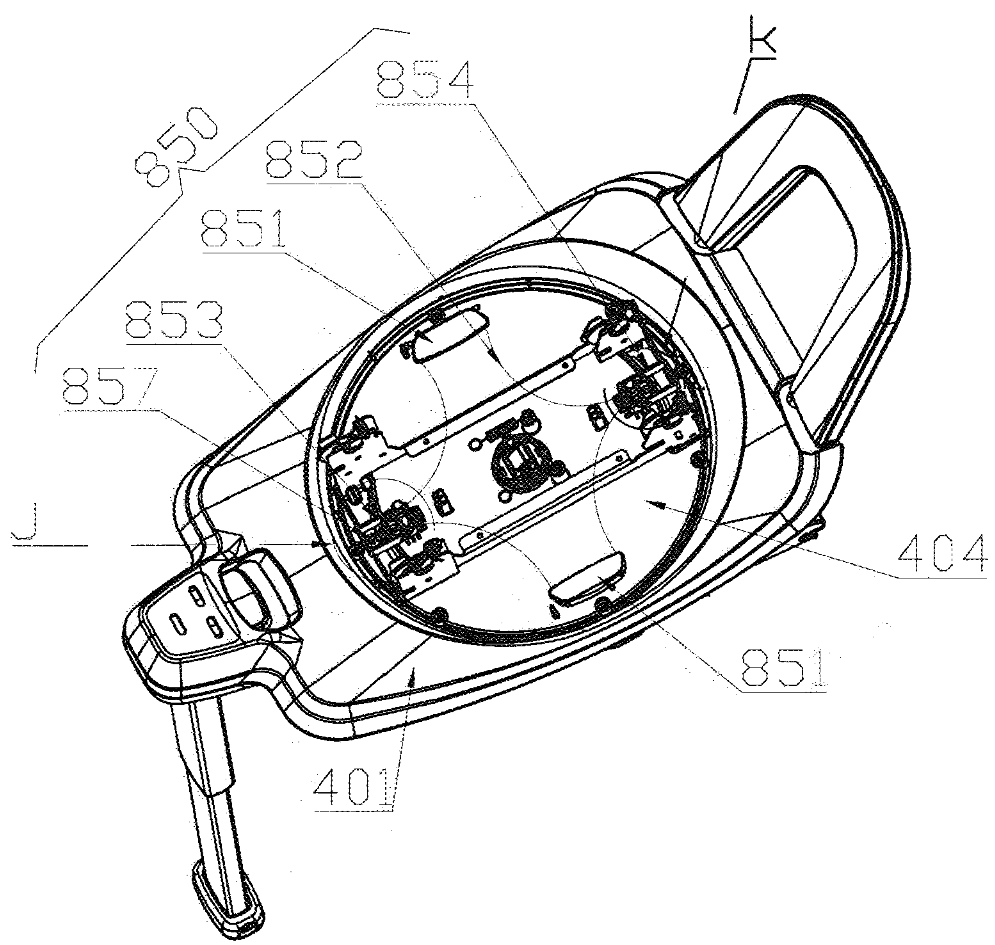
FIG. 40 is a perspective view of the seat base of FIG. 38, with the rotating upper cover removed.

In another embodiment, as shown in FIG. 35, FIG. 39, and FIG. 40, the fourth locking mechanism 800 may alternatively include a locking assembly 810, a linkage assembly 830, a second operating assembly 840, and a third operating assembly 850.

Figure 31:
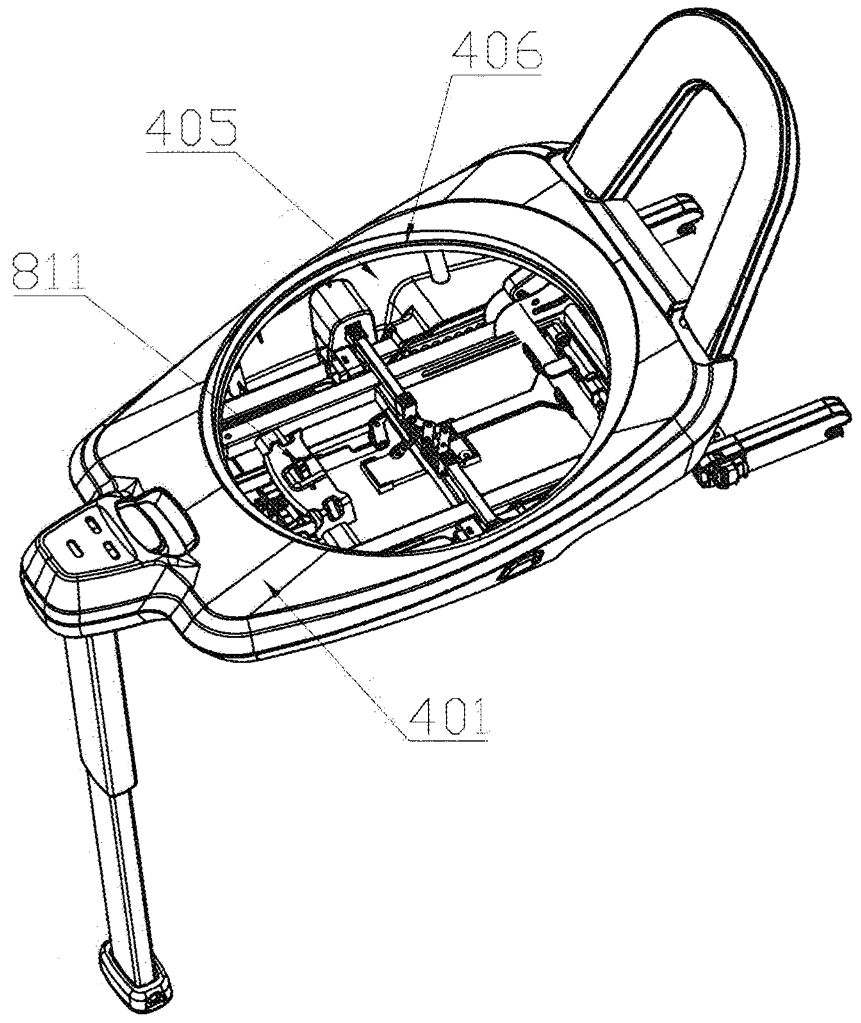
FIG. 31 is a perspective view of the second mounting seat of the child safety seat according to another embodiment of the present disclosure.
Figure 33:
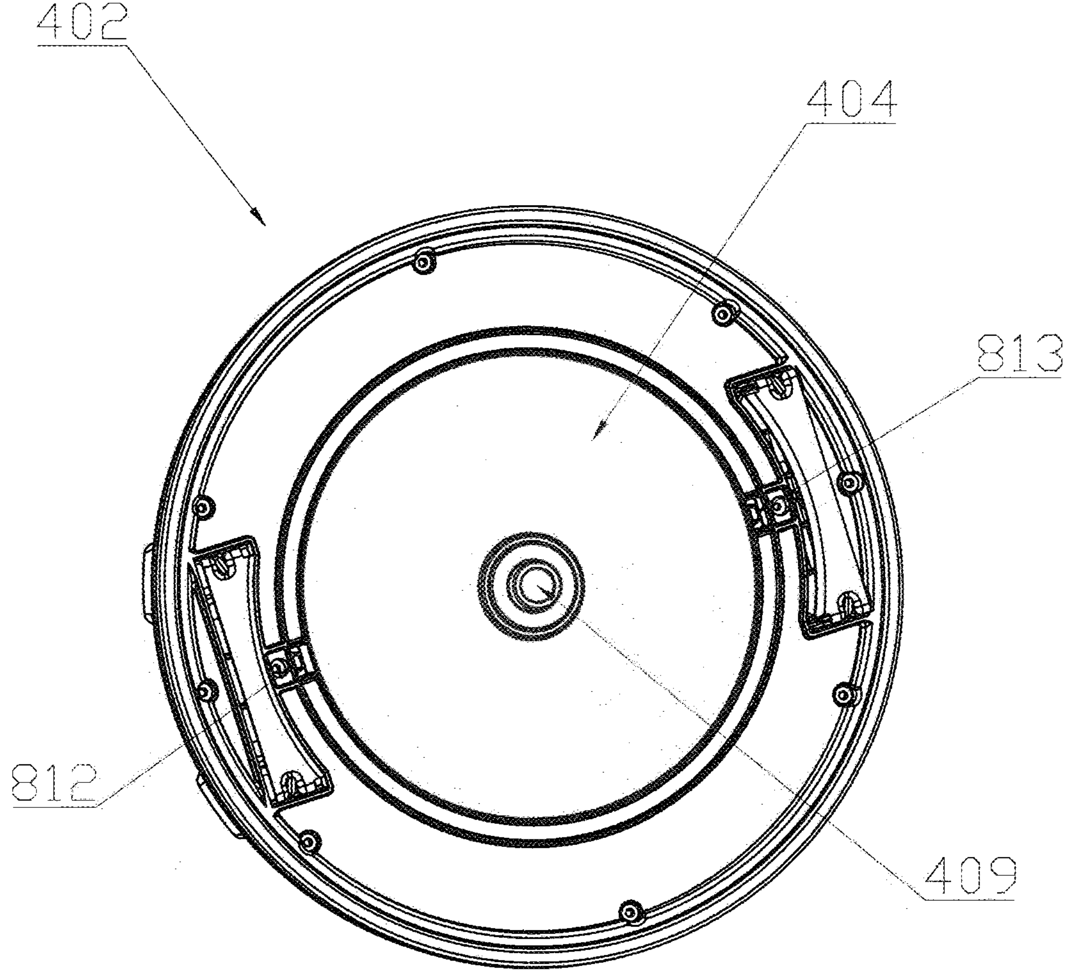
FIG. 33 is a perspective view of the turntable of FIG. 32 at another viewing angle.
Figure 34:
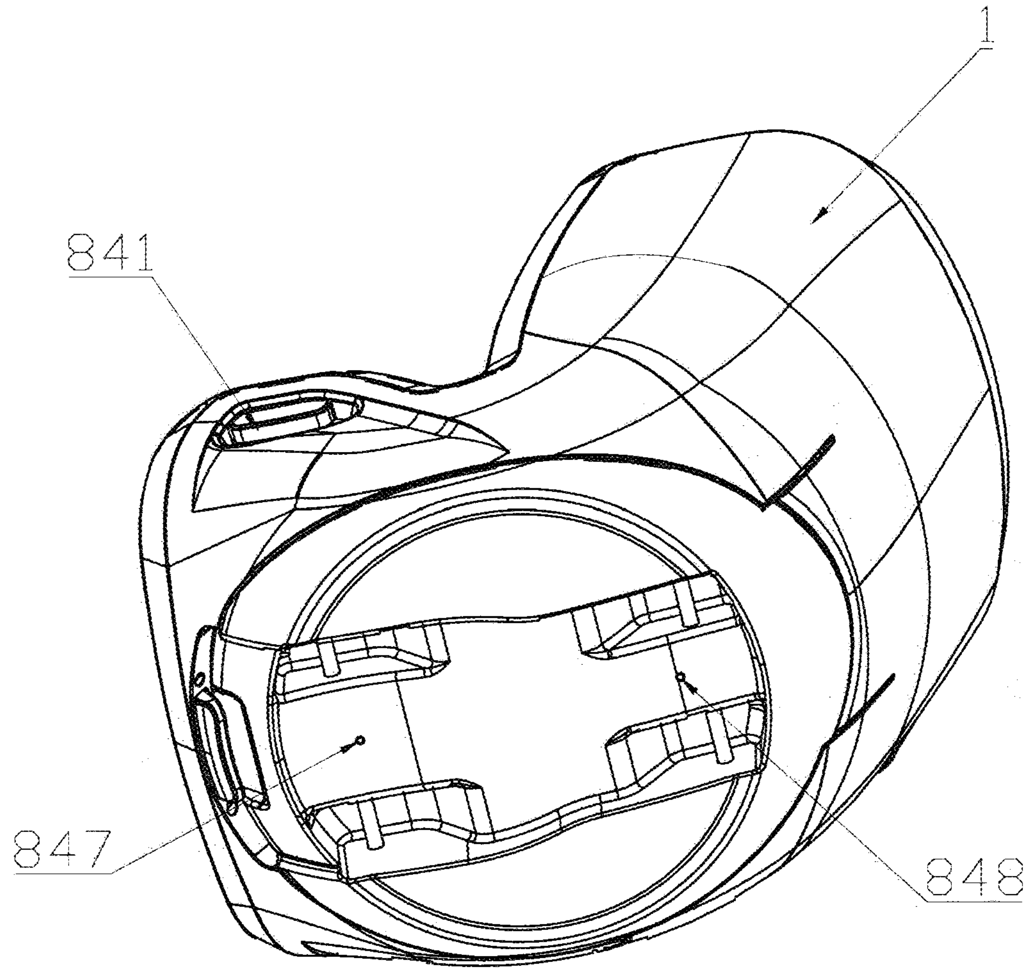
FIG. 34 is a perspective view of the seat body of the child safety seat according to another embodiment of the present disclosure.

Specifically, as shown in FIG. 31, FIG. 33, and FIG. 39, the locking assembly 810 includes a locking member 811, a first locking hole 812, a second locking hole 813, and a second reset member 814. The first locking hole 812 and the second locking hole 813 are arranged on front and rear sides of the rotating lower cover 404 respectively. As shown in FIG. 31, the locking member 811 is slidably arranged in the mounting receptacle 405, specifically located on a front side of the mounting receptacle 405. In other embodiments, the locking member 811 may be arranged on a rear side of the mounting receptacle 405. As shown in FIG. 39, a front side of the second mounting seat 401 is also provided with a reinforcing iron sheet 407, and the locking member 811 may slide to protrude from the reinforcing iron sheet 407 and be inserted into the first locking hole 812 or the second locking hole 813, thereby realizing locking between the turntable 402 and the second mounting seat 401. The second reset member 814 is arranged between the second mounting seat 401 and the locking member 811. Specifically, two ends of the second reset member 814 abut against the locking member 811 and a groove bottom of the mounting receptacle 405 respectively. In this way, the second reset member 814 biases the locking member 811 to move toward a direction close to the turntable 402.

Figure 32:
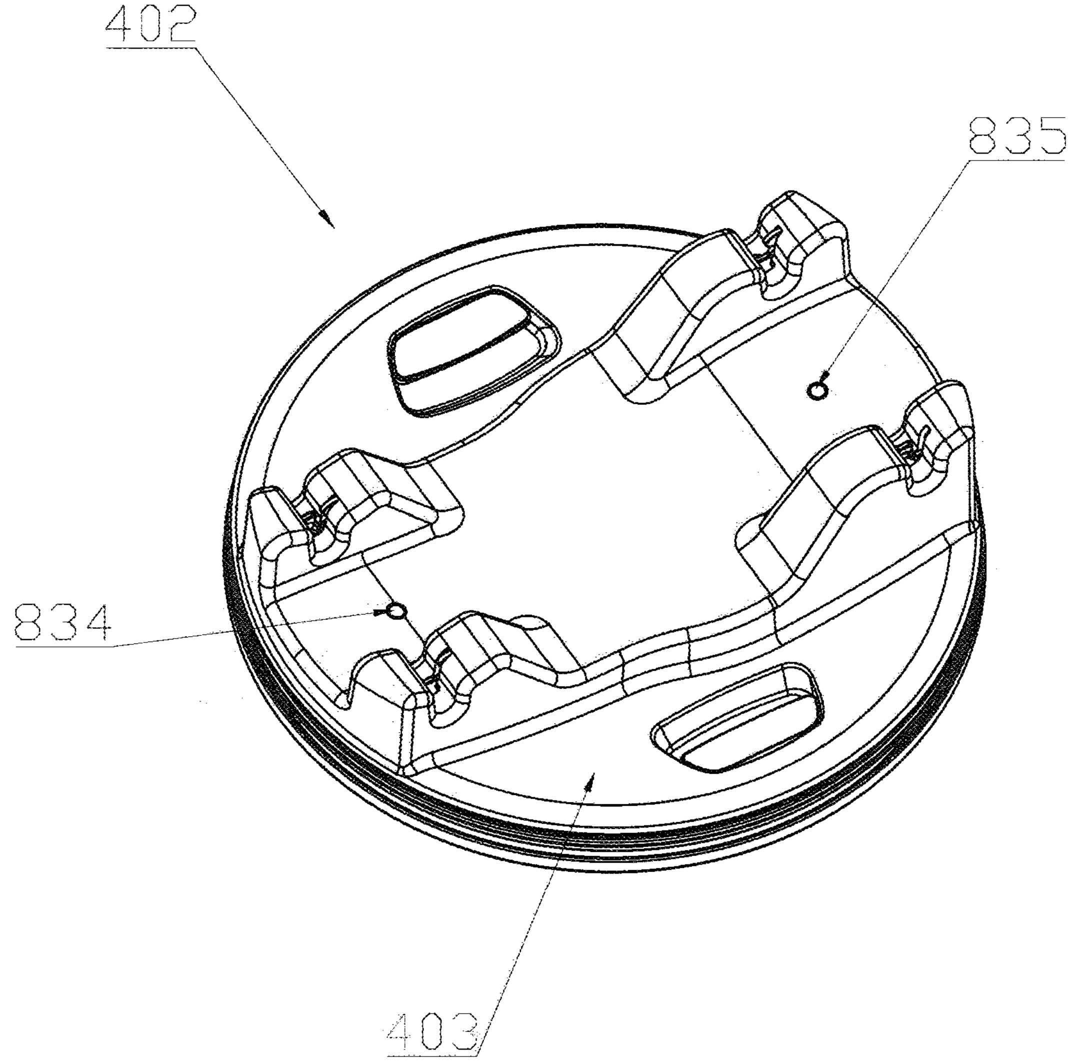
FIG. 32 is a perspective view of the turntable of the child safety seat according to another embodiment of the present disclosure.

Specifically, as shown in FIG. 32 and FIG. 39, the linkage assembly 830 includes a first pushing member 834 and a first pushing member 835. Both the first pushing member 834 and the first pushing member 835 are slidably arranged in the accommodating cavity 408 and respectively opposite to the first locking hole 812 and the second locking hole 813. Both the first pushing member 834 and the first pushing member 835 are generally of a pin-shaped structure. When the turntable 402 is at the first rotation position, i.e., in the forward-facing use mode, the first pushing member 834 abuts against an end of the locking member 811 protruding from the reinforcing iron sheet 407. When the turntable 402 is at the second rotation position, i.e., in the rearward-facing use mode, the second pushing member 835 abuts against an end of the locking member 811 protruding from the reinforcing iron sheet 407.

Figure 36:
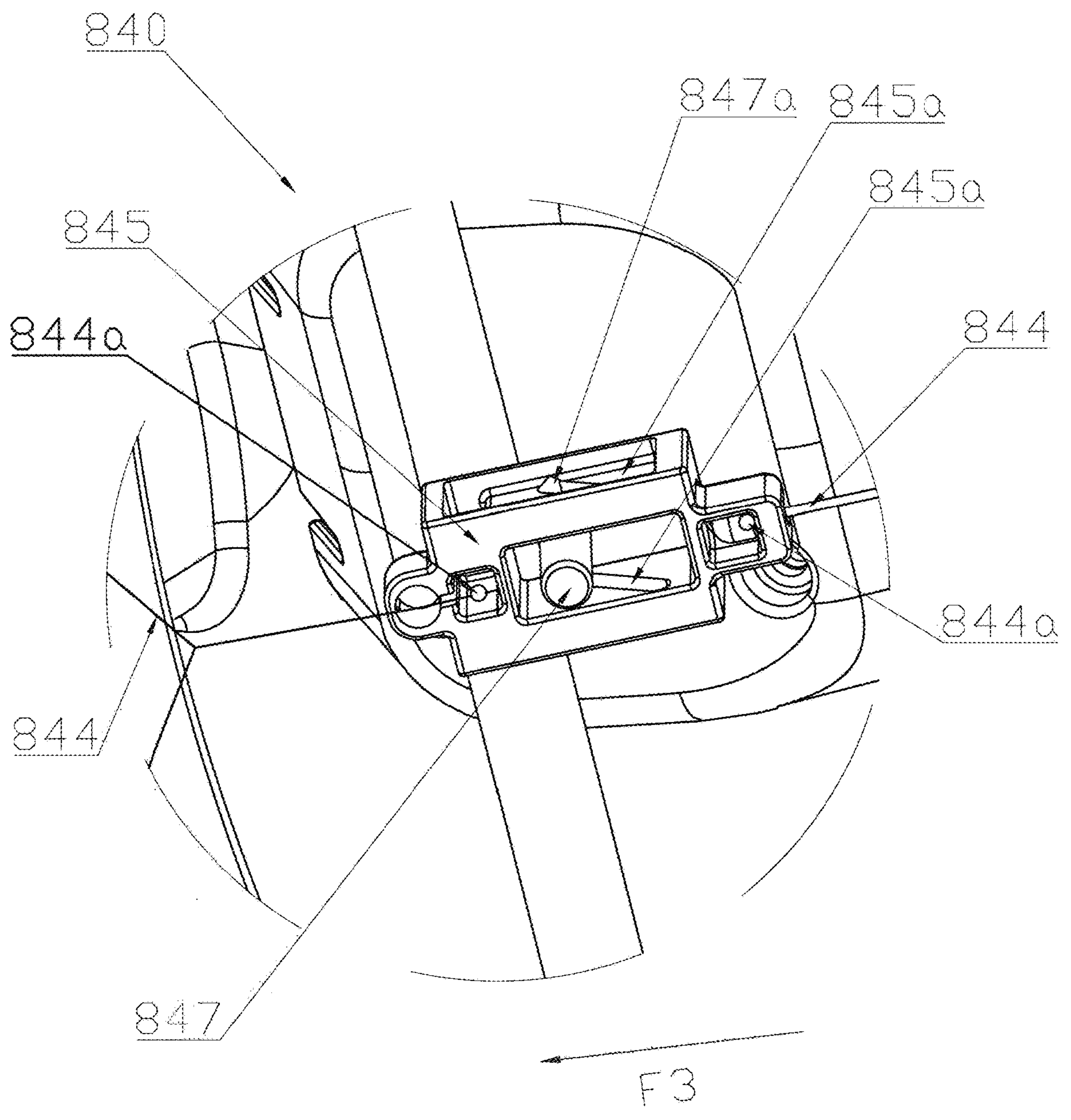
FIG. 36 is an enlarged view of a portion G in FIG. 35.
Figure 37:
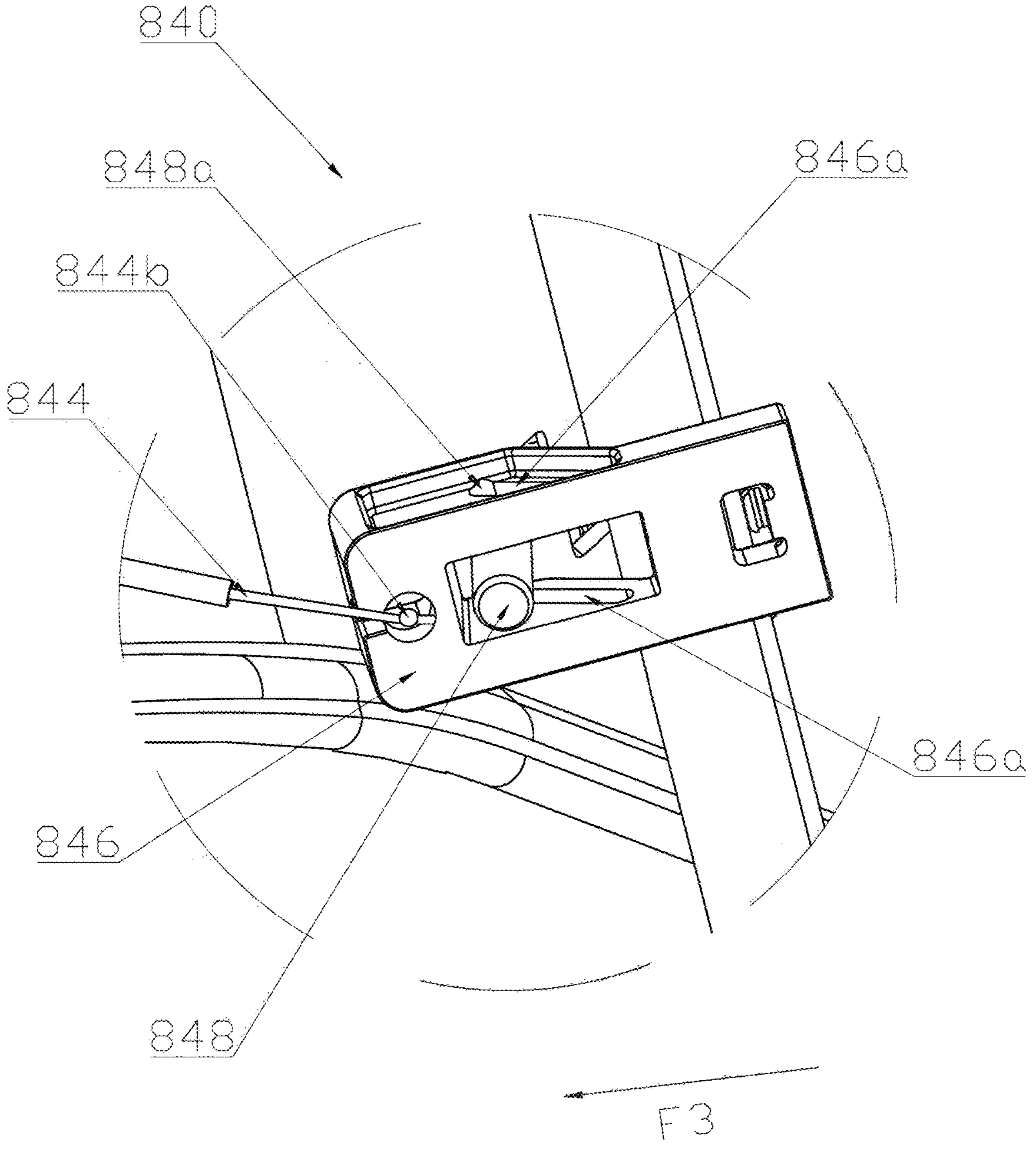
FIG. 37 is an enlarged view of a portion H in FIG. 35.
Figure 38:
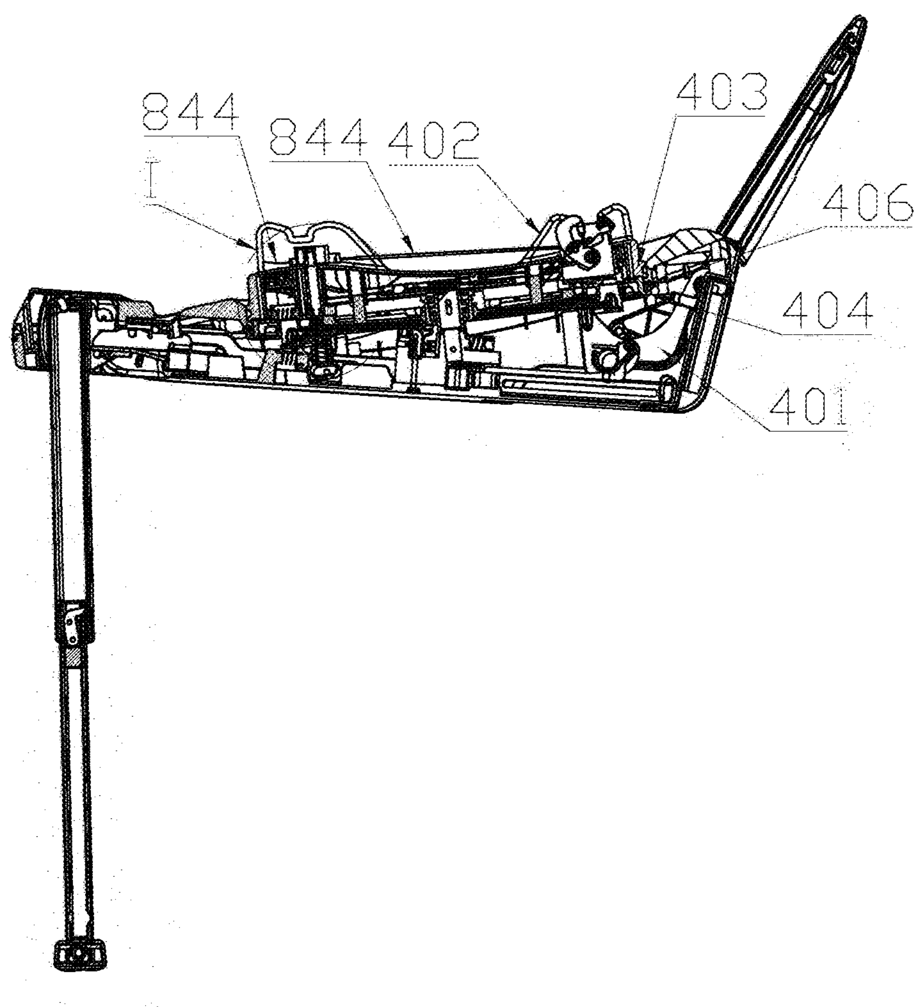
FIG. 38 is a side sectional view of the second mounting seat of the child safety seat according to another embodiment of the present disclosure.

As shown in FIG. 35 to FIG. 37, the structure of the second operating assembly 840 is substantially the same as that in the previous embodiment, and a difference is that the second operating assembly 840 in this embodiment includes two driving members, which are a first driving member 845 and a second driving member 846 respectively. The second operating assembly 840 further includes two actuating members, which are a first actuating member 847 and a second actuating member 848 respectively. One end of each first traction member 844 is connected to the second operating member 841 on either side of the seat body 1, and the other end of each first traction member 844 successively passes through the first driving member 845 and the second driving member 846. Each first traction member 844 has a first engaging protrusion 844*a* and a second engaging protrusion 844*b*. The first engaging protrusion 844*a* and the second engaging protrusion 844*b* are engaged to the first driving member 845 and the second driving member 846 respectively. Two first engaging protrusions 844*a* are provided and are respectively engaged to two ends of the first driving member 845. One second engaging protrusion 844*b* is provided and is engaged to an end of the second driving member 846 close to the first driving member 845. The first driving member 845 and the second driving member 846 can be pulled, through one first traction member 844, to move along the direction F3 or the direction opposite to the direction F3 only by pulling the second operating member 841 on either side of the seat body 1. As shown in FIG. 38 and FIG. 39, the first actuating member 847 and the second actuating member 848 respectively protrude from a bottom surface of the seat body 1 and abut against one ends of the first pushing member 834 and the second pushing member 835 away from the locking member 811, or the one ends of the first pushing member 834 and the second pushing member 835 away from the locking member 811 protrude from the rotating upper cover 403 to abut against the first actuating member 847 and the second actuating member 848.

Figure 41:
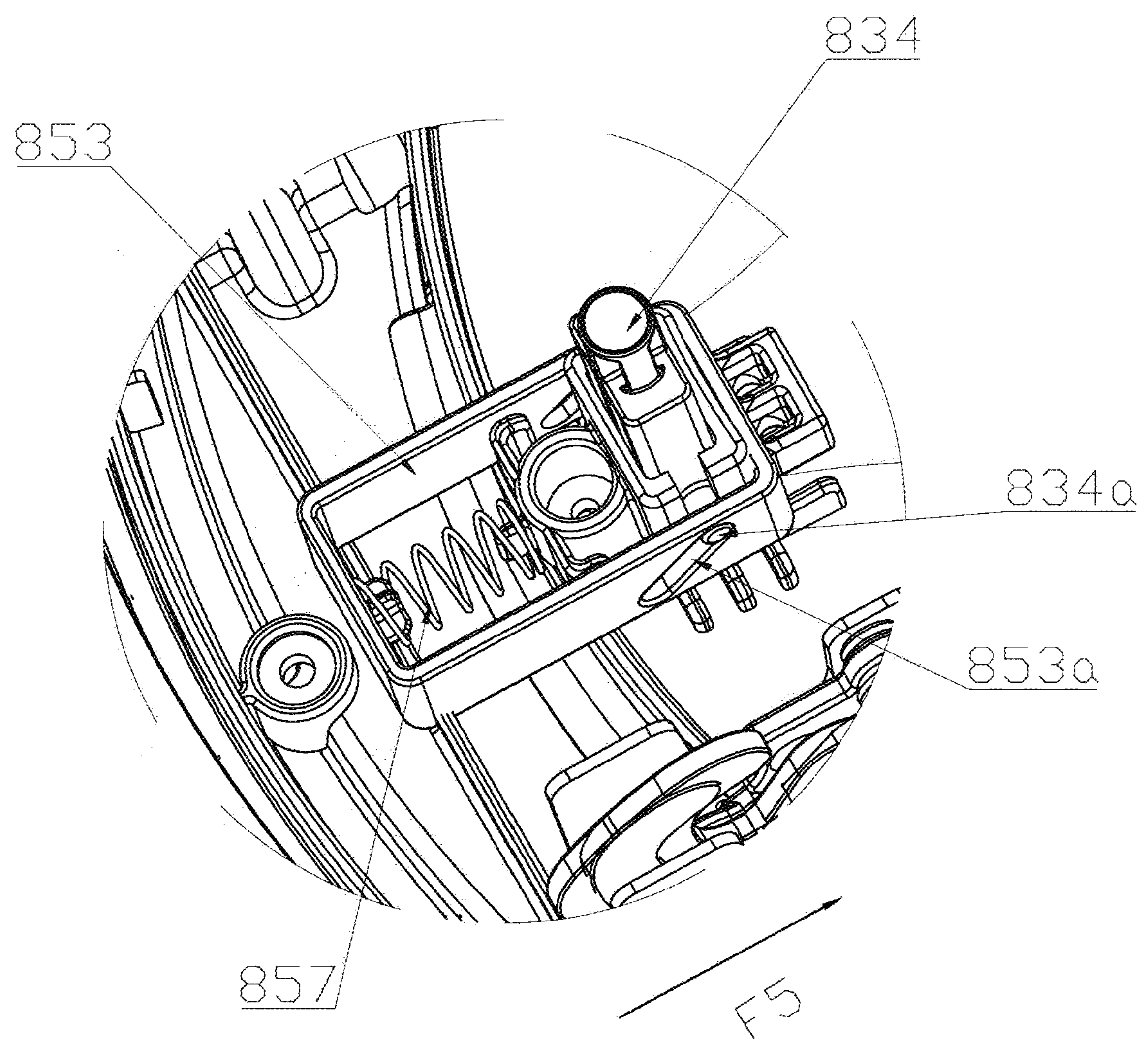
FIG. 41 is an enlarged view of a portion J in FIG. 40.
Figure 42:
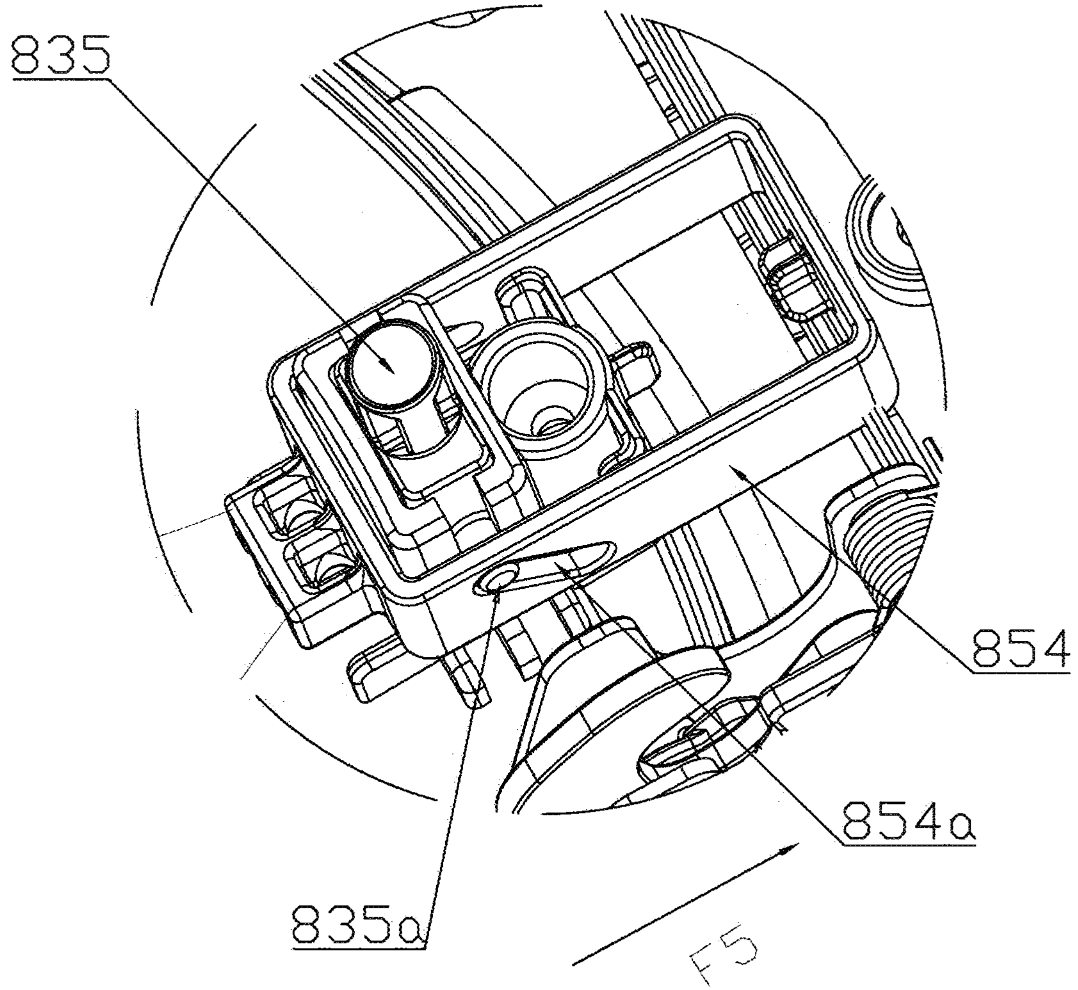
FIG. 42 is an enlarged view of a portion K in FIG. 40.

Specifically, as shown in FIG. 40 to FIG. 42, the third operating assembly 850 includes a third operating member 851, a third traction member 852, a third driving member 853, a fourth driving member 854, and a driving reset member 857. The third driving member 853 and the fourth driving member 854 are provided with a third sliding chute 853*a* and a fourth sliding chute 854*a* respectively. The first pushing member 834 and the second pushing member 835 are provided with a third sliding guide post 834*a* and a fourth sliding guide post 835*a* respectively. The third sliding guide post 834*a* and the fourth sliding guide post 835*a* are fitted with the third sliding chute 853*a* and the fourth sliding chute 854*a* respectively. In other embodiments, the third operating assembly 850 may additionally include a third actuating member (not shown in the figure) and a fourth actuating member (not shown in the figure). The third sliding guide post 834*a* and the fourth sliding guide post 835*a* are arranged on the third actuating member and the fourth actuating member respectively, without sharing the first pushing member 834 and the second pushing member 835 with the second operating assembly 830. The third operating member 851, the third traction member 852, the third driving member 853, the fourth driving member 854, and the driving reset member 857 are all arranged in the turntable 402. Specifically, left and right sides of the turntable 402 are each provided with a third operating assembly 850. Taking the third operating assembly 850 arranged on one side of the turntable 402 as an example, the third operating assembly 850 includes one third operating member 851 and two third traction members 852. One ends of the two third traction members 852 are connected to the third operating member 851, and the other ends of the two third traction members 852 are respectively connected to the third driving member 853 and the fourth driving member 854. The structure and function of the third traction member 852 are similar to those of the first traction member 844, and the locking member 811 is also driven to move by pulling the third driving member 853 and the fourth driving member 854. In this embodiment, the third operating member 851 is a pull handle.

A specific operation process of the fourth locking mechanism 800 in this embodiment is as follows.

When the turntable 402 is required to be unlocked from the second mounting seat 401 to cause the turntable 402 to rotate relative to the second mounting seat 401, as shown in FIG. 40 to FIG. 42, the third operating member 851 may be pulled, so that the third operating member 851 pulls, through the two third traction members 852, the third driving member 853 and the fourth driving member 854 respectively to move toward each other, for example, the third driving member 853 is pulled to move along a direction F5. Then, the first pushing member 834 is driven by the third driving member 853 to move toward a direction close to the second mounting seat 401, and the second pushing member 835 is driven by the fourth driving member 854 to move toward the direction close to the second mounting seat 401. In this case, if the turntable 402 is at the first rotation position, i.e., in the forward-facing use mode, as shown in FIG. 15, the locking member 811 is inserted into the first locking hole 812, and the second pushing member 835 presses against the locking member 811 to also move toward the direction close to the second mounting seat 401, until the locking member 811 is pressed out of the first locking hole 812. In this case, the locking member 811 is completely detached from the turntable 402 and is located in the mounting receptacle 405. In this case, the turntable 402 is unlocked from the second mounting seat 401, and the turntable 402 can be rotated, for example, from the first rotation position to the second rotation position, so that the turntable 402 and the seat body 1 mounted on the turntable 402 are rotated from the forward-facing use mode to the rearward-facing use mode, as shown in FIG. 15 and FIG. 16. Then, the third operating member 851 is released, the third operating member 851 resets under an elastic force of an internal reset spring (not shown in the figure) thereof, and the third driving member 853 not pulled by the third traction member 852 moves along a direction opposite to the direction F5 under the action of the driving reset member 857, as shown in FIG. 41. Then, the first pushing member 834 is driven by the third driving member 853 to move along a direction away from the second mounting seat 401, and the locking member 811 not pushed by the first pushing member 834 moves along the direction away from the second mounting seat 401 under an elastic force of the second reset member 814 and is inserted into the second locking hole 813. Then, the turntable 402 is relatively locked with the second mounting seat 401. That is, the turntable 402 and the seat body 1 mounted on the turntable 402 are locked in the rearward-facing use mode.

As shown in FIG. 35 to FIG. 37, the second operating member 841 located on either side of the seat body 1 may alternatively be pulled, and the second operating member 841 pulls, through the first traction member 844, the first driving member 845 and the second driving member 846 to move along the direction F3. As shown in FIG. 38 and FIG. 39, then, the first actuating member 847 is driven by the first driving member 845 to move along a direction close to the second mounting seat 401, and at the same time, the first pushing member 834 is pressed to also move along a direction F4. The second actuating member 848 is driven by the second driving member 846 to move along a direction close to the second mounting seat 401, and at the same time, the second pushing member 835 is pressed to also move along the direction close to the second mounting seat 401. In this case, if the turntable 402 is at the first rotation position, i.e., in the forward-facing use mode, as shown in FIG. 15, the locking member 811 is inserted into the first locking hole 812, and the first pushing member 834 presses against the locking member 811 to also move toward the direction F4, until the locking member 811 is pressed out of the first locking hole 812. In this case, the locking member 811 is completely detached from the turntable 402 and is located in the mounting receptacle 405. In this case, the turntable 402 is unlocked from the second mounting seat 401, and the turntable 402 can be rotated, for example, from the first rotation position to the second rotation position, so that the turntable 402 and the seat body 1 mounted on the turntable 402 are rotated from the forward-facing use mode to the rearward-facing use mode, as shown in FIG. 16. In this case, the locking member 811 is opposite to the second locking hole 813. Then, the second operating member 841 is released, the second operating member 841 resets under the action of the internal reset spring thereof, the first driving member 845 resets under the action of a driving reset member (not shown in the figure), and the second driving member 846 is driven, through the first traction member 844, to move along a direction opposite to the direction F3. In other embodiments, the second driving member 846 may alternatively be provided with a driving reset member, and the second driving member 846 resets through the driving reset member. Then, the first actuating member 847 is driven by the first driving member 845 to move along a direction away from the second mounting seat 401 and no longer generates a pressing force on the first pushing member 834, and the second actuating member 848 is driven by the second driving member 846 to move along a direction away from the second mounting seat 401 and no longer generates a pressing force on the second pushing member 835. The locking member 811 on which the second pushing member 835 exerts no force moves, under an elastic force of the second reset member 814, along a direction away from the second mounting seat 401 and is inserted into the second locking hole 813. Then, the turntable 402 is relatively locked with the second mounting seat 401. That is, the turntable 402 and the seat body 1 mounted on the turntable 402 are locked in the rearward-facing use mode.

The above embodiments are merely examples, and the fourth locking mechanism 800 may alternatively be in another form, provided that locking and unlocking between the turntable 402 and the second mounting seat 401 can be realized.

The above child safety seat and the seat base 2 have at least the following technical effects.

At present, most child safety seats on the market prevent forward-facing use of the child safety seats by younger children through artificial mechanical means. Such an anti-misuse mechanism is relatively complex in structure and high in manufacturing costs on the one hand, and is more dependent on human factors on the other hand. If a caregiver is not strong in safety awareness, it is difficult to play a good anti-misuse role. In the seat base 2 for a child safety seat of the present disclosure, the turntable 402 is rotatably arranged on the second mounting seat 401, and the second control module 50 can receive the child attribute and position information of the turntable 402 detected by the fifth detection apparatus 400, for example, whether the turntable 402 is at the first rotation position or the second rotation position (the first rotation position and the second rotation position correspond to the forward-facing use mode and the rearward-facing use mode respectively), judge whether the child attribute matches the position information of the turntable 402, and outputs a matching signal, to remind the caregiver of whether the turntable 402 is at a correct position, that is, remind the caregiver of whether the seat body 1 mounted on the turntable 402 is in a correct use mode. In this way, forward-facing use of the child safety seat by younger children caused by negligence or an improper operation of the caregiver can be well prevented, which improves safety performance of the child safety seat, and is simple in structure and easy to implement.

Figure 45:
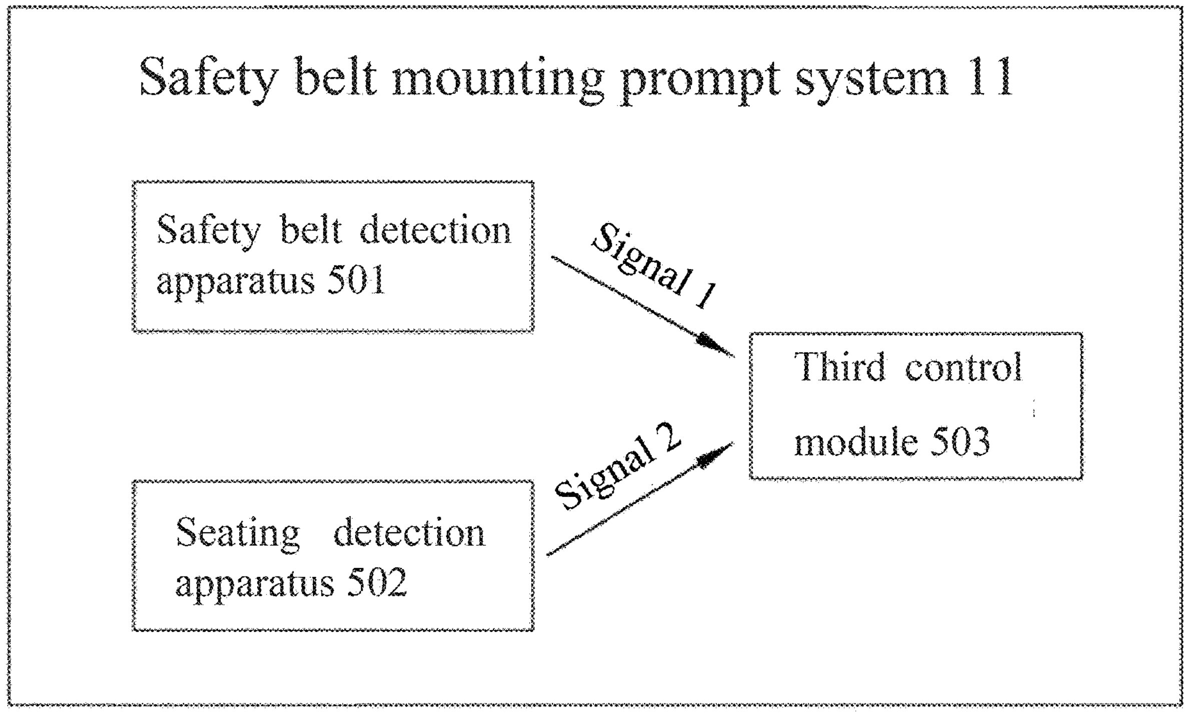
FIG. 45 is a schematic diagram of a safety belt mounting prompt system according to an embodiment.

FIG. 45 is a schematic diagram of a safety belt mounting prompt system according to an exemplary implementation.

In an embodiment, the safety belt mounting prompt system is applied to a child safety seat. However, those skilled in the art can realize that the safety belt mounting prompt system according to the embodiments of the present disclosure is also applicable to other safety seats, such as pet safety seats, which is not limited in the present disclosure.

Referring to FIG. 45, in an embodiment, a safety belt mounting prompt system 11 includes a safety belt detection apparatus 501, a seating detection apparatus 502, and a third control module 503. In some embodiments, the third control module 503 is a same control module as the first control module 120 and/or the second control module 50 in the foregoing embodiment.

The safety belt detection apparatus 501 is configured to detect whether a safety belt passes through a safety belt path of a child safety seat, and send a corresponding first signal to the third control module 503. The seating detection apparatus 502 is configured to detect whether a target object is seated on the child safety seat, and send a corresponding second signal to the third control module 503. The third control module 503 is configured to receive the first signal and the second signal. The first signal and the second signal are used to generate a prompt signal. The first signal is generated by the safety belt detection apparatus 501 according to whether a safety belt passes through the safety belt path of the child safety seat. The second signal is generated by the seating detection apparatus 502 according to whether a target object is seated on the child safety seat.

In an embodiment, the first signal includes a safety belt mounting signal and a safety belt non-mounting signal. When the safety belt detection apparatus 501 detects that a safety belt passes through the safety belt path of the child safety seat, the safety belt detection apparatus 501 sends the safety belt mounting signal to the third control module 503. When the safety belt detection apparatus 501 does not detect that a safety belt passes through the safety belt path of the child safety seat, the safety belt detection apparatus 501 sends the safety belt non-mounting signal to the third control module 503.

In an embodiment, the second signal includes a seating signal and a non-seating signal. The seating detection apparatus 502, when detecting that a target object is seated on the child safety seat, sends the seating signal to the third control module 503. When not detecting that a target object is seated on the child safety seat, the seating detection apparatus 502 sends the non-seating signal to the third control module 503, or the seating detection apparatus 502 does not send the seating signal to the third control module 503.

In an embodiment, the third control module 503 is configured to generate a prompt signal when receiving the seating signal and the safety belt non-mounting signal.

In an embodiment, the third control module 503 alternatively sends the first signal and the second signal received to a terminal device, so that the terminal device generates the prompt signal based on the first signal and the second signal. The process in which the terminal device generates the prompt signal based on the first signal and the second signal is similar to the process in which the third control module 503 generates the prompt signal based on the first signal and the second signal. Details are not described again in the present disclosure.

Referring to FIG. 45, the safety belt detection apparatus 501 is configured to detect whether a safety belt passes through the safety belt path of the child safety seat, and the safety belt detection apparatus 501 sends the safety belt mounting signal (signal 1) to the third control module 503 when detecting that a safety belt passes through the safety belt path of the child safety seat.

The safety belt path of the child safety seat refers to a path where a safety belt of the vehicle is located when the child safety seat is fixed to the vehicle seat by the safety belt of the vehicle.

The seating detection apparatus 502 is configured to detect whether a target object is seated on the child safety seat, and send the seating signal (signal 2) to the third control module 503 when detecting that a target object is seated on the child safety seat.

In this embodiment, the target object includes an infant using the child safety seat. However, in other embodiments, the target object may further include a pet or the like, which is not limited in the present disclosure.

The third control module 503 is configured to generate the prompt signal when receiving the seating signal but not receiving the safety belt mounting signal, or the third control module 503 is configured to generate the prompt signal when receiving the seating signal and receiving the safety belt non-mounting signal.

Specifically, if the third control module 503 receives the seating signal but does not receive the safety belt mounting signal, or the third control module 503 receives the seating signal and receives the safety belt non-mounting signal, it indicates that a target object has been seated on the child safety seat but the safety belt of the vehicle does not fix the child safety seat and the target object to the vehicle seat. In this case, the third control module 503 automatically generates the prompt signal to prompt the user to fix the child safety seat by using the safety belt of the vehicle.

The third control module 503 is configured to not generate the prompt signal when not receiving the seating signal. Similarly, the third control module 503 may not generate the prompt signal either when receiving the seating signal and receiving the safety belt mounting signal.

Specifically, if the third control module 503 does not receive the seating signal, it indicates that a target object is not seated on the child safety seat. In this case, there is no need to prompt the user to fix the child safety seat by using the safety belt of the vehicle. If the third control module 503 receives the seating signal and receives the safety belt mounting signal, it indicates that a target object has been seated on the child safety seat and the user has fixed the child safety seat and the target object to the vehicle seat by using the safety belt of the vehicle. In this case, there is also no need to fix the child safety seat by using the safety belt of the vehicle.

In the safety belt mounting prompt system according to this embodiment of the present disclosure, the safety belt detection apparatus detects whether a safety belt passes through the safety belt path of the child safety seat, and sends the corresponding first signal to the third control module. The seating detection apparatus detects whether a target object is seated on the child safety seat, and sends the corresponding second signal to the third control module. The third control module receives the first signal and the second signal. The first signal and the second signal are used to generate the prompt signal. The system can automatically generate the prompt signal according to whether a safety belt passes through the safety belt path of the child safety seat and whether a target object is seated on the child safety seat, to prompt the user to fix the child safety seat by using the safety belt of the vehicle. For example, when the target object has been seated on the child safety seat but the safety belt of the vehicle does not fix the child safety seat and the target object to the vehicle seat, or the safety belt of the vehicle does not correctly fix the child safety seat and the target object to the vehicle seat, the prompt signal is automatically generated, which can effectively prevent fixing of the child safety seat without use of or with incorrect use of the safety belt of the vehicle due to negligence of the user, and improve stability of use of the child safety seat, thereby ensuring safety of the target object.

Figure 46:
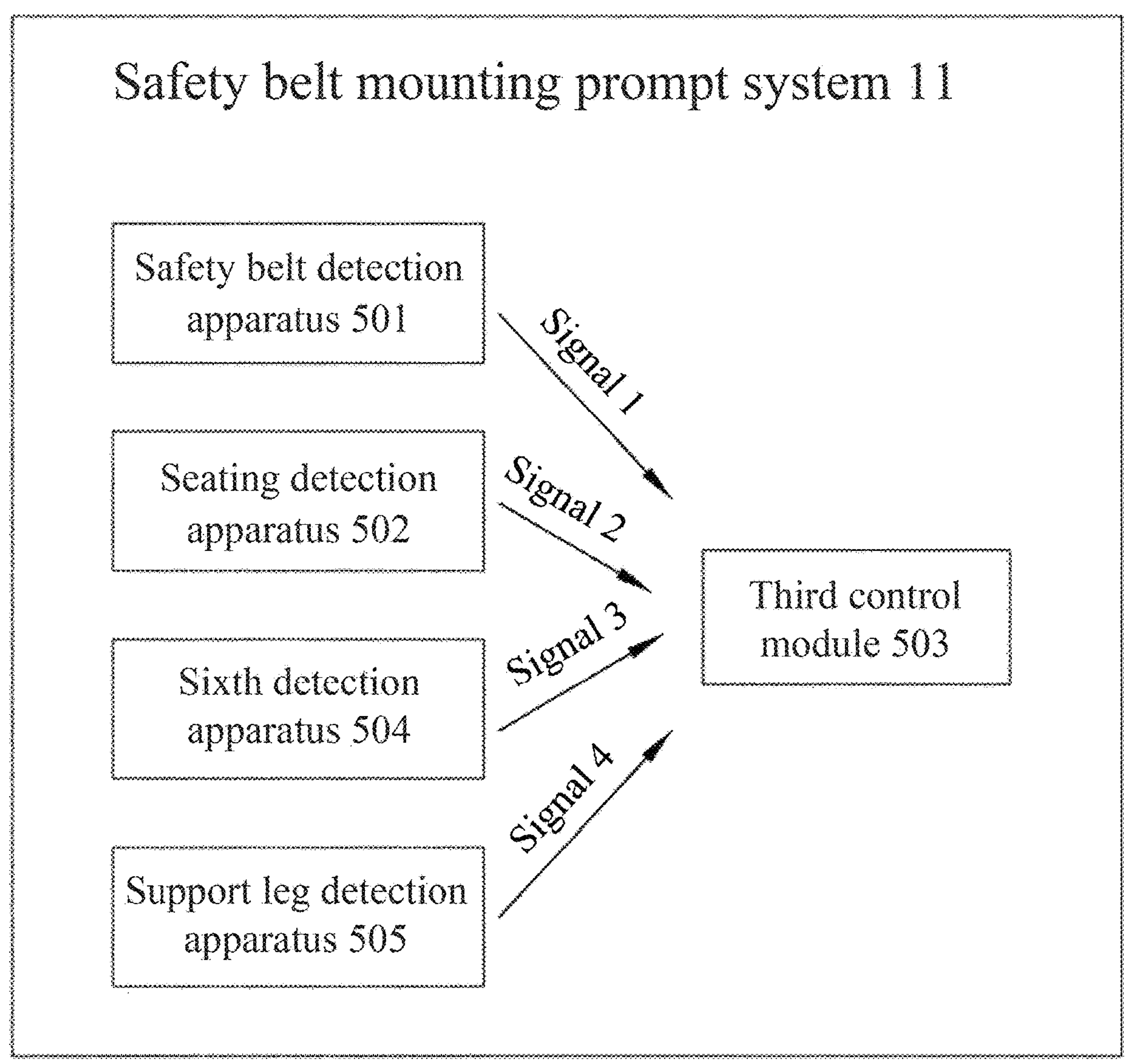
FIG. 46 is a schematic diagram of another safety belt mounting prompt system according to an embodiment.

FIG. 46 is a schematic diagram of the safety belt mounting prompt system according to another exemplary implementation.

Referring to FIG. 46, in an embodiment, the safety belt mounting prompt system 12 includes a safety belt detection apparatus 501, a seating detection apparatus 502, a third control module 503, a sixth detection apparatus 504, and a support leg detection apparatus 505. Optionally, in some embodiments, the sixth detection apparatus 504 is a same detection apparatus as the third detection apparatus 150 and/or the fifth detection apparatus 400 in the foregoing embodiment.

Related descriptions of the safety belt detection apparatus 501, the seating detection apparatus 502, and the third control module 503 may be obtained with reference to the related descriptions in the embodiment in FIG. 45 above. Details are not described herein again in the present disclosure.

The safety belt path of the child safety seat refers to a path where a safety belt of the vehicle is located when the child safety seat and the target object are fixed to the vehicle seat by the safety belt of the vehicle.

The sixth detection apparatus 502 is configured to detect a use mode of the child safety seat and send a corresponding third signal to the third control module. The support leg detection apparatus 505 is configured to detect whether a support leg of the child safety seat is folded, and send a corresponding fourth signal to the third control module. The third control module is configured to receive the first signal, the second signal, the third signal, and the fourth signal. The first signal, the second signal, the third signal, and the fourth signal are used to generate the prompt signal.

In an embodiment, the third signal includes a forward-facing use signal and a rearward-facing use signal. The sixth detection apparatus 504 is configured to detect the use mode of the child safety seat. The use mode of the child safety seat includes a forward-facing use mode and a rearward-facing use mode. When the sixth detection apparatus 504 detects that the use mode of the child safety seat is the forward-facing use mode, the sixth detection apparatus 504 sends a forward-facing use signal (signal 3) to the third control module 503. When the sixth detection apparatus 504 detects that the use mode of the child safety seat is the rearward-facing use mode, the sixth detection apparatus 504 sends the rearward-facing use signal to the third control module 503 without sending the forward-facing use signal to the third control module 503.

In an embodiment, the fourth signal includes a support leg folding signal. The support leg detection apparatus 505 is configured to detect whether the support leg of the child safety seat is folded, and send the support leg folding signal (signal 4) to the third control module 503 when the support leg is folded. The support leg detection apparatus 505 is configured to not send the support leg folding signal to the third control module 503 when the support leg is unfolded.

In an embodiment, the third control module 503 may alternatively send the first signal, the second signal, the third signal, and the fourth signal received to a terminal device, so that the terminal device generates the prompt signal based on the first signal, the second signal, the third signal, and the fourth signal. The process in which the terminal device generates the prompt signal based on the first signal, the second signal, the third signal, and the fourth signal is similar to the process in which the third control module 503 generates the prompt signal based on the first signal, the second signal, the third signal, and the fourth signal. Details are not described again in the present disclosure.

Generally, the child safety seat includes three use modes: a first use mode, a second use mode, and a third use mode. The first use mode applies to older children (e.g., children older than or equal to a first preset age), in which the support leg of the child safety seat is required to be folded for use when the child safety seat is used in the forward-facing use mode. In the first use mode, there is a need to fix both the child safety seat and the target object to the vehicle seat through the safety belt of the vehicle.

The second use mode applies to older children (e.g., children older than or equal to a second preset age and younger than the first preset age), in which the support leg is in an unfolded state when the child safety seat is used in the forward-facing use mode. The child safety seat is fixed to the vehicle seat through an ISOFIX and the support leg. A bottom end of the support leg is in contact with the vehicle floor. The target object is restrained in the child safety seat through a five-point safety belt.

The third use mode applies to younger children (e.g., children younger than the second preset age), in which the support leg is in the unfolded state when the child safety seat is used in the rearward-facing use mode. The child safety seat is fixed to the vehicle seat through an ISOFIX and the support leg. The bottom end of the support leg is in contact with the vehicle floor. The target object is restrained in the child safety seat through the five-point safety belt.

When the child safety seat adopts the first use mode, the third control module 503 generates the prompt signal when receiving the seating signal (signal 2), the forward-facing use signal (signal 3), and the support leg folding signal (signal 4) and not receiving the safety belt mounting signal (signal 1). Alternatively, the third control module 503 generates the prompt signal when receiving the seating signal (signal 2), the forward-facing use signal (signal 3), and the support leg folding signal (signal 4) and receiving the safety belt non-mounting signal. Specifically, the prompt signal is generated if the third control module 503 receives the seating signal, the forward-facing use signal, and the support leg folding signal and does not receive the safety belt mounting signal, or the third control module 503 receives the seating signal, the forward-facing use signal, and the support leg folding signal and receives the safety belt non-mounting signal, which indicates that a target object has been seated on the child safety seat, the child safety seat is in the forward-facing use mode, and the support leg has been folded but the safety belt of the vehicle does not fix the child safety seat and the target object to the vehicle seat, or the safety belt of the vehicle does not correctly fix the child safety seat and the target object to the vehicle seat. In this case, the third control module 503 automatically generates the prompt signal to prompt the user to fix the child safety seat by using the safety belt of the vehicle.

When the child safety seat adopts the second use mode or the third use mode, the support leg is in the unfolded state. In this case, the support leg detection apparatus 505 will not send the support leg folding signal to the third control module 503. The third control module 503 is configured to not generate the prompt signal when not receiving the support leg folding signal.

Similarly, the third control module 503 is configured to not generate the prompt signal when receiving the safety belt mounting signal. Similarly, the third control module 503 is configured to not generate the prompt signal either when not receiving the seating signal. Similarly, the third control module 503 is configured to not generate the prompt signal either when not receiving the safety belt mounting signal, receiving the seating signal, and not receiving the forward-facing use signal.

Specifically, if the third control module 503 does not receive the support leg folding signal, it indicates that the use mode of the child safety seat is the second use mode or the third use mode. In this case, the child safety seat realizes a fixed connection with the vehicle through the ISOFIX and the support leg, and the target object is restrained in the child safety seat through the five-point safety belt, without reminding the user to fix the child safety seat by using the safety belt of the vehicle. If the third control module 503 receives the safety belt mounting signal, it indicates that the user has fixed the child safety seat to the vehicle seat by using the safety belt of the vehicle. In this case, there is no need to remind the user to fix the child safety seat by using the safety belt of the vehicle. If the third control module 503 does not receive the seating signal, it indicates that a target object is not seated on the child safety seat. In this case, there is also no need to remind the user to fix the child safety seat by using the safety belt of the vehicle. If the third control module 503 does not receive the safety belt mounting signal, receives the seating signal, and does not receive the forward-facing use signal, it indicates that a target object has been seated and the child safety seat adopts the rearward-facing use mode. In this case, the child safety seat realizes the fixed connection with the vehicle through the ISOFIX and the support leg, and the target object is restrained in the child safety seat through the five-point safety belt. Therefore, there is also n need to remind the user to fix the child safety seat by using the safety belt of the vehicle.

In the safety belt mounting prompt system according to this embodiment of the present disclosure, the safety belt detection apparatus detects whether a safety belt passes through the safety belt path of the child safety seat, and sends the safety belt mounting signal to the third control module when detecting that a safety belt passes through the safety belt path of the child safety seat. The seating detection apparatus detects whether a target object is seated on the child safety belt, and sends the seating signal to the third control module when detecting that a target object is seated on the child safety belt. The sixth detection apparatus detects the use mode of the child safety seat, and sends the forward-facing use signal to the third control module when detecting that the use mode of the child safety seat is the forward-facing use mode. The support leg detection apparatus detects whether the support leg of the child safety seat is folded, and sends the support leg folding signal to the third control module when detecting that the support leg is folded. The prompt signal is generated when the third control module receives the seating signal, the forward-facing use signal, and the support leg folding signal, and does not receive the safety belt mounting signal, or when the third control module receives the seating signal, the forward-facing use signal, and the support leg folding signal, and receives the safety belt non-mounting signal. The system can automatically generate the prompt signal when the target object has been seated on the child safety seat, the safety seat is in the forward-facing use mode, and the support leg has been folded, but the safety belt of the vehicle does not fix the child safety seat and the target object to the vehicle seat or the safety belt of the vehicle does not correctly fix the child safety seat and the target object to the vehicle seat, to prompt the user to fix the child safety seat by using the safety belt of the vehicle, which effectively prevents fixing of the child safety seat without use of the safety belt of the vehicle due to negligence of the user, and improves stability of use of the child safety seat, thereby ensuring safety of the target object.

Figure 47:
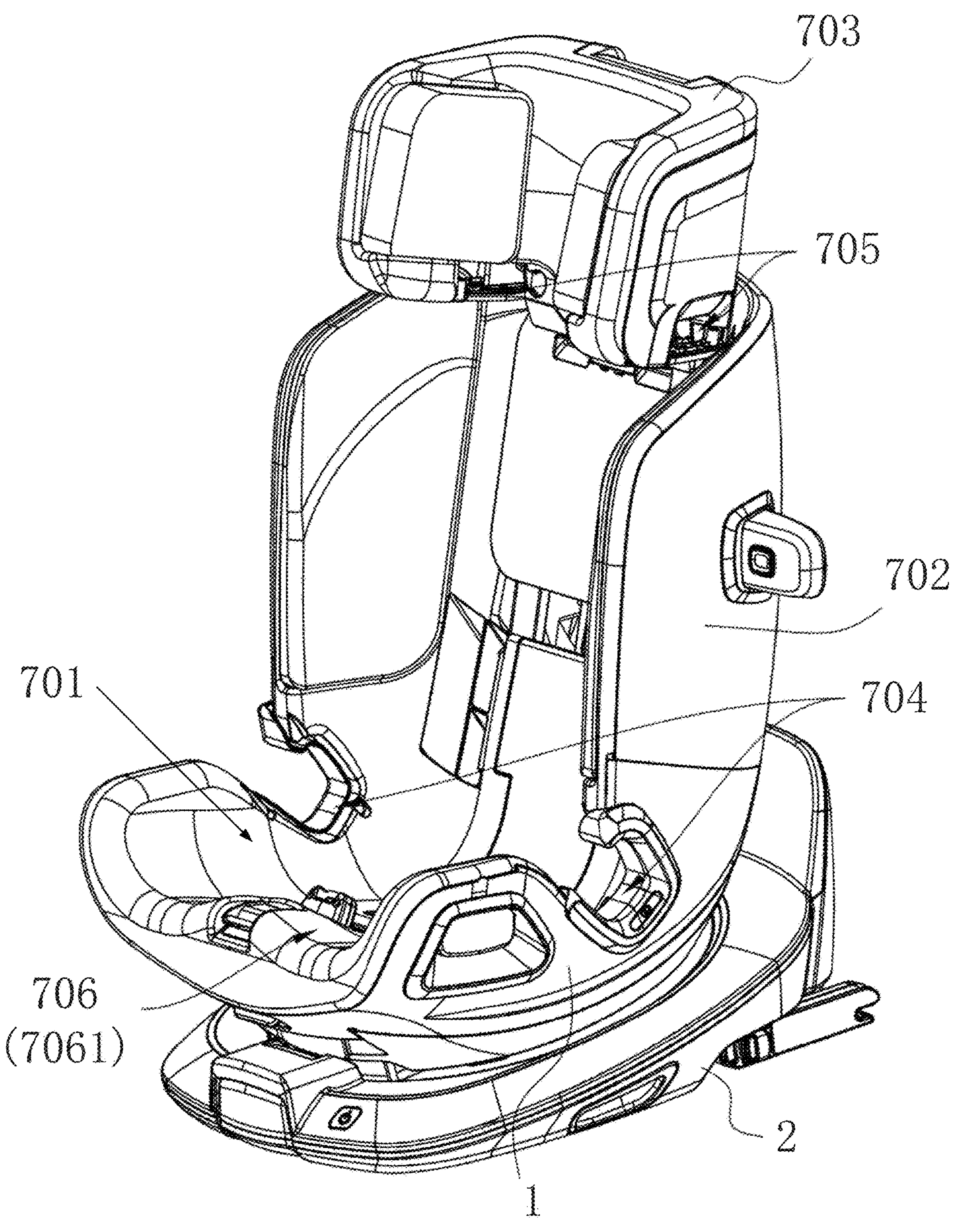
FIG. 47 is a perspective view of the child safety seat provided with the safety belt mounting prompt system according to an embodiment.
Figure 48:
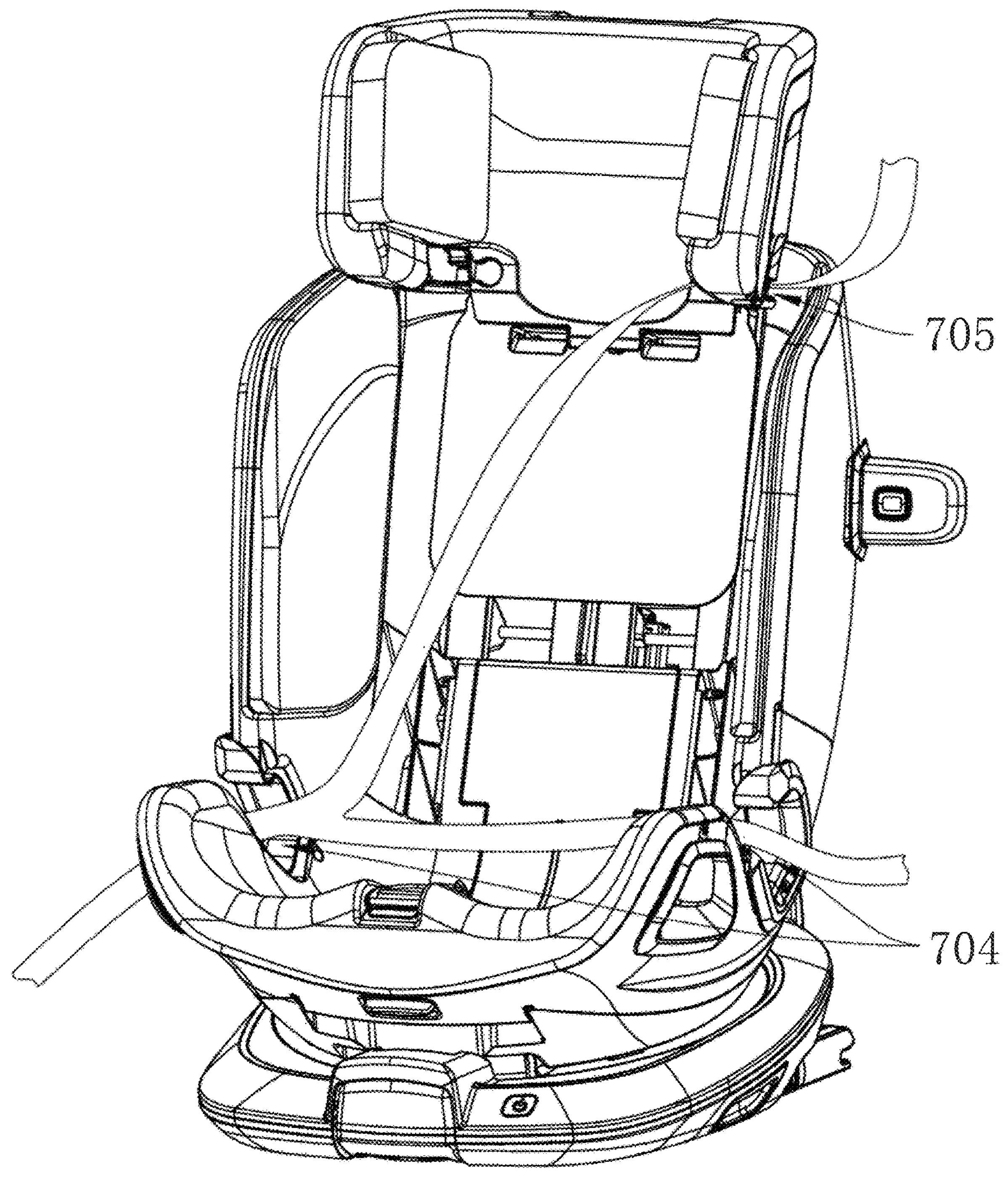
FIG. 48 is a perspective view of the child safety seat fixed by a safety belt of a vehicle according to an embodiment.

FIG. 47 is a schematic perspective view of a child safety seat provided with a safety belt mounting prompt system according to an exemplary implementation, and FIG. 48 is a schematic diagram of a child safety seat fixed by a safety belt of the vehicle according to an exemplary implementation.

Referring to FIG. 47, in an embodiment, the child safety seat includes a seat body 1 and a seat base 2, and the seat body 1 is pivotally connected with the seat base 2, so that a use mode of the seat body 1 can be changed. Specifically, the seat body 1 can switch between a forward-facing use mode and a rearward-facing use mode. The seat body 1 includes a seat portion 701, a backrest portion 702, and a headrest portion 703.

In an embodiment, referring to FIG. 47 and FIG. 48, the safety belt detection apparatus is configured to detect whether a safety belt passes through the safety belt path of the child safety seat. The safety belt path includes a junction 704 between the seat portion 701 and the backrest portion 702 and an area between the backrest portion 702 and the headrest portion 703. As a specific example, the safety belt path includes a guide 705 arranged on the backrest portion 702 or the headrest portion 703.

When the child safety seat according to the embodiments of the present disclosure adopts the first use mode (e.g., a Booster use mode), the safety belt of the vehicle passes between the backrest portion 702 and the headrest portion 703 of the child safety seat (e.g., the guide 705 arranged at a lower end of a side wing of the headrest portion 703), a child seated on the child safety seat, and left and right junctions between the seat portion 701 and the backrest portion 702 of the child safety seat (e.g., concave portions between side wings of the seat portion 701 and side wings of the backrest portion 702), and is fixed to the vehicle seat.

Figure 49:
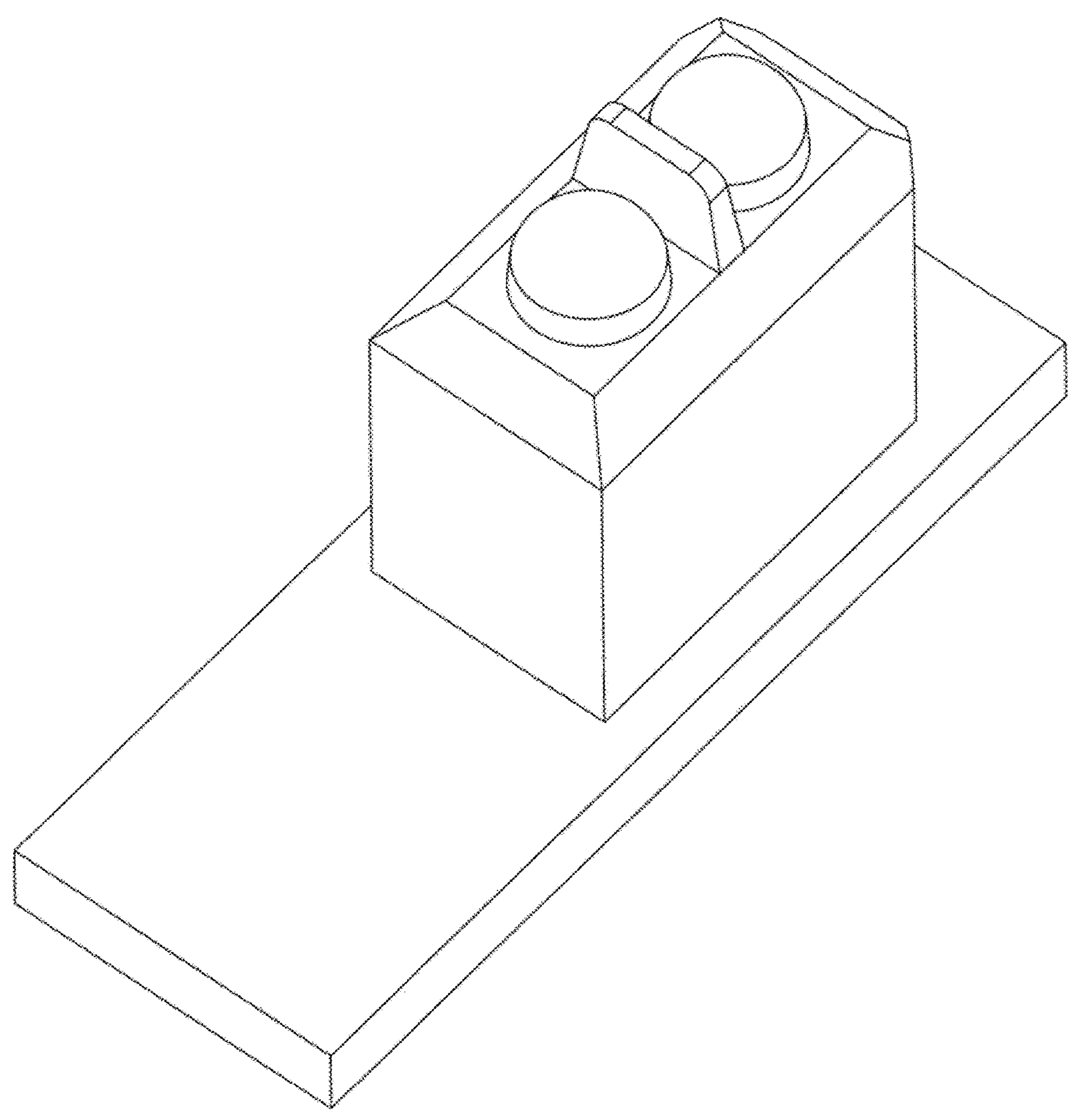
FIG. 49 is a perspective view of a photoelectric sensor according to an embodiment.

In an embodiment, the guide 705 is arranged on the headrest portion 703 or the backrest portion 702. When the guide 705 is arranged on the headrest portion 703, adjustment on a height of the headrest portion 703 can drive a height of a shoulder part of the safety belt to better suit children of different heights. When the guide 705 is arranged on the backrest portion 702, a height of the backrest portion 702 may be adjusted up and down to better suit children of different heights. In an embodiment, the safety belt detection apparatus includes a third photoelectric sensor. The third photoelectric sensor is shown in FIG. 49. One or more third photoelectric sensors may be provided. The third photoelectric sensor is arranged at the junction between the seat portion 701 and the backrest portion 702 (e.g., a concave portion 704 between a side wing of the seat portion 701 and a side wing of the backrest portion 702). The safety belt detection apparatus is configured to send the safety belt mounting signal to the third control module when the third photoelectric sensor detects that a safety belt passes.

In an embodiment, the safety belt detection apparatus includes a third photoelectric sensor and a fourth photoelectric sensor. The third photoelectric sensor and the fourth photoelectric sensor are shown in FIG. 49. One or more third photoelectric sensors may be provided, and one or more fourth photoelectric sensors may be provided. The third photoelectric sensor is arranged at the junction between the seat portion 701 and the backrest portion 702 (e.g., a concave portion 704 between a side wing of the seat portion 701 and a side wing of the backrest portion 702). The fourth photoelectric sensor is arranged on the backrest portion 702 or the headrest portion 703 (e.g., the fourth photoelectric sensor is arranged on the guide 705 at the lower end of the side wing of the headrest portion 703). For example, two third photoelectric sensors are provided and are respectively arranged at junctions between the seat portion 1 and the left and right sides of the backrest portion 702. Two fourth photoelectric sensors are provided and are respectively arranged on guides 705 at lower ends of left and right side wings of the headrest portion 703.

In an embodiment, the safety belt detection apparatus is configured to send the safety belt mounting signal to the third control module when both the third photoelectric sensor and the fourth photoelectric sensor detect that a safety belt passes. In a case where a plurality of third photoelectric sensors and a plurality of fourth photoelectric sensors are provided, the safety belt mounting signal is sent to the third control module when two third photoelectric sensors and one fourth photoelectric sensor detect that a safety belt passes. Taking the child safety seat fixed by the safety belt of the vehicle shown in FIG. 48 as an example, when the child safety seat is fixed to the vehicle seat by using the safety belt of the vehicle, a path where the safety belt of the vehicle is located includes the left junction 704 and the right junction 704 between the seat portion 701 and the backrest portion 702, and the guide 705 arranged at the lower end of the left side wing of the headrest portion 703. The safety belt detection apparatus sends the safety belt mounting signal to the third control module when two third photoelectric sensors and one fourth photoelectric sensor detect that a safety belt passes.

In other embodiments of the present disclosure, the safety belt detection apparatus includes only two third photoelectric sensors which are respectively arranged on the left and right junctions 704 between the seat portion 701 and the backrest portion 702. The safety belt detection apparatus sends the safety belt mounting signal to the third control module when both the two third photoelectric sensors detect that a safety belt passes.

In an exemplary embodiment, referring to FIG. 47, the seating detection apparatus 706 includes a pressure sensor 7061, and the seating detection apparatus 706 is arranged on the seat body 1 of the child safety seat, for example, a cushion of the seat portion 701 of the seat body 1. The pressure sensor 7061 detects, by detecting pressure on the seat portion 701, whether a target object is seated. For example, when the pressure on the seat portion 701 is greater than a preset threshold, it is considered that a target object is seated.

In an exemplary embodiment, referring to FIG. 47, the child safety seat further includes a seat base 2. The sixth detection apparatus is arranged between the seat body 1 and the seat base 2 of the child safety seat, to facilitate the detection of whether the use mode of the child safety seat is the forward-facing use mode or the rearward-facing use mode.

Figure 50:
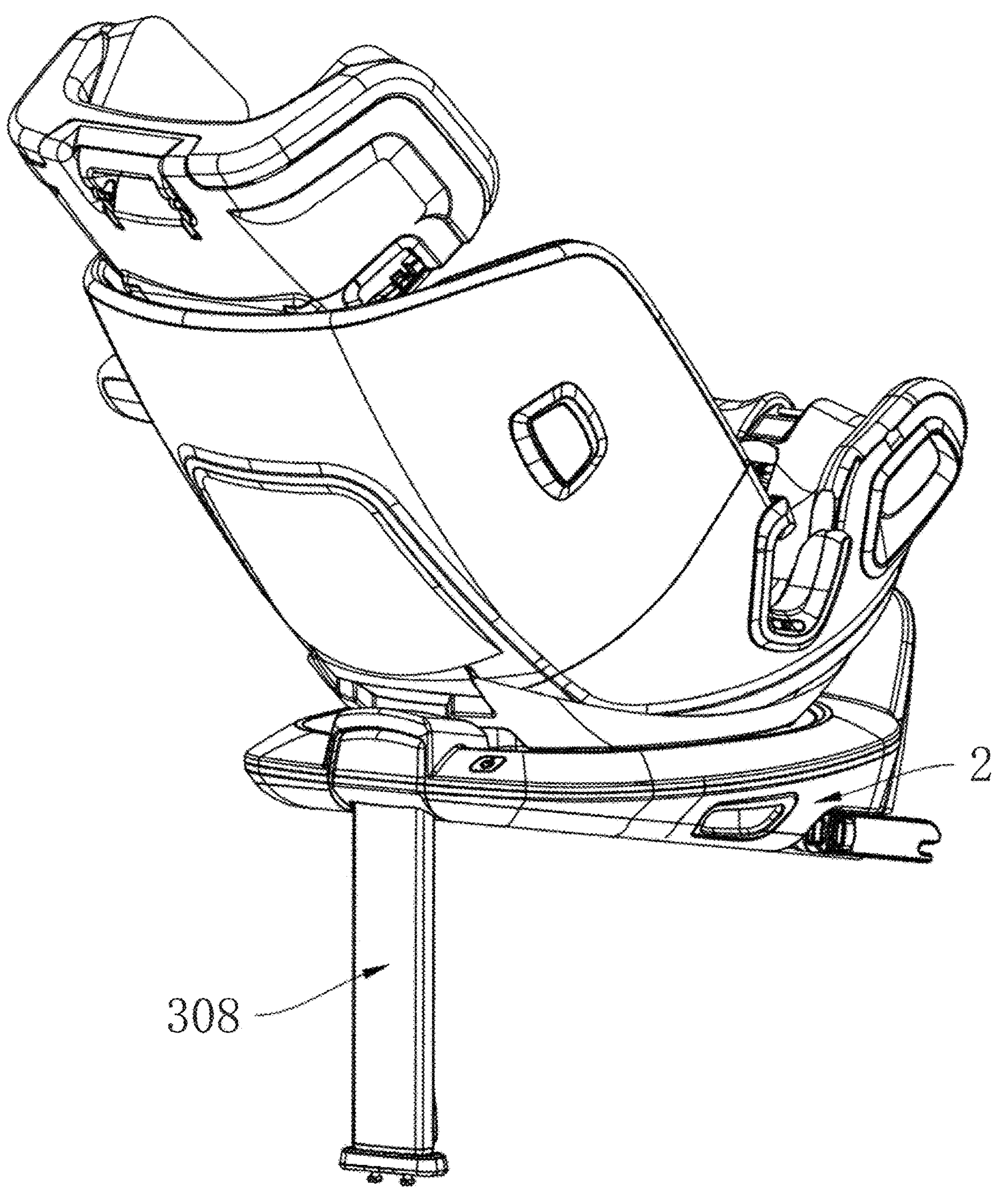
FIG. 50 is a perspective view of the child safety seat adopting a rearward-facing use mode according to an embodiment.

FIG. 50 is a perspective view of the child safety seat adopting a rearward-facing use mode according to an example.

Referring to FIG. 50, when the child safety seat adopts the rearward-facing use mode, the child safety seat realizes connection and fixing through the ISOFIX and a support leg 308, and the child is restrained in the child safety seat through the five-point safety belt on the child safety seat. In this case, the support leg 308 is in an unfolded state, and the support leg 308 and the seat base 2 are arranged at an angle. For example, the support leg 308 and the seat base 2 are perpendicular to each other.

When the child safety seat adopts the forward-facing use mode and there is a need to fix the child safety seat and the target object to the vehicle seat through the safety belt of the vehicle, the support leg 308 is in a folded state relative to the seat base 2, and the support leg 308 is hidden on a bottom surface of the seat base 2, which is beneficial for the seat base 2 of the child safety seat to be placed on the vehicle seat more stably.

Figure 51:
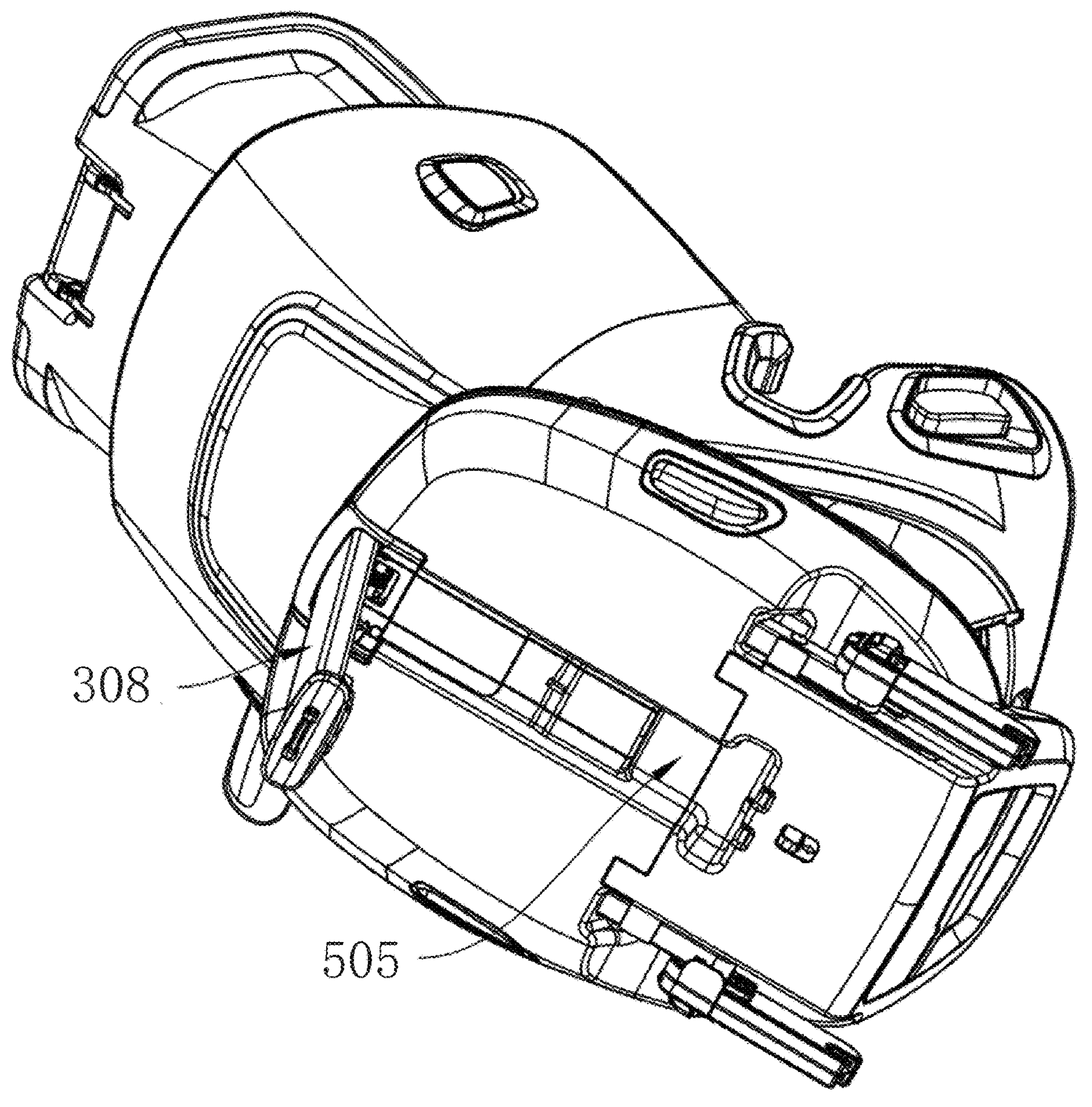
FIG. 51 is a perspective view of the child safety seat provided with a support leg detection apparatus according to an embodiment.

FIG. 51 is a perspective view of the child safety seat provided with a support leg detection apparatus according to an exemplary implementation.

In an exemplary embodiment, referring to FIG. 51, the support leg detection apparatus 505 is arranged at the bottom of the child safety seat, to facilitate the detection of whether the support leg 308 is in the folded state.

Figure 54:
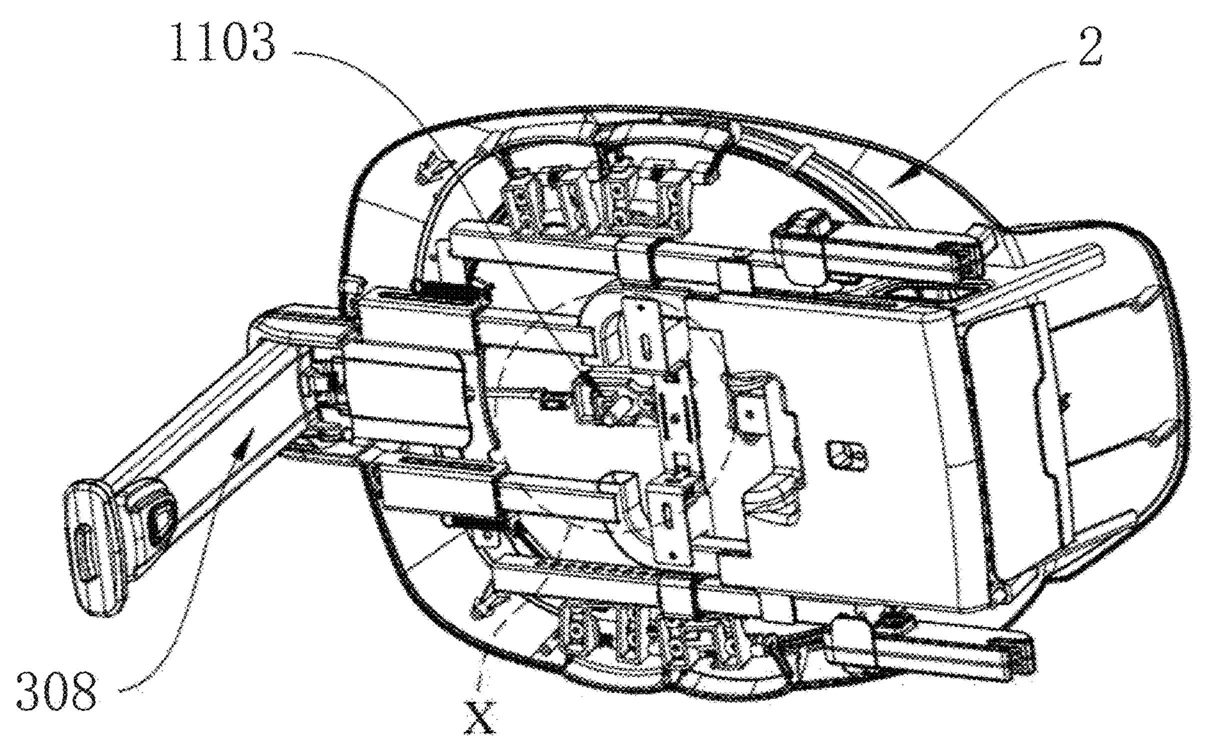
FIG. 54 is a perspective view of the seat base of the child safety seat according to an embodiment, with a bottom housing of the seat base removed.
Figure 55:
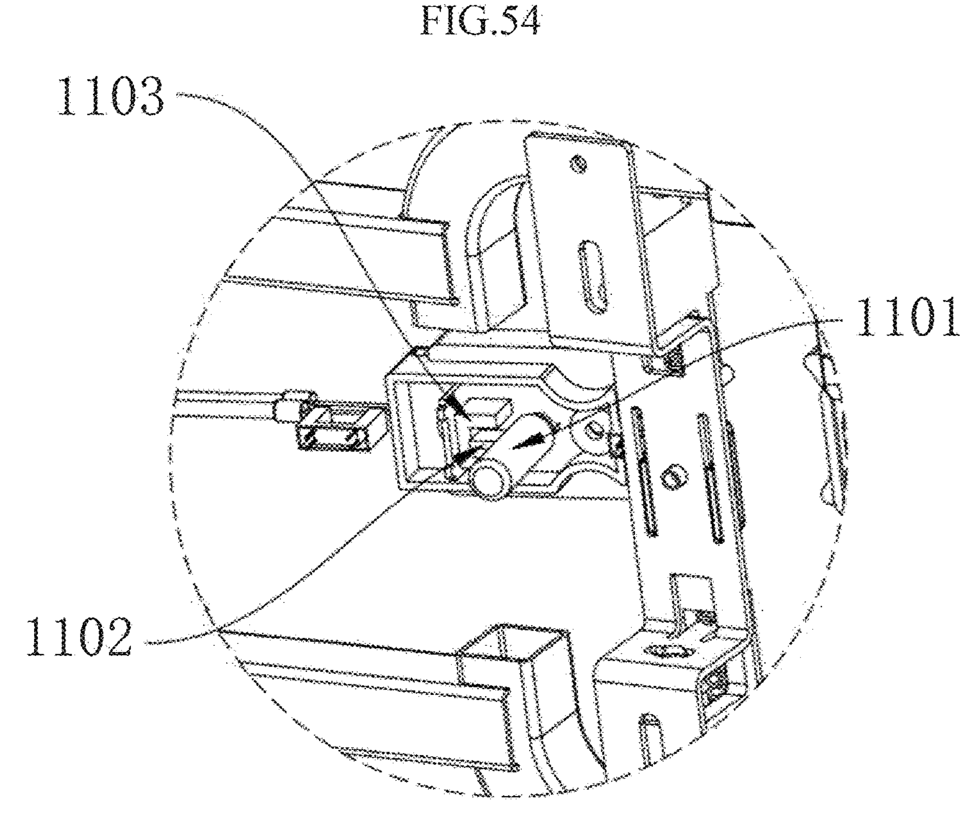
FIG. 55 is an enlarged view of a portion X in FIG. 54.
Figure 56:
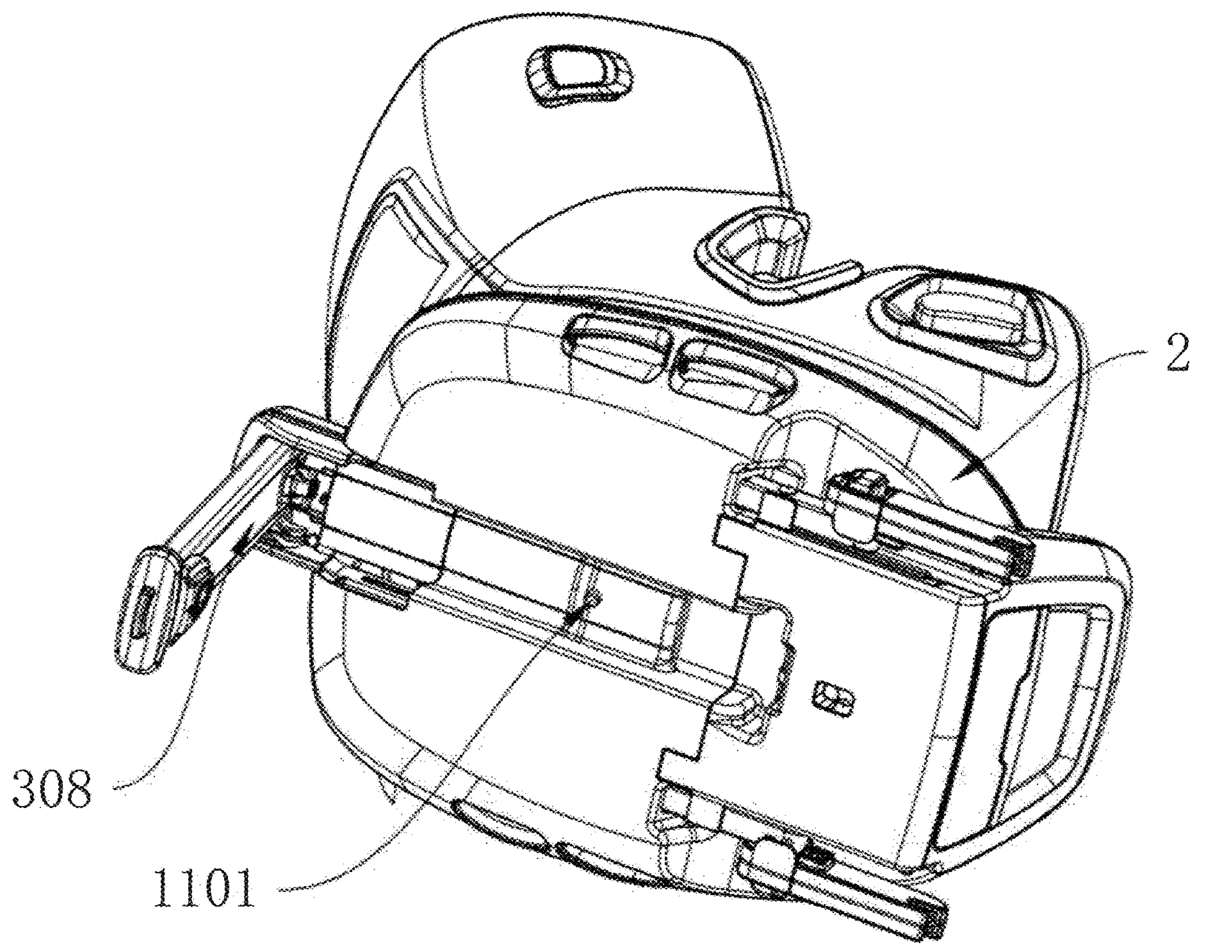
FIG. 56 is a perspective view of the child safety seat of FIG. 55.

FIG. 54 and FIG. 56 are perspective views showing the support leg detection apparatus of the child safety seat according to an exemplary implementation. In order to facilitate display of a detection sheet 1102 and a third sensor 1103 inside the seat base 2 of the child safety seat, a bottom housing of the seat base 2 of the child safety seat is removed in FIG. 54, and FIG. 55 shows an enlarged view of a portion X in FIG. 54.

Referring to FIG. 54, FIG. 55, and FIG. 56 together, the support leg detection apparatus 505 includes a detection switch 1101, the detection sheet 1102, and the third sensor 1103 (e.g., a photoelectric sensor) located around or behind the detection sheet 1102. The detection sheet 1102 and the third sensor 1103 are arranged in the seat base 2. The detection switch 1101 is arranged at the bottom of the seat base 2. At least part of the detection switch 1101 is exposed to the bottom housing of the seat base 2, corresponds to a position of the support leg 308 when the support leg 308 is in the folded state, and is configured to detect whether the support leg 308 is folded.

In an embodiment, the detection switch 1101 is slidably connected to the bottom of the seat base 2. After the support leg 308 is folded, the detection switch 1101 is pressed into the seat base 2 to drive the detection sheet 1102 to extend into a sensing range of the third sensor 1103. The third sensor 1103 transmits the support leg folding signal to the third control module 503, prompting that the support leg 308 has been folded.

Figure 52:
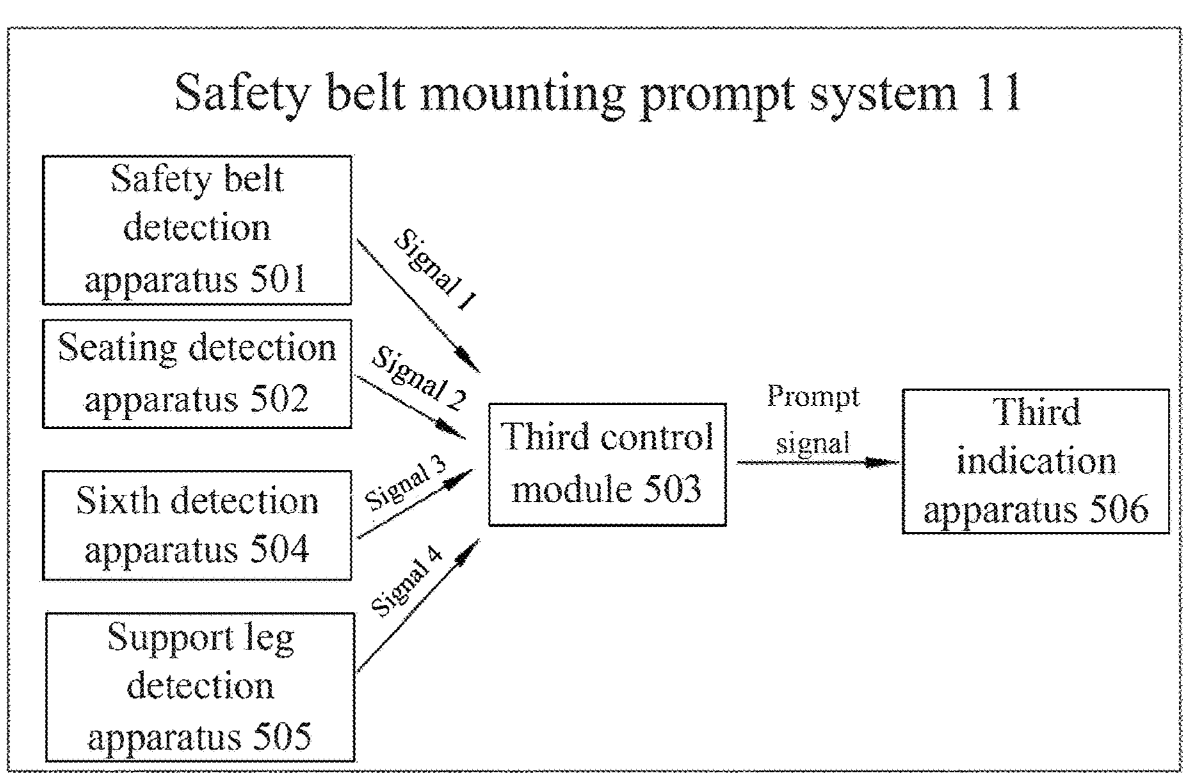
FIG. 52 is a schematic diagram of the safety belt mounting prompt system according to another embodiment.

FIG. 52 is a schematic diagram of the safety belt mounting prompt system according to an exemplary implementation.

Referring to FIG. 52, in an embodiment, the safety belt mounting prompt system 13 includes a safety belt detection apparatus 501, a seating detection apparatus 502, a third control module 503, a sixth detection apparatus 504, a support leg detection apparatus 505, and a third indication apparatus 506. In some embodiments, the third indication apparatus 506 is a same indication apparatus the first indication apparatus 130 and/or the second indication apparatus 60 in the foregoing embodiment. Related descriptions of the safety belt detection apparatus 501, the seating detection apparatus 502, the third control module 503, the sixth detection apparatus 504, and the support leg detection apparatus 505 may be obtained with reference to the related descriptions in the embodiment in FIG. 45 above and Embodiment 2. Details are not described herein again in the present disclosure.

In an embodiment, the third indication apparatus 506 is configured to receive the prompt signal and send prompt information based on the prompt signal. The third indication apparatus 506 is a light emitter or a buzzer, and the prompt information is light information or sound information.

For example, the third indication apparatus 506, after receiving the prompt signal, emits a light in a preset color to prompt the user to fix the child safety seat by using the safety belt of the vehicle. Alternatively, the third indication apparatus 506, after receiving the prompt signal, emits a preset sound (e.g., an alarm sound) to prompt the user to fix the child safety seat by using the safety belt of the vehicle.

In an exemplary embodiment, the safety belt detection apparatus 501 is configured to detect that a safety belt passes through the safety belt path of the child safety seat, and the safety belt detection apparatus 501 sends the safety belt mounting signal to the third control module 503. The third control module 503 is further configured to generate a prompt stop signal when receiving the safety belt mounting signal. The prompt stop signal is used to instruct the third indication apparatus 506 to stop sending the prompt information.

In an embodiment, the third indication apparatus 506 is configured to receive the prompt stop signal and send the prompt information based on the prompt stop signal.

For example, the third indication apparatus 506 stops emitting the light in the preset color after receiving the prompt stop signal. Alternatively, the third indication apparatus 506 stops emitting the preset sound (e.g., the alarm sound) after receiving the prompt stop signal.

In an embodiment, the safety belt detection apparatus 501, when detecting that a safety belt passes through the safety belt path of the child safety seat, sends the safety belt mounting signal to the third control module 503. The third control module 503, when receiving the safety belt mounting signal, generates the prompt stop signal and sends the prompt stop signal to the third indication apparatus 506. The third indication apparatus 506, after receiving the prompt stop signal, stops sending the prompt information based on the prompt stop signal. According to the method, sending of the prompt information can be stopped in time after the user fixes the child safety seat by using the safety belt of the vehicle.

In an exemplary embodiment, the third control module 503 alternatively sends the above prompt signal to a terminal device through a wireless network, so that the terminal device displays the prompt information based on the prompt signal. For example, the terminal device displays the prompt information on a screen of the terminal device to prompt the user to fix the child safety seat by using the safety belt of the vehicle.

In an exemplary embodiment, the third control module 503 alternatively directly sends, through the wireless network, signals sent out by the safety belt detection apparatus 501, the seating detection apparatus 502, the sixth detection apparatus 504, and the support leg detection apparatus 505 to the terminal device, so that the terminal device makes judgment, directly generates prompt information when the terminal device receives the seating signal, the forward-facing use signal, and the support leg folding signal, and does not receive the safety belt mounting signal, and displays the prompt information on the screen of the terminal device to prompt the user to fix the child safety seat by using the safety belt of the vehicle.

In an exemplary embodiment, the third control module 503 alternatively sends the above prompt stop signal to the terminal device through the wireless network, so that the terminal device stops displaying the prompt information based on the prompt stop signal.

Figure 53:
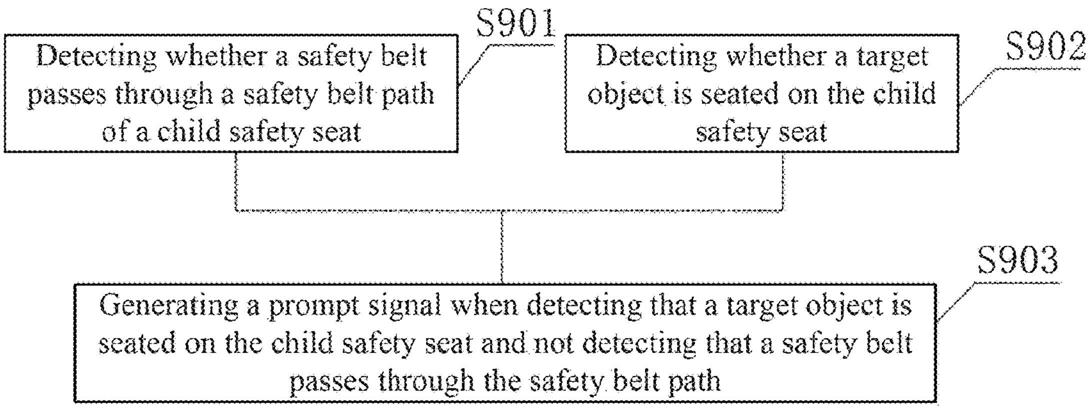
FIG. 53 is a flowchart of a safety belt mounting prompt method according to an embodiment.

FIG. 53 is a flowchart of a safety belt mounting prompt method according to an exemplary implementation.

Referring to FIG. 53, the safety belt mounting prompt method according to this embodiment of the present disclosure includes the following steps. The safety belt mounting prompt method according to this embodiment of the present disclosure is performed by the above safety belt mounting prompt system, but the present disclosure is not limited thereto.

In step S901, it is detected whether a safety belt passes through a safety belt path of a child safety seat.

In an exemplary embodiment, the detecting whether a safety belt passes through a safety belt path of a child safety seat includes: detecting whether a safety belt passes through a junction between a seat portion and a backrest portion of the child safety seat.

In an exemplary embodiment, the detecting whether a safety belt passes through a safety belt path of a child safety seat includes: detecting whether a safety belt passes through a guide of a headrest portion of the child safety seat.

The safety belt path of the child safety seat, the seat portion, the backrest portion, the headrest portion of the child safety seat, and the like may be obtained with reference to the literal descriptions in the above embodiments. Details are not described herein again in the present disclosure.

In step S902, it is detected whether a target object is seated on the child safety seat.

In an exemplary embodiment, the detecting whether a target object is seated on the child safety seat includes: detecting whether pressure of the seat portion of the child safety seat is greater than a preset threshold.

In an embodiment, it is detected, through the above safety belt detection apparatus, whether a safety belt passes through the safety belt path of the child safety seat, and it is detected, through the above seating detection apparatus, whether a target object is seated on the child safety seat, but the present disclosure is not limited thereto. In step S903, a prompt signal is generated when it is detected that a target object is seated on the child safety seat and it is not detected that a safety belt passes through the safety belt path.

In an exemplary embodiment, the generating a prompt signal when detecting that a target object is seated on the child safety belt and not detecting that a safety belt passes through the safety belt path includes: generating the prompt signal when detecting that a target object is seated on the child safety seat and not detecting that a safety belt passes through the junction between the seat portion and the backrest portion of the child safety seat.

In an exemplary embodiment, the prompt signal is generated when it is detected that a target object is seated on the child safety seat and it is not detected that a safety belt passes through the junction between the seat portion and the backrest portion of the child safety seat or it is not detected that a safety belt passes through the guide of the headrest portion of the child safety seat.

Specifically, when it is detected that a target object is seated on the child safety seat and it is not detected that a safety belt passes through the safety belt path, it indicates that a target object has been seated on the child safety seat but the safety belt of the vehicle does not fix the child safety seat and the target object to the vehicle seat, or the safety belt of the vehicle does not correctly fix the child safety seat and the target object to the vehicle seat. In this case, the prompt signal is automatically generated to prompt the user to fix the child safety seat by using the safety belt of the vehicle.

In an exemplary embodiment, the method further includes: sending prompt information based on the prompt signal.

In an exemplary embodiment, the method further includes: generating a prompt stop signal when detecting that a safety belt passes through the safety belt path.

In an exemplary embodiment, the method further includes: stopping sending the prompt information based on the prompt stop signal.

Based on the safety belt mounting prompt method according to this embodiment of the present disclosure, the prompt signal can be automatically generated when the target object has been seated on the child safety seat, but the safety belt of the vehicle does not fix the child safety seat and the target object to the vehicle seat, to prompt the user to fix the child safety seat by using the safety belt of the vehicle, which effectively prevents fixing of the child safety seat without use of the safety belt of the vehicle or incorrect use of the safety belt of the vehicle due to negligence of the user, and improves stability of use of the child safety seat, thereby ensuring safety of the target object.

Figure 57:
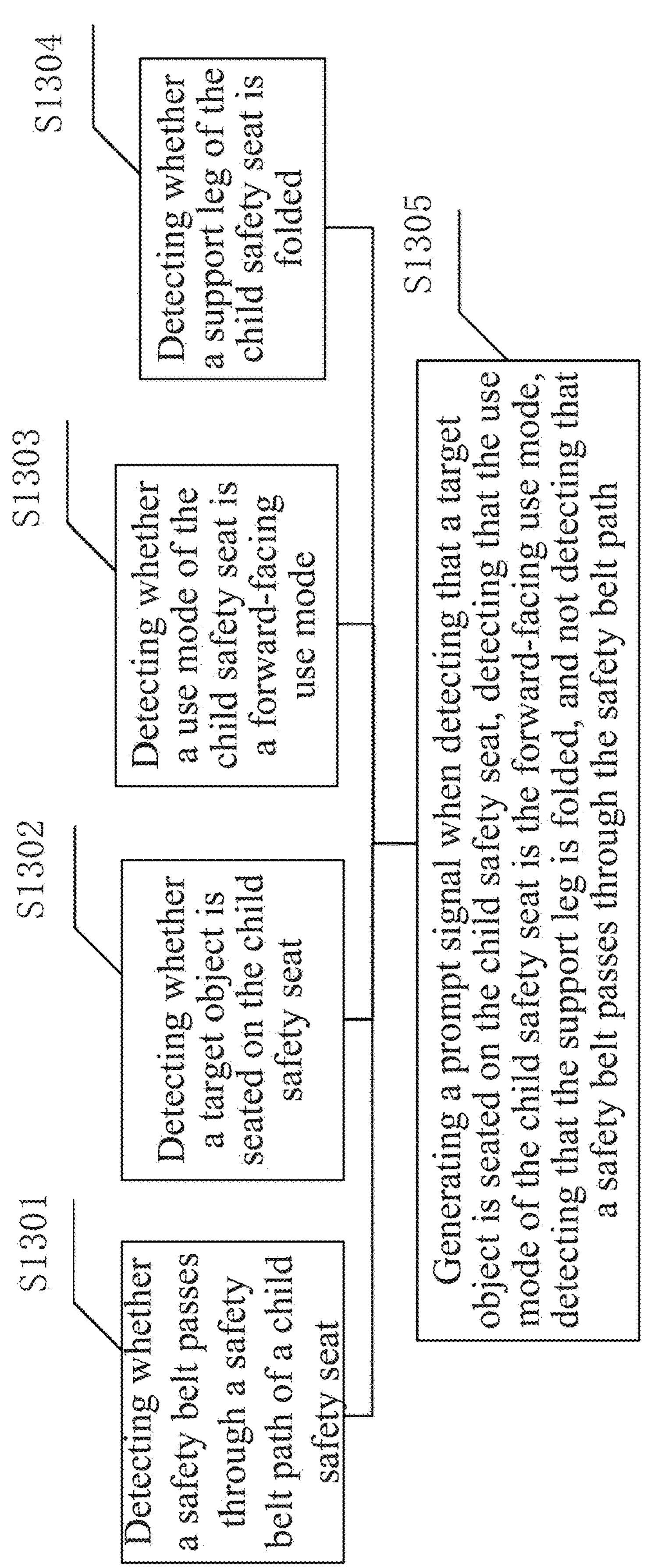
FIG. 57 is a flowchart of the safety belt mounting prompt method according to another embodiment.

FIG. 57 is a flowchart of a safety belt mounting prompt method according to an exemplary implementation.

Referring to FIG. 57, the safety belt mounting prompt method according to this embodiment of the present disclosure includes the following steps. The safety belt mounting prompt method according to this embodiment of the present disclosure is performed by the above safety belt mounting prompt system, but the present disclosure is not limited thereto.

In step S1301, it is detected whether a safety belt passes through a safety belt path of a child safety seat.

In an exemplary embodiment, the detecting whether a safety belt passes through a safety belt path of a child safety seat includes: detecting whether a safety belt passes through a junction between a seat portion and a backrest portion of the child safety seat.

In an exemplary embodiment, the detecting whether a safety belt passes through a safety belt path of a child safety seat includes: detecting whether a safety belt passes through an area between a backrest portion and a headrest portion of the child safety seat.

In step S1302, it is detected whether a target object is seated on the child safety seat.

In an exemplary embodiment, the detecting whether a target object is seated on the child safety seat includes: detecting whether pressure of the seat portion of the child safety seat is greater than a preset threshold.

In step S1303, it is detected whether a use mode of the child safety seat is a forward-facing use mode.

In step S1304, it is detected whether a support leg of the child safety seat is folded.

In an embodiment, it is detected, through the above safety belt detection apparatus, whether a safety belt passes through the safety belt path of the child safety seat, and it is detected, through the above seating detection apparatus, whether a target object is seated on the child safety seat. At the same time, it is detected, through the above sixth detection apparatus, whether the use mode of the child safety seat is the forward-facing use mode, and it is detected, through the above support leg detection apparatus, whether the support leg of the child safety seat is folded, but the present disclosure is not limited thereto.

In step S1305, a prompt signal is generated when it is detected that a target object is seated on the child safety seat, it is detected that the use mode of the child safety seat is the forward-facing use mode, it is detected that the support leg is folded, and it is not detected that a safety belt passes through the safety belt path.

In an exemplary embodiment, the generating a prompt signal when detecting that a target object is seated on the child safety belt, detecting that the use mode of the child safety seat is the forward-facing use mode, detecting that the support leg is folded, and not detecting that a safety belt passes through the safety belt path includes: generating the prompt signal when detecting that a target object is seated on the child safety belt, detecting that the use mode of the child safety seat is the forward-facing use mode, detecting that the support leg is folded, and not detecting that a safety belt passes through the junction between the seat portion and the backrest portion of the child safety seat.

In an exemplary embodiment, the generating a prompt signal when detecting that a target object is seated on the child safety belt, detecting that the use mode of the child safety seat is the forward-facing use mode, detecting that the support leg is folded, and not detecting that a safety belt passes through the safety belt path includes: generating the prompt signal when detecting that a target object is seated on the child safety belt, detecting that the use mode of the child safety seat is the forward-facing use mode, detecting that the support leg is folded, and not detecting that a safety belt passes through the junction between the seat portion and the backrest portion of the child safety seat or not detecting that a safety belt passes through a guide of the headrest portion of the child safety seat.

Specifically, when it is detected that a target object is seated on the child safety seat, it is detected that the use mode of the child safety seat is the forward-facing use mode, it is detected that the support leg is folded, and it is not detected that that a safety belt passes through the safety belt path, it indicates that a target object has been seated on the child safety seat, the use mode of the safety seat is the forward-facing use mode, and the support leg has been folded, but the safety belt of the vehicle does not fix the child safety seat and the target object to the vehicle seat, or the safety belt of the vehicle does not correctly fix the child safety seat and the target object to the vehicle seat. In this case, the prompt signal is automatically generated to prompt the user to fix the child safety seat by using the safety belt of the vehicle.

In an exemplary embodiment, the method further includes: sending prompt information based on the prompt signal.

In an exemplary embodiment, the method further includes: generating a prompt stop signal when detecting that a safety belt passes through the safety belt path.

In an exemplary embodiment, the method further includes: stopping sending the prompt information based on the prompt stop signal.

Based on the safety belt mounting prompt method according to this embodiment of the present disclosure, the prompt signal can be automatically generated when the target object has been seated on the child safety seat, the safety seat is in the forward-facing use mode, and the support leg has been folded, but the safety belt of the vehicle does not fix the child safety seat and the target object to the vehicle seat, to prompt the user to fix the child safety seat by using the safety belt of the vehicle, which effectively prevents fixing of the child safety seat without use of the safety belt of the vehicle due to negligence of the user, and improves stability of use of the child safety seat, thereby ensuring safety of the target object.

Parts of each step in the safety belt mounting prompt method in the above embodiment that are related to the above safety belt mounting prompt system may be obtained with reference to the literal descriptions in the embodiment of the safety belt mounting prompt system. Details are not described herein again in the present disclosure.

The child safety seat can prevent missing mounting or incorrect mounting of the side impact protection block, and can well prevent younger children from using the child safety seat in a forward-facing use mode, which improves safety performance of the child safety seat, has a simple structure, and is easy to implement. Moreover, a safety belt mounting prompt system and a safety belt mounting prompt method are provided. The safety belt mounting prompt system can effectively prevent fixing of the child safety seat without use of or with incorrect use of the safety belt of the vehicle due to negligence of the user, which improves stability of use of the child safety seat, thereby ensuring safety of a target object.

According to an aspect of the present disclosure, a child safety seat is provided, including a seat body and a seat base. The seat body is rotatably mounted on the seat base, and the seat body is rotatable between a forward-facing use mode and a rearward-facing use mode.

In an embodiment, the child safety seat further includes at least one side impact protection block mounting position and a safety prompt system. The safety prompt system includes: a side impact protection block, a first detection apparatus, a first control module, and a first indication apparatus. The side impact protection block is detachably mounted at the side impact protection block mounting position. The first detection apparatus is arranged in the child safety seat and arranged near the side impact protection block mounting position and is configured to detect whether the side impact protection block is mounted at the side impact protection block mounting position and send a first detection signal indicating a detection result. The first control module is arranged in the child safety seat and communicably connected to the first detection apparatus. The first control module is configured to at least receive the first detection signal and configured to send a control signal based on the first detection signal. The first indication apparatus is communicably connected to the first control module and is configured to receive the control signal and send reminder information based on the control signal.

In an embodiment, the side impact protection block includes: a shell and a first locking mechanism. The shell defines an accommodation space. The first locking mechanism is at least partially arranged in the accommodation space of the shell and at least partially protruding from the shell when the side impact protection block is mounted at the side impact protection block mounting position. The first locking mechanism is capable of being fitted and locked with a second locking mechanism in the side impact protection block mounting position so that the side impact protection block is fixedly connected to the side impact protection block mounting position.

In an embodiment, the side impact protection block includes: an unlocking portion at least partially arranged in the accommodation space of the shell. The unlocking portion is operably connected to the first locking mechanism and configured to unlock the first locking mechanism from the second locking mechanism.

In an embodiment, the first locking mechanism includes: a first hook portion at least partially arranged in the accommodation space of the shell and capable of protruding from a first side of the shell.

In an embodiment, the first locking mechanism further includes: a second hook portion and a first elastic member. The second hook portion is at least partially arranged in the accommodation space of the shell and capable of protruding from a second side of the shell opposite to the first side. The first elastic member is arranged in the accommodation space of the shell and connected between the first hook portion and the second hook portion. The first elastic member constantly causes the first hook portion and the second hook portion to have a tendency to move away from each other.

In an embodiment, the second locking mechanism includes at least one slot corresponding to the first locking mechanism and arranged at the side impact protection block mounting position.

In an embodiment, the first locking mechanism includes a first hook portion and a second hook portion. The first hook portion and the second hook portion at least partially protrude from different sides of the shell. The second locking mechanism includes a first slot and a second slot. When the side impact protection block is mounted to the side impact protection block mounting position, the first hook portion is capable of entering the first slot, and at the same time, the second hook portion is capable of entering the second slot.

In an embodiment, the side impact protection block includes a first locking mechanism and an unlocking portion the unlocking portion operably connected to the first locking mechanism. The first locking mechanism includes a first hook portion and a second hook portion. The unlocking portion is connected to one of the first hook portion and the second hook portion, and the unlocking portion is further connected to the other of the first hook portion and the second hook portion, so as to drive the first hook portion and the second hook portion to synchronously move when the unlocking portion is operated.

In an embodiment, the unlocking portion and the second hook portion are arranged on a same side of the side impact protection block.

In an embodiment, the child safety seat includes an opening disposed at the side impact protection block mounting position, and the child safety seat includes a decorative cover and a second elastic member. The decorative cover is movably arranged at the side impact protection block mounting position and covers the opening. An end of the second elastic member is connected to the decorative cover, the other end of the second elastic member is connected to the bottom of the opening. The second elastic member constantly exerts a pushing force on the decorative cover.

In an embodiment, the decorative cover includes a third locking mechanism. the third locking mechanism is fitted and locked with a second locking mechanism in the side impact protection block mounting position to limit a moving stroke of the decorative cover in a direction away from the bottom of the opening.

In an embodiment, the first detection apparatus includes: a sensitive assembly and a first sensing apparatus. The sensitive assembly is capable of moving back and forth between a detect position and a non-detect position. The side impact protection block, when mounted at the side impact protection block mounting position, drives the sensitive assembly to move from the non-detect position to the detect position. The first sensing apparatus is arranged near the sensitive assembly. When the sensitive assembly is at the detect position, the first sensing apparatus is capable of detecting the sensitive assembly and sending the first detection signal.

In an embodiment, the first detection apparatus further includes: a third elastic member. The third elastic member constantly exerts a pushing force on the sensitive assembly so that the sensitive assembly constantly has a tendency to move away from the detect position to the non-detect position.

In an embodiment, the safety prompt system further includes at least one second detection apparatus. The second detection apparatus is communicably connected to the first control module. The second detection apparatus is configured to at least detect a connection state of an International Standards Organization FIX (isofix) connector and send a second detection signal indicating the connection state. The first control module is capable of receiving the second detection signal and obtaining the connection state of the isofix connector based on the second detection signal.

In an embodiment, the second detection apparatus is arranged on the isofix connector of the child safety seat.

In an embodiment, the first indication apparatus further includes an input interface. The input interface is configured to receive mounting position information of the child safety seat and is communicably connected to the first control module. The first control module receives the mounting position information through the input interface to obtain whether a mounting position of the child safety seat is a left seat of a vehicle or a right seat of the vehicle.

In an embodiment, the safety prompt system further includes: a plurality of second detection apparatuses. The second detection apparatuses are communicably connected to the first control module and respectively arranged on different isofix interfaces on a vehicle seat. Each of the second detection apparatuses is configured to sense a connection state of the corresponding isofix interface and send a second detection signal indicating the connection state. The first control module is capable of receiving the second detection signal, and judging, based on the second detection signal, the connection state of the isofix interface and whether a mounting position of the child safety seat is a left seat of a vehicle or a right seat of the vehicle.

In an embodiment, the child safety seat includes two side impact protection block mounting positions respectively located on opposite sides of the child safety seat. The first indication apparatus is capable of displaying a current mounting position of the child safety seat based on the control signal, and sending reminder information when the side impact protection block is not mounted at the side impact protection block mounting position corresponding to the current mounting position of the child safety seat.

In an embodiment, the safety prompt system further includes: a third detection apparatus. The third detection apparatus is arranged in the child safety seat and communicably connected to the first control module. The third detection apparatus is configured to detect a use mode of the child safety seat and send a third detection signal indicating the use mode. The first control module is capable of receiving the third detection signal, and obtaining, based on the third detection signal, whether the use mode of the child safety seat is the forward-facing use mode or the rearward-facing use mode.

In an embodiment, the child safety seat includes two side impact protection block mounting positions respectively located on opposite sides of the child safety seat. The first indication apparatus is capable of displaying a current use mode of the child safety seat, and sending reminder information when the side impact protection block is not mounted at the side impact protection block mounting position corresponding to the use mode.

In an embodiment, the child safety seat has an opening at the side impact protection block mounting position and the first detection apparatus includes: a sensitive assembly and a first sensing apparatus. The sensitive assembly is capable of moving back and forth between a detect position and a non-detect position. The side impact protection block, when mounted at the side impact protection block mounting position, drives the sensitive assembly to move from the non-detect position to the detect position. The first sensing apparatus is arranged near the sensitive assembly. When the sensitive assembly is at the detect position, the first sensing apparatus is capable of detecting the sensitive assembly and sending the first detection signal, wherein a depth of the opening is greater than or equal to a distance between the detect position and the non-detect position.

In an embodiment, the child safety seat includes an opening at the side impact protection block mounting position to mount the side impact protection block. The first detection apparatus includes: a sensitive assembly and a first sensing apparatus. The sensitive assembly is capable of moving back and forth between a detect position and a non-detect position. The side impact protection block, when mounted at the opening, drives the sensitive assembly to move from the non-detect position to the detect position. The first sensing apparatus is arranged near the sensitive assembly. When the sensitive assembly is at the detect position, the first sensing apparatus is capable of detecting the sensitive assembly and sending the first detection signal, wherein, when the side impact protection block is mounted at the opening, the side impact protection block includes an insertion portion located in the opening, and a length of the insertion portion is greater than or equal to a distance between the detect position and the non-detect position.

In an embodiment, the safety prompt system further includes: a fourth detection apparatus arranged in a safety belt buckle of the child safety seat and communicably connected to the first control module. The fourth detection apparatus is configured to detect a fastening state of the safety belt buckle and send a fourth detection signal indicating the fastening state. The first control module is capable of receiving the fourth detection signal and obtaining, based on the fourth detection signal, whether the safety belt buckle is fastened; and the first control module judges, based on the fastening state of the safety belt buckle, whether to send control information to the first indication apparatus.

In an embodiment, when the safety belt buckle is in the fastening state, the first control module sends the control information to the first indication apparatus to send the reminder information; and when the safety belt buckle is not in the fastening state, the first control module does not send the control information to the first indication apparatus and the first indication apparatus does not send the reminder information.

In an embodiment, the first indication apparatus is arranged on the child safety seat or outside the child safety seat, and at least includes at least one of the following: a buzzer, a vibrator, a display screen, a mobile phone, and a tablet computer.

In an embodiment, the seat base includes: a second mounting seat; a turntable rotatably arranged on the second mounting seat; a fifth detection apparatus configured to detect a position of the turntable and output a detection signal based on the position of the turntable; and a second control module in a communication connection with the fifth detection apparatus. The second control module is configured to receive a child attribute and the detection signal of the fifth detection apparatus, judge whether the child attribute matches the detection signal of the fifth detection apparatus and output a matching signal.

In an embodiment, the fifth detection apparatus includes: a detector arranged on one of the second mounting seat and the turntable; and a second sensing apparatus arranged on the other of the second mounting seat and the turntable and in a communication connection with the second control module. The second sensing apparatus or the detector arranged on the turntable rotates with the turntable. The turntable has a first rotation position and a second rotation position. When the turntable rotates to the first rotation position or the second rotation position, the detector triggers the second sensing apparatus to generate the detection signal, and the second sensing apparatus is configured to send the detection signal to the second control module.

In an embodiment, the second sensing apparatus includes a first sensor and a second sensor. The first sensor and the second sensor are arranged apart, and when the turntable rotates to the first rotation position, the detector triggers the first sensor to generate the detection signal; and when the turntable rotates to the second rotation position, the detector triggers the second sensor to generate the detection signal.

In an embodiment, the second mounting seat has a mounting receptacle; the turntable includes a rotating upper cover and a rotating lower cover connected to each other. The detector is arranged on a side of the rotating lower cover facing the mounting receptacle and deviates from a rotation center of the rotating lower cover. The first sensor and the second sensor are arranged apart in the mounting receptacle.

In an embodiment, the first sensor includes a first infrared sensor, and the second sensor includes a second infrared sensor. The detector triggers the first infrared sensor or the second infrared sensor to generate the detection signal when the detector is located in a sensing range of the first infrared sensor or the second infrared sensor.

In an embodiment, the first sensor includes a first mechanical switch sensor, and the second sensor includes a second mechanical switch sensor. The detector is configured to trigger the first mechanical switch sensor or the second mechanical switch sensor to switch an on/off state to generate the detection signal.

In an embodiment, the first mechanical switch sensor includes a first switch lever, the second mechanical switch sensor includes a second switch lever, and the detector is configured to toggle the first switch lever or the second switch lever.

In an embodiment, the first sensor includes a first photoelectric sensor; the first photoelectric sensor includes a first transmitting end and a first receiving end arranged oppositely. The first transmitting end is configured to send an optical signal to the first receiving end. The second sensor includes a second photoelectric sensor; the second photoelectric sensor includes a second transmitting end and a second receiving end arranged oppositely. The second transmitting end is configured to send an optical signal to the second receiving end. The detector triggers the first photoelectric sensor or the second photoelectric sensor to generate the detection signal when the detector is located between the first transmitting end and the first receiving end or between the second transmitting end and the second receiving end.

In an embodiment, the seat base further includes a second indication apparatus in a communication connection with the second control module and configured to notify a user of the matching signal.

In an embodiment, the second indication apparatus is configured to perform, based on the matching signal, at least one of playing a reminder voice, displaying a reminder text, displaying a reminder image, and playing a reminder video.

In an embodiment, the second indication apparatus includes a display screen arranged on the second mounting seat.

In an embodiment, the second control module is configured to be in a communication connection with a mobile terminal and the second control module is configured to send the matching signal to the mobile terminal.

In an embodiment, the child attribute includes at least one of age, weight, and height.

In an embodiment, the seat base further includes an input mechanism in a communication connection with the second control module and configured to input the child attribute.

In an embodiment, the input mechanism includes an input keyboard arranged on the second mounting seat.

In an embodiment, the second control module is further configured to receive the child attribute from the mobile terminal.

In an embodiment, the seat base further includes a fourth locking mechanism arranged between the turntable and the second mounting seat and configured for relative locking or unlocking the turntable to or from the second mounting seat.

In an embodiment, the fourth locking mechanism includes a first fitting portion, a second fitting portion, and a third fitting portion. The first fitting portion is arranged on one of the turntable and the second mounting seat. The second fitting portion and the third fitting portion are arranged on the other of the turntable and the second mounting seat. The first fitting portion is locked and fitted with the second fitting portion when the turntable is at the first rotation position, and the first fitting portion is locked and fitted with the third fitting portion when the turntable is at the second rotation position.

In an embodiment, the first fitting portion is a locking member slidably arranged on one of the turntable and the second mounting seat; the second fitting portion and the third fitting portion are respectively a first locking hole and a second locking hole that are arranged on the other of the turntable and the second mounting seat. The locking member is capable of being inserted into the first locking hole when the turntable is at the first rotation position, and the locking member is capable of being inserted into the second locking hole when the turntable is at the second rotation position.

In an embodiment, the fourth locking mechanism further includes a first operating member operable to cause the locking member inserted into the first locking hole to withdraw from the first locking hole or cause the locking member inserted into the second locking hole to withdraw from the second locking hole.

In an embodiment, the locking member is slidably arranged on the turntable; the first locking hole and the second locking hole are arranged on the second mounting seat. The fourth locking mechanism further includes a linkage member having a first end and a second end. The first end is pivotally connected to the turntable; the second end is connected to the locking member. The first operating member includes a pushing rib abutting against the second end, and the pushing rib is located on a side of the linkage member close to the second mounting seat. The first operating member is operable to move toward a direction away from the second mounting seat.

In an embodiment, the fourth locking mechanism further includes a first reset member t arranged between the turntable and the first operating member. The first reset member biases the first operating member to move toward the direction away from the second mounting seat.

In an embodiment, the fourth locking mechanism further includes a third operating member. The locking member is slidably arranged on the second mounting seat, and the first locking hole and the second locking hole are arranged on the turntable. The third operating member is arranged on the turntable and operable to drive the locking member to move toward a direction away from the turntable.

In an embodiment, the seat base further includes a third driving member, a fourth driving member, a first pushing member, a second pushing member, and a third traction member. The third driving member and the fourth driving member are arranged apart and both slidably arranged on the turntable. An end of the third traction member is connected to the third operating member, and the other end of the third traction member is capable of simultaneously driving the third driving member and the fourth driving member to move along a direction intersecting with a moving direction of the locking member. The third driving member is provided with a third sliding chute, and an end of the first pushing member has a third sliding guide post fitted with the third sliding chute. The fourth driving member is provided with a fourth sliding chute, and an end of the second pushing member has a fourth sliding guide post fitted with the fourth sliding chute.

In an embodiment, the seat body is mounted on the turntable.

In an embodiment, the child safety seat further includes a second operating member. The seat body is mounted on the turntable. The second operating member is mounted on the seat body, and the second operating member is operable to drive the linkage member to rotate to cause the locking member to move toward a direction away from the second mounting seat.

In an embodiment, the child safety seat further includes a pressing member arranged on the turntable; the linkage member further includes a third end, and the first end is located between the second end and the third end. The third end abuts against the pressing member, and the second operating member is operable to drive the pressing member to move toward a direction close to the second mounting seat.

In an embodiment, the child safety seat further includes a driving member, an actuating member, and a first traction member. The driving member is slidably arranged on the seat body and capable of moving along a direction intersecting with a moving direction of the locking member. Two ends of the first traction member are respectively connected to the second operating member and the driving member. The driving member is provided with a sliding chute, an end of the actuating member has a sliding guide post fitted with the sliding chute, and the other end of the actuating member abuts against an end of the pressing member away from the second mounting seat.

In an embodiment, two second operating members are provided. The two second operating members are respectively arranged on left and right sides of the seat body and two first traction members are correspondingly provided. Each of the first traction members is connected to the second operating member located on either side of the seat body and the driving member.

In an embodiment, the child safety seat further includes a third reset member arranged between the pressing member and the turntable and biasing the pressing member to move toward a direction away from the second mounting seat.

In an embodiment, the child safety seat further includes a driving reset member arranged between the driving member and the seat body and biasing the driving member to move toward a direction opposite to a pulling direction of the first traction member.

In an embodiment, the child safety seat further includes a second operating member. The seat body is mounted on the turntable. The second operating member is mounted on the seat body, and the second operating member is operable to drive the locking member to move toward the direction away from the turntable.

In an embodiment, the child safety seat further includes a first driving member, a second driving member, a first actuating member, a second actuating member, and a first traction member. The first driving member and the second driving member are arranged apart and both slidably arranged on the seat body. An end of the first traction member is connected to the second operating member, and the other end of the first traction member is capable of simultaneously driving the first driving member and the second driving member to move along a direction intersecting with a moving direction of the locking member. The first driving member is provided with a first sliding chute, and an end of the first actuating member has a first sliding guide post fitted with the first sliding chute. The second driving member is provided with a second sliding chute, and an end of the second actuating member has a second sliding guide post fitted with the second sliding chute.

In an embodiment, the fourth locking mechanism further includes a first pushing member and a second pushing member. Both the first pushing member and the second pushing member are slidably arranged in the turntable and respectively arranged opposite to the first locking hole and the second locking hole. An end of the first pushing member abuts against the first actuating member, and the other end of the first pushing member is capable of abutting against the locking member. An end of the second pushing member abuts against the second actuating member, and the other end of the second pushing member is capable of abutting against the locking member.

In an embodiment, the first traction member includes a first engaging protrusion and a second engaging protrusion arranged apart An end of the first traction member is connected to the second operating member and the other end of the first traction member successively passes through the first driving member and the second driving member. The first engaging protrusion and the second engaging protrusion are respectively engaged to the first driving member and the second driving member.

In an embodiment, two second operating members are provided, and the two second operating members are respectively arranged on left and right sides of the seat body. Two first traction members are correspondingly provided, and each of the first traction members is connected to the second operating member located on either side of the seat body.

According to another aspect of the present disclosure, a safety belt mounting prompt system is provided. The safety belt mounting prompt system is applied to the child safety seat according to above-mentioned embodiments and includes: a safety belt detection apparatus, a seating detection apparatus, and a third control module. The safety belt detection apparatus is configured to detect whether a safety belt passes through a safety belt path of the child safety seat and send a corresponding first signal to the third control module; the seating detection apparatus is configured to detect whether a target object is seated on the child safety seat and send a corresponding second signal to the third control module; the third control module is configured to receive the first signal and the second signal, the first signal and the second signal being used to generate a prompt signal.

In an embodiment, the first signal includes a safety belt non-mounting signal; the safety belt detection apparatus when not detecting that a safety belt passes through the safety belt path, sends the safety belt non-mounting signal to the third control module.

In an embodiment, the second signal includes a seating signal; the seating detection apparatus when detecting that a target object is seated on the child safety seat, sends the seating signal to the third control module.

In an embodiment, the third control module is configured to generate the prompt signal when receiving the seating signal and the safety belt non-mounting signal.

In an embodiment, the safety belt mounting prompt system further includes: a sixth detection apparatus and a support leg detection apparatus. The sixth detection apparatus is configured to detect a use mode of the child safety seat and send a corresponding third signal to the third control module; the support leg detection apparatus is configured to detect whether a support leg of the child safety seat is folded and send a corresponding fourth signal to the third control module; the third control module is configured to receive the first signal, the second signal, the third signal, and the fourth signal, and the first signal, the second signal, the third signal, and the fourth signal are used to generate the prompt signal.

In an embodiment, the first signal includes a safety belt non-mounting signal; the second signal includes a seating signal; the third signal includes a forward-facing use signal; the fourth signal includes a support leg folding signal. The sixth detection apparatus when detecting that the use mode of the child safety seat is a forward-facing use mode, sends the forward-facing use signal to the third control module; the support leg detection apparatus when detecting that the support leg is folded, sends the support leg folding signal to the third control module; the third control module generates the prompt signal when receiving the seating signal, the forward-facing use signal, the support leg folding signal, and the safety belt non-mounting signal.

In an embodiment, the child safety seat includes a seat body and a seat base; wherein the support leg detection apparatus is arranged at the bottom of the child safety seat, and the sixth detection apparatus is arranged between the seat body and the seat base.

In an embodiment, the seat body includes a seat portion, a backrest portion, and a headrest portion; the safety belt detection apparatus includes a third photoelectric sensor; the third photoelectric sensor is arranged at a junction between the seat portion and the backrest portion; the safety belt detection apparatus is configured to send a safety belt mounting signal to the third control module when the third photoelectric sensor detects that a safety belt passes.

In an embodiment, the seat body includes a seat portion, a backrest portion, and a headrest portion; the safety belt detection apparatus includes a third photoelectric sensor and a fourth photoelectric sensor. The third photoelectric sensor is arranged at a junction between the seat portion and the backrest portion, and the fourth photoelectric sensor is arranged on a guide disposed on the headrest portion. The safety belt detection apparatus is configured to send a safety belt mounting signal to the third control module when both the third photoelectric sensor and the fourth photoelectric sensor detect that a safety belt passes.

In an embodiment, the seating detection apparatus includes a pressure sensor arranged on the seat body.

In an embodiment, the safety belt mounting prompt system further includes: a third indication apparatus configured to receive the prompt signal and send prompt information based on the prompt signal.

In an embodiment, the first signal includes a safety belt mounting signal; the safety belt detection apparatus when detecting that a safety belt passes through the safety belt path, sends the safety belt mounting signal to the third control module; the third control module is further configured to generate a prompt stop signal when receiving the safety belt mounting signal.

In an embodiment, the safety belt mounting prompt system further includes: a third indication apparatus. The third indication apparatus is configured to receive the prompt signal and send prompt information based on the prompt signal, and the third indication apparatus is configured to receive the prompt stop signal and stop sending the prompt information based on the prompt stop signal.

In an embodiment, the third control module is further configured to send the prompt signal to a terminal device, so that the terminal device displays prompt information based on the prompt signal; or the third control module is further configured to send the prompt stop signal to a terminal device, so that the terminal device stops displaying the prompt information based on the prompt stop signal.

In an embodiment, the third control module is further configured to send the first signal and the second signal to a terminal device, so that the terminal device generates the prompt signal based on the first signal and the second signal.

According to another aspect of the present disclosure, a safety belt mounting prompt method for the safety belt mounting prompt system according to above-mentioned embodiments is provided. The safety belt mounting prompt method includes: detecting whether a safety belt passes through a safety belt path of a child safety seat; detecting whether a target object is seated on the child safety seat; and generating a prompt signal when detecting that a target object is seated on the child safety seat and not detecting that a safety belt passes through the safety belt path.

In an embodiment, the detecting whether a safety belt passes through a safety belt path of a child safety seat includes: detecting whether a safety belt passes through a junction between a seat portion and a backrest portion of the child safety seat; and the generating a prompt signal when detecting that a target object is seated on the child safety seat and not detecting that a safety belt passes through the safety belt path includes: generating the prompt signal when detecting that a target object is seated on the child safety seat and not detecting that a safety belt passes through the junction between the seat portion and the backrest portion of the child safety seat.

In an embodiment, the detecting whether a safety belt passes through a safety belt path of a child safety seat includes: detecting whether a safety belt passes through a guide on a headrest portion of the child safety seat; and the generating a prompt signal when detecting that a target object is seated on the child safety seat and not detecting that a safety belt passes through the safety belt path includes: generating the prompt signal when detecting that a target object is seated on the child safety seat and not detecting that a safety belt passes through the junction between the seat portion and the backrest portion of the child safety seat or not detecting that a safety belt passes through the guide of the headrest portion of the child safety seat.

In an embodiment, the detecting whether a target object is seated on the child safety seat includes: detecting whether pressure of the seat portion of the child safety seat is greater than a preset threshold.

In an embodiment, the safety belt mounting prompt method further includes: sending prompt information based on the prompt signal.

In an embodiment, the safety belt mounting prompt method further includes: generating a prompt stop signal when detecting that a safety belt passes through the safety belt path.

In an embodiment, the safety belt mounting prompt method further includes: stopping sending the prompt information based on the prompt stop signal.

According to another aspect of the present disclosure, a safety belt mounting prompt method for the safety belt mounting prompt system according to above-mentioned embodiments is provided. The safety belt mounting prompt method includes: detecting whether a safety belt passes through a safety belt path of a child safety seat; detecting whether a target object is seated on the child safety seat; detecting whether a use mode of the child safety seat is a forward-facing use mode; detecting whether a support leg of the child safety seat is folded; and generating a prompt signal when detecting that a target object is seated on the child safety seat, detecting that the use mode of the child safety seat is the forward-facing use mode, detecting that the support leg is folded, and not detecting that a safety belt passes through the safety belt path.

In an embodiment, the detecting whether a safety belt passes through a safety belt path of a child safety seat includes: detecting whether a safety belt passes through a junction between a seat portion and a backrest portion of the child safety seat; and the generating a prompt signal when detecting that a target object is seated on the child safety seat, detecting that the use mode of the child safety seat is the forward-facing use mode, detecting that the support leg is folded, and not detecting that a safety belt passes through the safety belt path includes: generating the prompt signal when detecting that a target object is seated on the child safety seat, detecting that the use mode of the child safety seat is the forward-facing use mode, detecting that the support leg is folded, and not detecting that a safety belt passes through the junction between the seat portion and the backrest portion of the child safety seat.

In an embodiment, the detecting whether a safety belt passes through a safety belt path of a child safety seat includes: detecting whether a safety belt passes through an area between the backrest portion and a headrest portion of the child safety seat; and the generating a prompt signal when detecting that a target object is seated on the child safety seat, detecting that the use mode of the child safety seat is the forward-facing use mode, detecting that the support leg is folded, and not detecting that a safety belt passes through the safety belt path includes: generating the prompt signal when detecting that a target object is seated on the child safety seat, detecting that the use mode of the child safety seat is the forward-facing use mode, detecting that the support leg is folded, and not detecting that a safety belt passes through the junction between the seat portion and the backrest portion of the child safety seat or not detecting that a safety belt passes through a guide on the headrest portion of the child safety seat.

In an embodiment, the detecting whether a target object is seated on the child safety seat includes: detecting whether pressure of the seat portion of the child safety seat is greater than a preset threshold.

In an embodiment, the safety belt mounting prompt method further includes: sending prompt information based on the prompt signal.

In an embodiment, the safety belt mounting prompt method further includes: generating a prompt stop signal when detecting that a safety belt passes through the safety belt path.

In an embodiment, the safety belt mounting prompt method further includes: stopping sending the prompt information based on the prompt stop signal.

It may be understood that various embodiments/implementations provided in the present disclosure can be combined with each other in the case of no conflict, which are not described herein one by one.

In the embodiments of the present disclosure, the terms “first”, “second”, and “third” are used for descriptive purposes only, which cannot be construed as indicating or implying a relative importance. The term “a plurality of” means two or more, unless expressly defined otherwise. The terms “mount,” “join,” “connect”, “fix”, and the like should be understood in a broad sense. For example, “connect” may mean a fixed connection, a detachable connection, or an integral connection, and “join” may mean a direct connection or an indirect connection through an intermediate medium. For those of ordinary skill in the art, the specific meanings of the foregoing terms in the embodiments of the present disclosure can be understood on a case-by-case basis.

In the descriptions of the embodiments of the present disclosure, it should be understood that, unless otherwise explicitly specified and defined, the orientation terms such as “front”, “rear”, “left”, and “right” in the embodiments of the present disclosure are based on the “front”, “rear”, “left”, and “right” orientations of the child seated on the child safety seat, and are intended only to facilitate the descriptions of the embodiments of the present disclosure and simplify the descriptions, rather than indicating or implying that the apparatus or unit referred to must have a particular direction or be constructed and operated in a particular orientation, and therefore cannot be interpreted as limiting the embodiments of the present disclosure.

In the descriptions of the specification, the descriptions of the terms “one embodiment,” “some embodiments,” “a particular embodiment”, and the like mean that a particular feature, structure, material, or characteristic described in connection with the embodiment or example is included in at least one embodiment or example of the embodiments of the present disclosure. In the specification, the exemplary expressions of the above terms are not necessarily referring to the same embodiment or example. Moreover, the described particular feature, structure, material or characteristic may be combined in any suitable manner in any one or more embodiments or examples.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

The invention claimed is:

1. A child safety seat, including:

a seat body; and a seat base;

wherein the seat body is rotatably mounted on the seat base, and the seat body is rotatable between a forward-facing use mode and a rearward-facing use mode, and wherein the child safety seat further includes:

at least one side impact protection block mounting position; and a safety prompt system including:

a side impact protection block being detachably mounted at the side impact protection block mounting position;

a first detection apparatus being arranged in the child safety seat and arranged near the side impact protection block mounting position, and configured to detect whether the side impact protection block is mounted at the side impact protection block mounting position and send a first detection signal indicating a detection result;

a first control module being arranged in the child safety seat and communicably connected to the first detection apparatus, and configured to at least receive the first detection signal and configured to send a control signal based on the first detection signal; and a first indication apparatus being communicably connected to the first control module, and being configured to receive the control signal and send reminder information based on the control signal.

2. The child safety seat according to claim 1, wherein the side impact protection block includes:

a shell defining an accommodation space; and a first locking mechanism being at least partially arranged in the accommodation space of the shell and at least partially protruding from the shell, when the side impact protection block is mounted at the side impact protection block mounting position, the first locking mechanism being capable of being fitted and locked with a second locking mechanism in the side impact protection block mounting position, so that the side impact protection block is fixedly connected to the side impact protection block mounting position.

3. The child safety seat according to claim 2, wherein the side impact protection block includes:

an unlocking portion being at least partially arranged in the accommodation space of the shell, wherein the unlocking portion is operably connected to the first locking mechanism and configured to unlock the first locking mechanism from the second locking mechanism.

4. The child safety seat according to claim 2, wherein the first locking mechanism includes:

a first hook portion being at least partially arranged in the accommodation space of the shell and capable of protruding from a first side of the shell;

a second hook portion being at least partially arranged in the accommodation space of the shell and capable of protruding from a second side of the shell opposite to the first side; and a first elastic member being arranged in the accommodation space of the shell and connected between the first hook portion and the second hook portion, the first elastic member constantly causing the first hook portion and the second hook portion to have a tendency to move away from each other.

5. The child safety seat according to claim 2, wherein the first locking mechanism includes a first hook portion and a second hook portion, and the first hook portion and the second hook portion at least partially protrude from different sides of the shell, and the second locking mechanism includes a first slot and a second slot, and when the side impact protection block is mounted to the side impact protection block mounting position, the first hook portion is capable of entering the first slot, and at the same time, the second hook portion is capable of entering the second slot.

6. The child safety seat according to claim 1, wherein the side impact protection block includes a first locking mechanism and an unlocking portion, the unlocking portion being operably connected to the first locking mechanism, and the first locking mechanism includes a first hook portion and a second hook portion, the unlocking portion is connected to one of the first hook portion and the second hook portion, and the unlocking portion is further connected to the other of the first hook portion and the second hook portion, so as to drive the first hook portion and the second hook portion to synchronously move when the unlocking portion is operated; and wherein the unlocking portion and the second hook portion are arranged on a same side of the side impact protection block.

7. The child safety seat according to claim 1, wherein the child safety seat includes an opening disposed at the side impact protection block mounting position, and the child safety seat includes a decorative cover and a second elastic member, the decorative cover is movably arranged at the side impact protection block mounting position and covers the opening, an end of the second elastic member is connected to the decorative cover, the other end of the second elastic member is connected to the bottom of the opening, the second elastic member constantly exerts a pushing force on the decorative cover.

8. The child safety seat according to claim 7, wherein the decorative cover includes a third locking mechanism, the third locking mechanism is fitted and locked with a second locking mechanism in the side impact protection block mounting position to limit a moving stroke of the decorative cover in a direction away from the bottom of the opening.

9. The child safety seat according to claim 1, wherein the first detection apparatus includes:

a sensitive assembly, the sensitive assembly being capable of moving back and forth between a detect position and a non-detect position, the side impact protection block, when mounted at the side impact protection block mounting position, driving the sensitive assembly to move from the non-detect position to the detect position; and a first sensing apparatus, the first sensing apparatus being arranged near the sensitive assembly, when the sensitive assembly is at the detect position, the first sensing apparatus being capable of detecting the sensitive assembly and sending the first detection signal; and wherein the first detection apparatus further includes: a third elastic member, the third elastic member constantly exerting a pushing force on the sensitive assembly, so that the sensitive assembly constantly has a tendency to move away from the detect position to the non-detect position.

10. The child safety seat according to claim 1, wherein the safety prompt system further includes: at least one second detection apparatus, the second detection apparatus being communicably connected to the first control module, the second detection apparatus being configured to at least detect a connection state of an International Standards Organization FIX connector and send a second detection signal indicating the connection state;

wherein the first control module is capable of receiving the second detection signal and obtaining the connection state of the isofix connector based on the second detection signal; and wherein the second detection apparatus is arranged on the isofix connector of the child safety seat.

11. The child safety seat according to claim 10, wherein the first indication apparatus further includes an input interface, the input interface being configured to receive mounting position information of the child safety seat and being communicably connected to the first control module, and the first control module receives the mounting position information through the input interface to obtain whether a mounting position of the child safety seat is a left seat of a vehicle or a right seat of the vehicle.

12. The child safety seat according to claim 1, wherein the safety prompt system further includes: a plurality of second detection apparatuses, the second detection apparatuses being communicably connected to the first control module and being respectively arranged on different isofix interfaces on vehicle seats, each of the second detection apparatuses being configured to sense a connection state of the corresponding isofix interface and send a second detection signal indicating the connection state; and wherein the first control module is capable of receiving the second detection signal, and judging, based on the second detection signal, the connection state of the isofix interface and whether a mounting position of the child safety seat is a left seat of a vehicle or a right seat of the vehicle.

13. The child safety seat according to claim 11, wherein the child safety seat includes two side impact protection block mounting positions respectively located on opposite sides of the child safety seat, and the first indication apparatus is capable of displaying a current mounting position of the child safety seat based on the control signal, and sending reminder information when the side impact protection block is not mounted at the side impact protection block mounting position corresponding to the current mounting position of the child safety seat.

14. The child safety seat according to claim 1, wherein the safety prompt system further includes: a third detection apparatus, the third detection apparatus being arranged in the child safety seat and being communicably connected to the first control module, the third detection apparatus being configured to detect a use mode of the child safety seat and send a third detection signal indicating the use mode, and wherein the first control module is capable of receiving the third detection signal, and obtaining, based on the third detection signal, whether the use mode of the child safety seat is the forward-facing use mode or the rearward-facing use mode.

15. The child safety seat according to claim 14, wherein the child safety seat includes two side impact protection block mounting positions respectively located on opposite sides of the child safety seat, and the first indication apparatus is capable of displaying a current use mode of the child safety seat, and sending reminder information when the side impact protection block is not mounted at the side impact protection block mounting position corresponding to the use mode.

16. The child safety seat according to claim 1, wherein the child safety seat has an opening at the side impact protection block mounting position, and the first detection apparatus includes:

a sensitive assembly, the sensitive assembly being capable of moving back and forth between a detect position and a non-detect position, the side impact protection block, when mounted at the side impact protection block mounting position, driving the sensitive assembly to move from the non-detect position to the detect position; and a first sensing apparatus, the first sensing apparatus being arranged near the sensitive assembly, when the sensitive assembly is at the detect position, the first sensing apparatus being capable of detecting the sensitive assembly and sending the first detection signal, wherein a depth of the opening is greater than or equal to a distance between the detect position and the non-detect position.

17. The child safety seat according to claim 1, wherein the child safety seat includes an opening at the side impact protection block mounting position to mount the side impact protection block, and the first detection apparatus includes:

a sensitive assembly, the sensitive assembly being capable of moving back and forth between a detect position and a non-detect position, the side impact protection block, when mounted at the opening, driving the sensitive assembly to move from the non-detect position to the detect position; and a first sensing apparatus, the first sensing apparatus being arranged near the sensitive assembly, when the sensitive assembly is at the detect position, the first sensing apparatus being capable of detecting the sensitive assembly and sending the first detection signal, wherein, when the side impact protection block is mounted at the opening, the side impact protection block includes an insertion portion located in the opening, a length of the insertion portion is greater than or equal to a distance between the detect position and the non-detect position.

18. The child safety seat according to claim 1, wherein the safety prompt system further includes: a fourth detection apparatus, the fourth detection apparatus being arranged in a safety belt buckle of the child safety seat and being communicably connected to the first control module, the fourth detection apparatus being configured to detect a fastening state of the safety belt buckle and send a fourth detection signal indicating the fastening state, and wherein the first control module is capable of receiving the fourth detection signal and obtaining, based on the fourth detection signal, whether the safety belt buckle is fastened, and the first control module judges, based on the fastening state of the safety belt buckle, whether to send control information to the first indication apparatus.

19. The child safety seat according to claim 18, wherein when the safety belt buckle is in the fastening state, the first control module sends the control information to the first indication apparatus to send the reminder information; and when the safety belt buckle is not in the fastening state, the first control module does not send the control information to the first indication apparatus, and the first indication apparatus does not send the reminder information.

20. The child safety seat according to claim 1, wherein the first indication apparatus is arranged on the child safety seat or outside the child safety seat, and at least includes at least one of the following: a buzzer, a vibrator, a display screen, a mobile phone, and a tablet computer.

* * * * *